(12) United States Patent
Arai et al.

(10) Patent No.: US 7,646,769 B2
(45) Date of Patent: Jan. 12, 2010

(54) DATA COMMUNICATION SYSTEM AND METHOD FOR PREVENTING PACKET PROLIFERATION IN A MULTI-DEVICE LINK AGGREGATION NETWORK

(75) Inventors: Masaya Arai, Atsugi (JP); Manabu Fujita, Kawasaki (JP); Ken Watanabe, Yokohama (JP); Kensuke Ino, Yokohama (JP)

(73) Assignee: Alaxala Networks Corporation, Kanagawa (JP)

( * ) Notice: Subject to any disclaimer, the term of this patent is extended or adjusted under 35 U.S.C. 154(b) by 517 days.

(21) Appl. No.: 11/452,304

(22) Filed: Jun. 14, 2006

(65) Prior Publication Data

US 2007/0183376 A1 Aug. 9, 2007

(30) Foreign Application Priority Data

Feb. 3, 2006 (JP) ............................. 2006-026900

(51) Int. Cl.
*H04L 12/56* (2006.01)
*H04J 1/16* (2006.01)
(52) U.S. Cl. ..................... 370/389; 370/230; 370/386
(58) Field of Classification Search ......... 370/216–219, 370/229–231, 235, 392, 395.31, 395.5, 400, 370/401, 410, 389, 386
See application file for complete search history.

(56) References Cited

U.S. PATENT DOCUMENTS

| 6,269,076 | B1 * | 7/2001 | Shamir et al. ............... 370/217 |
| 6,910,149 | B2 | 6/2005 | Perloff |
| 7,006,499 | B2 * | 2/2006 | Tingle et al. ................ 370/392 |
| 7,269,132 | B1 * | 9/2007 | Casey et al. ................. 370/219 |
| 2001/0044842 | A1 * | 11/2001 | Kawakami ................... 709/223 |
| 2002/0122394 | A1 * | 9/2002 | Whitmore et al. ........... 370/328 |
| 2003/0099237 | A1 * | 5/2003 | Mitra et al. ................. 370/393 |

OTHER PUBLICATIONS

Yu, J., IPv6 Multihoming with Rate Aggregation, Aug. 2000, IETF, Internet Draft.*
Deering S. and Hinden, R., Internet Protocol, Version 6 (IPv6) Specification, Dec. 1998, IETF, Network Working Group, RFC 2460.*

* cited by examiner

*Primary Examiner*—John Pezzlo
(74) *Attorney, Agent, or Firm*—Brundidge & Stanger, P.C.

(57) ABSTRACT

A Provider Edge PE3 replicates a received packet and relays these to virtual circuits VC1, VC2 respectively, and Provider Edges PE2, PE2 respectively receive the packets from the virtual circuits VC1, VC2, whereupon the Provider Edges PE2, PE2, on the basis of an agreement between them, decide to handle the received packets such that one of the edges relays the packet to a Customer Edge CE1 for forwarding to a Host A, while the other edge discards the packet without relaying it to the Customer Edge CE1.

18 Claims, 42 Drawing Sheets

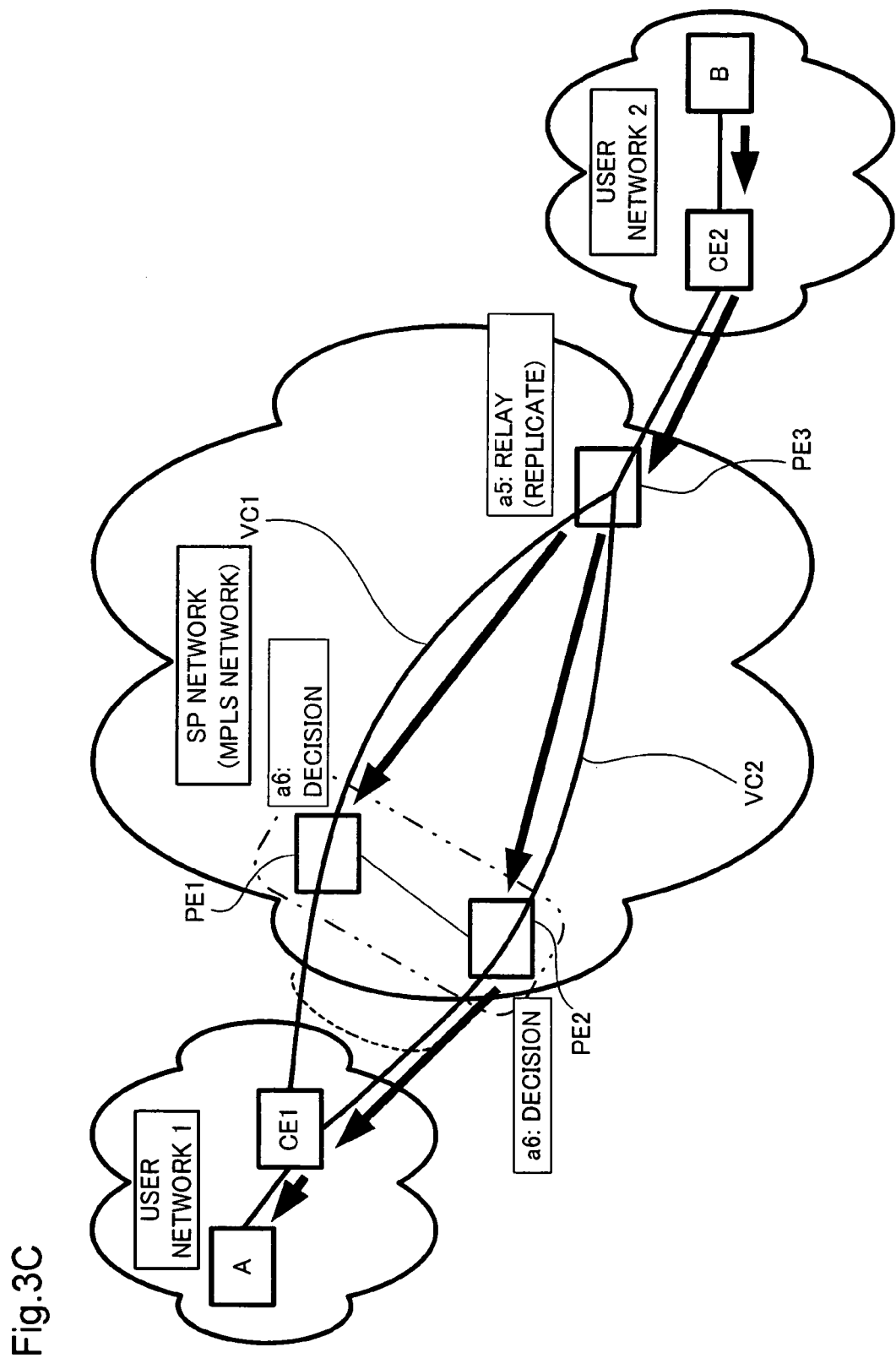

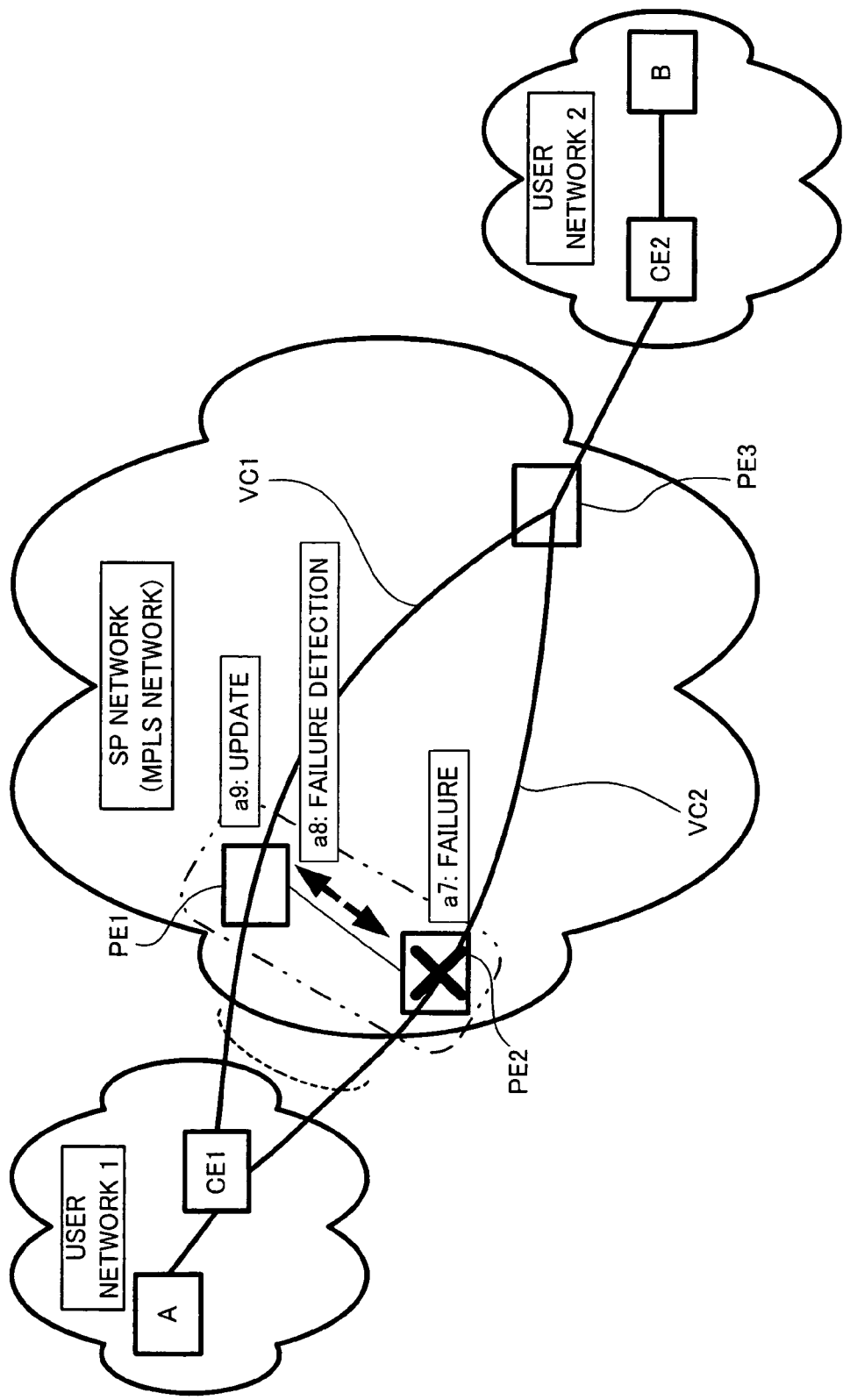

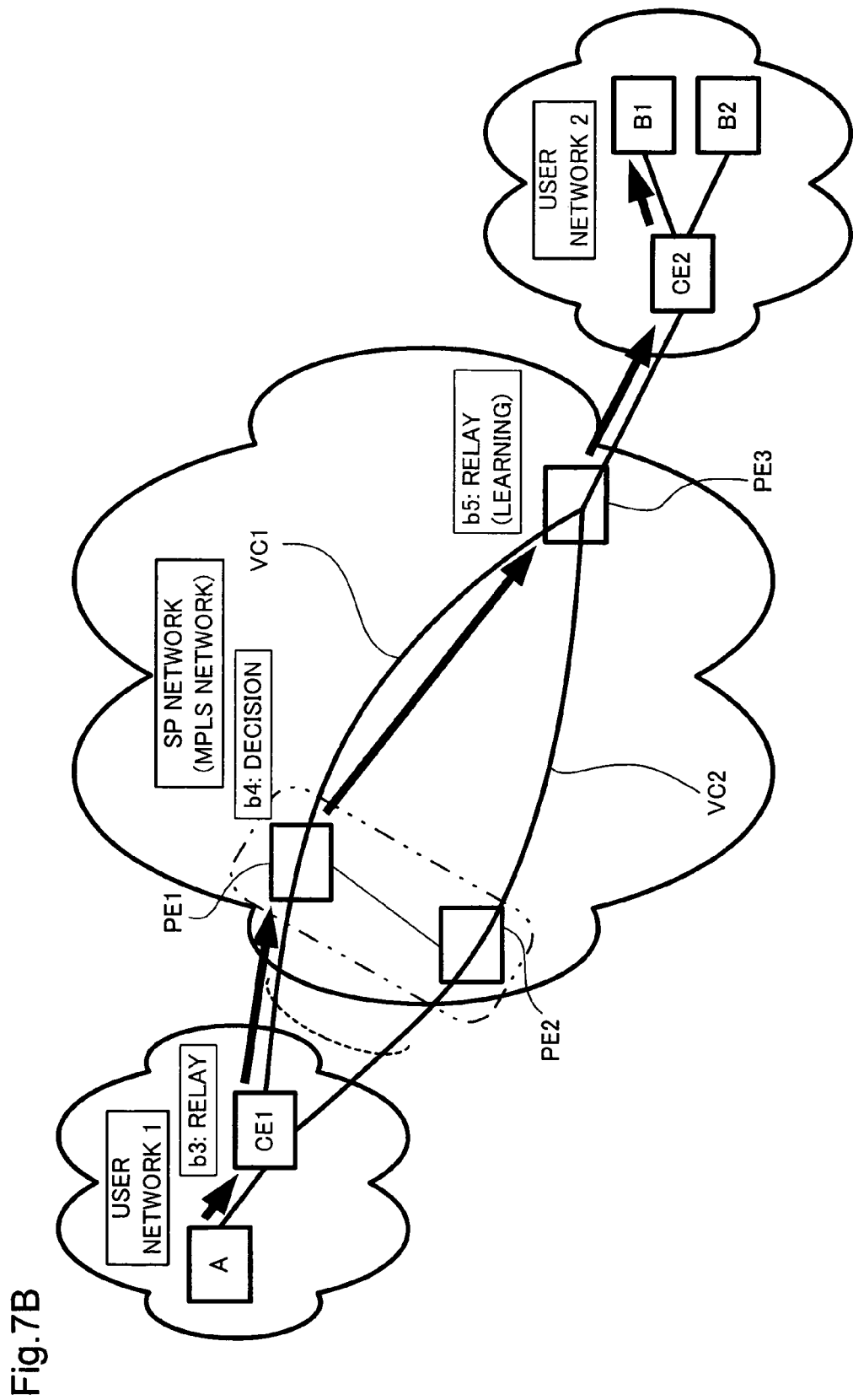

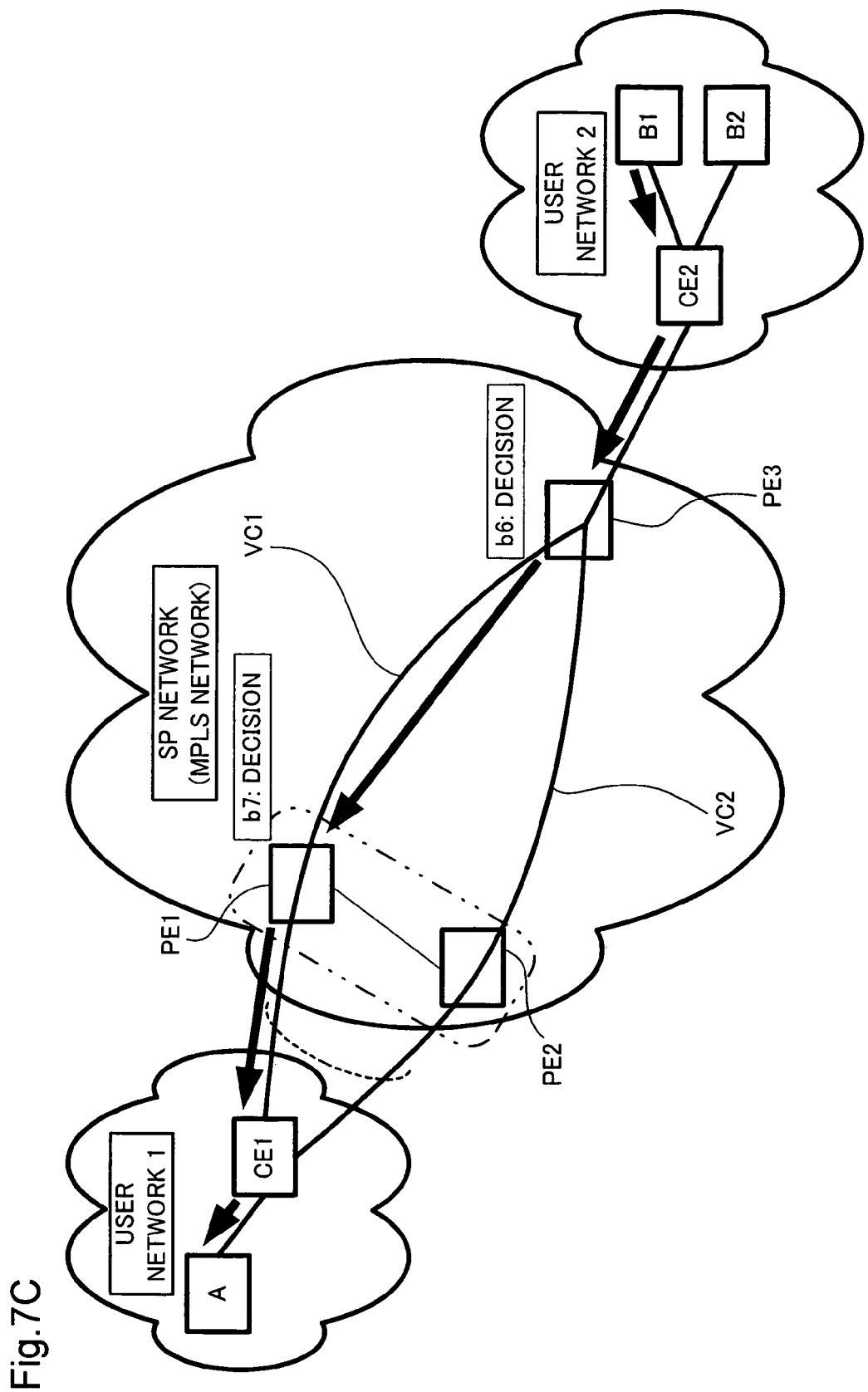

b1: AGREEMENT b2: INSTRUCTION

Fig. 10C b20: RECOVERY
⇩
b21: AGREEMENT

PE1

| DESTINATION | SENDER | ACTION |
|---|---|---|
| A | B1 | RELAY |
| A | B2 | DISCARD |

PE2

| DESTINATION | SENDER | ACTION |
|---|---|---|
| A | B1 | DISCARD |
| A | B2 | RELAY | b22: INSTRUCTION

PE3

| VCID | DESTINATION | LEARNING | SUBSCRIBER CIRCUIT |
|---|---|---|---|
| VC1 | PE1 | YES | CONNECT TO CE2 |
| VC2 | PE2 | YES | CONNECT TO CE2 |

| DESTINATION | SENDER | SEND DESTINATION VC |
|---|---|---|
| A | B1 | VC1 |
| A | B2 | VC2 | b23: INSTRUCTION

PE3

| VCID | DESTINATION | LEARNING | SUBSCRIBER CIRCUIT |
|---|---|---|---|
| VC1 | PE1 | YES | CONNECT TO CE2 |
| VC2 | PE2 | YES | CONNECT TO CE2 |

| DESTINATION | SENDER | SEND DESTINATION VC |
|---|---|---|
| A | B1 | VC1 |
| A | B2 | VC1 |

DATA COMMUNICATION SYSTEM AND METHOD FOR PREVENTING PACKET PROLIFERATION IN A MULTI-DEVICE LINK AGGREGATION NETWORK

INCORPORATION BY REFERENCE

The present application claims priority from Japanese application JP2006-26900 filed on Feb. 3, 2006, the content of which is hereby incorporated by reference into this application.

BACKGROUND OF THE INVENTION

1. Field of the Invention

The present invention relates to technology for preventing packet proliferation, in instances where so-called multi-device link aggregation is implemented on a network.

2. Description of the Related Art

VPLS (Virtual Private LAN Service) is one technology known to date for joining user networks with other user networks using an MPLS (Multiprotocol Label Switching) network to provide a service protocol (SP) enabling Ethernet frames to be forwarded Multipoint-to-Multipoint.

Link aggregation is a known redundant configuration for networks, and has been standardized in IEEE 802.3ad. Multi-device link aggregation, whereby the aforementioned link aggregation spans multiple devices, has been proposed as a redundant configuration for switches, routers, and other network devices. By implementing such multi-device link aggregation for a number of network devices, in the event that one network device should encounter a problem, the network as a whole will be unaffected.

Such multi-device link aggregation is taught, for example, in U.S. Pat. No. 6,910,149.

FIG. 15 is a block diagram depicting a configuration where multi-device link aggregation has been implemented for two network devices. In FIG. 15, by implementing multi-device link aggregation for the two network devices SW2-1 and SW2-2, the two network devices SW2-1 and SW2-2 are viewed as a single virtual device by another network device SW1 connected to these devices. The two network devices SW2-1 and SW2-2 under multi-device link aggregation exchange control message between themselves, while aggregate circuit messages are exchanged between these two network devices SW2-1 and SW2-2 and the other network device SW1.

BRIEF SUMMARY OF THE INVENTION

In the VPLS described above, implementation of multi-device link aggregation for the purpose of providing redundant configuration will now be contemplated.

FIG. 16 is an illustration of an example of a network with multi-device link aggregation implemented for a VPLS. As depicted in FIG. 16, in a VPLS, an MPLS network provided by an SP (hereinafter termed SP network) mediates among user networks. Within the SP network, a large number of network devices are present and are interconnected by circuits. Each user network is interconnected with the SP network by a network device present at the edge of the user network (hereinafter termed "Customer Edge") CE and a network device present at the edge of the SP network (hereinafter termed "Provider Edge") PE.

In a VPLS of the configuration described above, where multi-device link aggregation as described previously is implemented for two Provider Edges PE1, PE2 for example, the customer edge CE1 of the User Network 1 will recognize the two Provider Edges PE1, PE2 just as if they were a single Provider Edge PE.

However, in such a case, in the event that the network should be operated according to the VPLS standard without recognition of multi-device link aggregation, problems such as the following can occur.

Specifically, according to the VPLS standard, virtual circuits VC are first set up among the Provider Edges, without recognition of multi-device link aggregation. Here, virtual circuit VC refers to a transmission path in the VPLS, namely, a virtual circuit linking a particular user network with another user network.

FIG. 17 is an illustration depicting virtual circuits VC set up linking the User Network 1 and the User Network 2. In FIG. 17, a virtual circuit VC1 is set up between Provider Edges PE1-PE3, and a virtual circuit VC2 is set up between Provider Edges PE2-PE3.

Next, according to the VPLS standard, packets are forwarded from the Host B of the User Network 2 to the Host A of the User Network 1, without recognition of multi-device link aggregation.

This creates the problem that forwarded packets proliferate during forwarding.

FIG. 18 is an illustration depicting the phenomenon of packet proliferation. In FIG. 18, all network devices, circuits, and user networks not needed for the description are omitted from the drawing in order to aid understanding.

In FIG. 18, when the Host B of the User Network 2 first sends to the Customer Edge CE2 a packet destined to the Host A of the User Network 1, at the Customer Edge CE2, the packet is forwarded to the Provider Edge PE3 of the SP network. At the Provider Edge PE3, the forwarded packet destined to the Host A is replicated, and the replicated packets are sent out over two virtual circuits VC1, VC2. At the Provider Edge PE1 connected to the virtual circuit VC1, the sent packet is forwarded as-is to the Customer Edge CE1 of the User Network 1, while at the Provider Edge PE2 connected to the virtual circuit VC2 as well, the sent packet is forwarded as-is to the Customer Edge CE1. At this point in time packet proliferation occurs, with identical packets being transmitted in duplicate from the Customer Edge CE1 to the Host A.

In this way, in VPLS, where multi-device link aggregation has been implemented for Provider Edges PE within an SP network, but virtual circuits VC are set up among Provider Edges without recognition of multi-device link aggregation, the problem of proliferation of Forwarded packets will occur.

It is therefore an object of the present invention to destination the drawbacks of the prior art discussed above, to provide technology whereby packet proliferation can be avoided in cases where multi-device link aggregation is implemented for Provider Edges PE within a VPLS, so that normal packet forwarding can be carried out.

To attain the aforementioned object at least in part, the first data communication system of the invention resides in a data communication system for communicating data between a second and a third network via a first network. The system comprises: a first and a second edge present within the first network, for which multi-device link aggregation is implemented; a third edge present within the first network, connected to the first edge via a first virtual circuit and connected to the second edge via a second virtual circuit; a fourth edge present within the second network, connected to the first and second edges by circuits and connected to a host within the second network; and a fifth edge present within the third network, connected to the third edge by a circuit and connected to a host within the third network; wherein in the event of forwarding of a packet from a host in the third network to a host in the second network, the third edge receives the packet sent from the host in the third network via the fifth edge, replicates the packet, and relays these individually to the first and second virtual circuits; and the first edge receives the packet sent from the first virtual circuit while the second edge receives the packet sent from the second virtual circuit, and the first and second edges decide upon the handling of the received packets on the basis of an agreement between them in advance, whereby one of the edges relays the received packet to the fourth edge for forwarding to the host in the second network, while the other edge discards the received packet without relaying it to the fourth edge.

In this way, according to the first data communication system herein, the third edge replicates its received packet and relays these individually to the first and second virtual circuits, whereupon despite the fact that first and second edges receive these packets from the first and second virtual circuits respectively, the first and second edges decide upon the handling of the received packets on the basis of an agreement between them in advance, whereby one of the edges relays its packet to the fourth edge for forwarding to the host in the second network, while the other edge discards its packet without relaying it to the fourth edge.

Consequently, according to the first data communication system, of the first and second edges, one of the edges will relay its packet while the other discards its packet, so that duplicates of a given packet are not forwarded to the host within the second network, and normal packet forwarding can be carried out.

In the first data communication system of the invention, in preferred practice, settings in the third edge will be made so as to not perform MAC learning with respect to packet forwarding via the first and second virtual circuits.

By making settings in the third edge in this way, in the event that it receives a packet sent via the fifth edge, the received packet will be replicated and relayed individually to the first and second virtual circuits.

In the first data communication system of the invention, in preferred practice, during setup of the first and second virtual circuits individually connected to the third edge, the first and second edges each establish the agreement relating to handling of packets received via the first and second virtual circuits being set up between the first and second edges and each send to the third edge a virtual circuit setup message; and using this message, the third edge is instructed to not perform MAC learning with respect to packet forwarding via the first and second virtual circuits being set up.

By carrying out this process when setting up the first and second virtual circuits, an agreement relating to handling of packets can be determined in advance between the first and second edges, and settings in the third edge can be configured so as to not perform MAC learning with respect to packet forwarding.

In the first data communication system of the invention, in preferred practice, of the first and second edges, in the event that one edge fails and this failure is detected by the other edge, the failure detecting edge updates the agreement such that the packets received from the connected virtual circuit will be relayed to the fourth edge.

Consequently, whereas prior to the occurrence of a failure in one of the edges the agreement in the failure detecting edge is to discard received packets, once a failure has occurred, the agreement will be updated so that received packets are relayed to the fourth edge.

In the first data communication system of the invention, in preferred practice, the failure detecting edge, upon receiving a the packet sent from the connected virtual circuit subsequent to updating of the agreement, decides upon the handling of the received packet on the basis of the updated agreement, and relays the received packet to the fourth edge.

In this way, even after a failure has occurred in one of the edges, the failure detecting edge will not discard packets received from the connected virtual circuit, but instead will relay them to the fourth edge, so that packet forwarding can continued uninterrupted.

In the first data communication system of the invention, in preferred practice, in the event that the edge that failed has now recovered from the failure, the first and second edges renegotiate an agreement relating to the handling by the first and second edges of packets received respectively from the first and second virtual circuits; the recovered edge sends a virtual circuit setup message to the third edge; and using this message, the third edge is instructed to not perform MAC learning with respect to packet forwarding via the virtual circuit being set up.

By carrying out this process in instances where an edge that failed has now recovered from the failure, an agreement relating to handling of packets between the first and second edges can again be made, and settings in the third edge configured so as to not perform MAC learning with respect to packet forwarding via the virtual circuit being set up.

The second data communication system of the invention resides in a data communication system for communicating data between a second and a third network via a first network. The system comprises: a first and a second edge present within the first network, for which multi-device link aggregation is implemented; a third edge present within the first network, connected to the first edge via a first virtual circuit and connected to the second edge via a second virtual circuit; a fourth edge present within the second network, connected to the first and second edges by circuits and connected to a host within the second network; and a fifth edge present within the third network, connected to the third edge by a circuit and connected to a host within the third network; wherein in the event of forwarding of a packet from a host in the third network to a host in the second network, the third edge receives the packet sent from the host in the third network via the fifth edge, and on the basis of MAC learning content relating to packet transmission, relays the packet to either the first or second virtual circuit; and the edge that receives the packet from the connected virtual circuit, of the first and second edges, relays the received packet to the fourth edge for forwarding to the host in the second network.

In this way, in the second data communication system, on the basis of MAC learning content relating to packet transmission, the third edge relays a received packet to either the first or second virtual circuit, but not to the other. Then, of the first and second edges, the edge that receives the packet from the connected virtual circuit relays the packet to the fourth edge, for forwarding to the host in the second network.

Consequently, according to the second data communication system, the third edge relays a packet to either the first or second virtual circuit, while not relaying it to the other, so that duplicates of a given packet are not forwarded to the host within the second network, and normal packet forwarding can be carried out.

In the second data communication system of the invention, in preferred practice, an agreement is negotiated in advance between the first edge and the second edge with regard to handling of packets received via the first and second virtual circuits; and in the event that a packet is forwarded from a host in the second network to a host in the third network, of the first and second edges, if one edge receives the packet sent from the host in the second network via the fourth edge, the one edge acquires from the received packet the destination and sender combination, interchanges the destination and the sender to derive a new combination, and in the event that the agreement specifies with respect to handling of the packet of this new combination that the packet be relayed, relays the received packet to the connected virtual circuit; and in the event that agreement specifies with respect to handling of the packet of this new combination that the packet be discarded, sends the received packet to the other edge.

By means of this arrangement, for a packet received by one edge, in the event that the agreement specifies that a packet of a new combination derived by interchanging the destination and the sender thereof should be relayed, the packet will be relayed to the connected virtual circuit; whereas if the agreement specifies that it be discarded, the packet will be sent to the other edge.

In the second data communication system of the invention, in preferred practice, of the first and second edges, if the other edge receives the packet sent from the one edge, the other edge acquires the destination and sender combination from the received packet and interchanges the destination and the sender thereof to derive a new combination; and in the event that the agreement specifies with respect to handling of the packet of this new combination that the packet be relayed, relays the received packet to the connected virtual circuit.

By means of this arrangement, for a packet received from one edge by the other edge, in the event that the agreement specifies that a packet of a new combination derived by interchanging the destination and the sender thereof should be relayed, the packet will be relayed to the connected virtual circuit.

As a result, the agreement in the first edge specify for all packets relayed by the first edge to the first virtual circuit that packets of a new combination derived by interchanging the destination and the sender thereof should be relayed. On the other hand, the agreement in the second edge specify for all packets relayed by the second edge to the second virtual circuit that packets of a new combination derived by interchanging the destination and the sender thereof should be relayed.

In the second data communication system of the invention, in preferred practice, in the third edge settings are made so as to perform MAC learning with respect to packet forwarding via the first and second virtual circuits, and in the event of receiving a the packet from the first or second virtual circuit, the third edge on the basis of the settings performs MAC learning with respect to forwarding of the received packet, acquiring the MAC learning content and relaying the received packet to the fifth edge.

By means of this arrangement, in the event of receiving a packet from the first virtual circuit, for a packet of a new combination derived by interchanging the destination and sender of the original packet, the third edge performs MAC learning in such a way that the new packet will be sent to the first virtual circuit; and in the event of receiving a packet from the second virtual circuit, for a packet of a new combination derived by interchanging the destination and sender of the original packet, performs MAC learning in such a way that the new packet will be sent to the second virtual circuit.

Here, as noted previously, packets received by the third edge from the first virtual circuit constitute packets for which the agreement in the first edge specify that packets of a new combination derived by interchanging the destination and sender of the original packet should be relayed. Consequently, put another way, the third edge performs MAC learning in such a way as to send on to the first virtual circuit those packets which the agreement in the first edge specify should be relayed.

Similarly, the agreement in the second edge specify, for packets received by the third edge from the second virtual circuit, that packets of a new combination derived by interchanging the destination and sender of the original packet should be relayed. Consequently, put another way, the third edge performs MAC learning in such a way as to send on to the second virtual circuit those packets which the agreement in the second edge specify should be relayed.

As a result, as mentioned previously, in the event of packet forwarding from a host in the third network to a host in the second network, the third edge receives the packets sent from the host in the third network via the fifth edge and relays the packet on the basis of the aforementioned MAC learning content, whereupon packets which the agreement in the first edge specify should be relayed are relayed on to the first virtual circuit, whereas packets which the agreement in the second edge specify should be relayed are relayed on to the second virtual circuit.

Consequently, since settings in the first edge are configured so that its agreement specifies that when packets are received from the first virtual circuit, all such packets are relayed, none of the received packets are discarded, and they are relayed to the fourth edge. Similarly, since settings in the second edge are configured so that its agreement specifies that when packets are received from the second virtual circuit, all such packets are relayed, none of the received packets are discarded, and they are relayed to the fourth edge.

In the second data communication system of the invention, in preferred practice, during setup of the first and second virtual circuits individually connected to the third edge, the first and second edges each establish the agreement relating to handling between the first and second edges of packets received via the first and second virtual circuits being set up and each send to the third edge a virtual circuit setup message; and using this message, the third edge is instructed to perform MAC learning with respect to packet forwarding via the first and second virtual circuits being set up.

By carrying out this process when setting up the first and second virtual circuits, an agreement relating to handling of packets can be determined in advance between the first and second edges, and settings in the third edge can be configured so as to perform MAC learning with respect to packet forwarding.

In the second data communication system of the invention, in preferred practice, of the first and second edges, in the event that one edge fails and this failure is detected by the other edge, the failure detecting edge updates the agreement such that the packets received from the connected virtual circuit will be relayed to the fourth edge, and sends a cancel message to the third edge; and using this message, the third edge is instructed to delete MAC learning content with respect to packet forwarding via the virtual circuit connected to the one edge.

As a result, since the third edge deletes MAC learning content with respect to packet forwarding to the virtual circuit connected to the edge which has failed, in the event of subsequent packet forwarding from a host in the third network to a host in the second network, when third edge receives a packet sent via the fifth edge from a host in the third network, and the packet is determined to pertain to the virtual circuit connected to the edge which has failed, since MAC learning content with respect to forwarding of such packets has been deleted, the third edge replicates the received packet, and relays these to the first and second virtual circuits respectively.

Consequently, received packets will always be relayed to the virtual circuit connected to the failure detecting edge which has not failed, so that packet forwarding can continue uninterrupted.

Even if the agreement in the failure detecting edge are such that, prior to a failure occurring in one of the edges, certain packets will be discarded from among the packets received from a connected virtual circuit, nevertheless, after a failure has occurred, the agreement will be updated so that these packets are also relayed to the fourth edge.

In the second data communication system of the invention, in preferred practice, in the event that the failure detecting edge receives a packet sent from the connected virtual circuit after the agreement have been updated, it decides on the handling of the received packet on the basis of the updated agreement, and relays the received packet to the fourth edge.

In this way, even if one edge has failed, the failure detecting edge will not discard packets received from the connected virtual circuit, but instead relay them to the fourth edge, so that packet forwarding can continued uninterrupted.

In the second data communication system of the invention, in preferred practice, in the event that the edge that failed has now recovered from the failure, the first and second edges renegotiate an agreement relating to the handling by the first and second edges of packets received respectively from the first and second virtual circuits; the recovered edge sends a virtual circuit setup message to the third edge; using this message, the third edge is instructed to perform MAC learning with respect to packet forwarding via the virtual circuit being set up; and a cancel message is sent to the third edge, whereby using this message, the third edge is instructed to delete MAC learning content with respect to forwarding of specific packets.

By performing this process in the case where an edge that failed has now recovered from the failure, an agreement regarding handling of packets can be renegotiated between the first and second edges; and settings in the third edge can be configured so as to perform MAC learning with respect to packet forwarding via the virtual circuit being set up, as well as to delete MAC learning content with respect to forwarding of specific packets.

In the second data communication system of the invention, in preferred practice, an agreement is negotiated in advance between the first edge and the second edge with regard to handling of packets received via the first and second virtual circuits; and in the event that a packet is forwarded from a host in the second network to a host in the third network, of the first and second edges, if one edge receives the packet sent from the host in the second network via the fourth edge, the one edge acquires from the received packet the destination and sender combination, interchanges the destination and the sender to derive a new combination, and updates the agreement so that the packet of this new combination will be relayed; the one edge instructs the other edge to update the agreement so that the packet of this new combination will be discarded, and instructs the third edge with MAC learning content so that the packet of this new combination will be sent to the virtual circuit connected to the one edge; the one edge relays the received packet to the connected virtual circuit; in the third edge is settings are made so as to not perform MAC learning with respect to packet forwarding via the first and second virtual circuits; and in the event that the third edge receives a the packet from the first or second virtual circuit, on the basis of the settings, it does not perform MAC learning with respect to forwarding of the received packet, and relays the received packet to the fifth edge.

By means of this arrangement, in one edge which has received a packet, the agreement is updated in such a way that a packet of the new combination derived by interchanging the destination and sender thereof will be relayed, while in the other edge which has not received the packet, the agreement is updated in such a way that the packet of the new combination will be discarded. In the third edge, MAC learning content is set so that the packet of the new combination will be sent to the virtual circuit connected to the aforementioned one edge. However, while MAC learning content is set in this way in the third edge, if a packet is received from the first or second virtual circuit, MAC learning will not be performed, and the packet will be relayed to the fifth edge, so that the content of MAC learning will not be updated.

As a result, in the event of packet forwarding from a host in the third network to a host in the second network as discussed above, the third edge receives the packet sent from the host in the third network via the fifth edge, and on the basis of the aforementioned MAC learning content settings sends the packet to the virtual circuit connected to the aforementioned one edge.

In the second data communication system of the invention, in preferred practice, in the event of packet forwarding from a host in the third network to a host in the second network, of the first and second edges, the edge receiving the packet from a connected virtual circuit relays the received packet to the fourth edge, on the basis of the updated agreement.

By so doing, where as described above the third edge receives a packet sent from a host in the third network via the fifth edge, and on the basis of MAC learning content settings sends the packet to the virtual circuit connected to the aforementioned one edge, when this one edge receives the packet from the connected virtual circuit, then by means of the updated agreement it will relay the packet to the fourth edge, rather than discarding it.

In the second data communication system of the invention, in preferred practice, in the event that the edge that failed has now recovered from the failure, the first and second edges renegotiate an agreement relating to the handling by the first and second edges of packets received respectively from the first and second virtual circuits; the recovered edge sends a virtual circuit setup message to the third edge; using this message, the third edge is instructed to perform MAC learning with respect to packet forwarding via the virtual circuit being set up; and a cancel message is sent to the third edge, whereby using this message, the third edge is instructed to delete learned content with respect to forwarding of specific packets.

By performing this process in the case where an edge that failed has now recovered from the failure, an agreement regarding handling of packets can be renegotiated between the first and second edges; and settings in the third edge can be configured so as to not perform learning with respect to packet forwarding via the virtual circuit being set up, as well as to delete learned content with respect to forwarding of specific packets.

The present invention is not limited to embodiment as a device invention such as the data communication systems described above, and may also be reduced to practice as a method invention, such as a data communication method.

BRIEF DESCRIPTION OF THE DRAWINGS

FIG. 3C is an illustration depicting normal operation in Embodiment 1 of the invention;

FIG. 5A is an illustration depicting operation when a failure occurs in Embodiment 1 of the invention;

FIG. 7B is an illustration depicting normal operation in Embodiment 2 of the invention;

FIG. 7C s an illustration depicting normal operation in Embodiment 2 of the invention;

FIG. 10C is an illustration of management tables prepared in Provider Edges PE1, PE2, and PE3 respectively during operation during recovery in Embodiment 2 of the invention;

DETAILED DESCRIPTION OF THE INVENTION

The embodiments of the invention will be described hereinbelow, in the following order.

Figure 1:
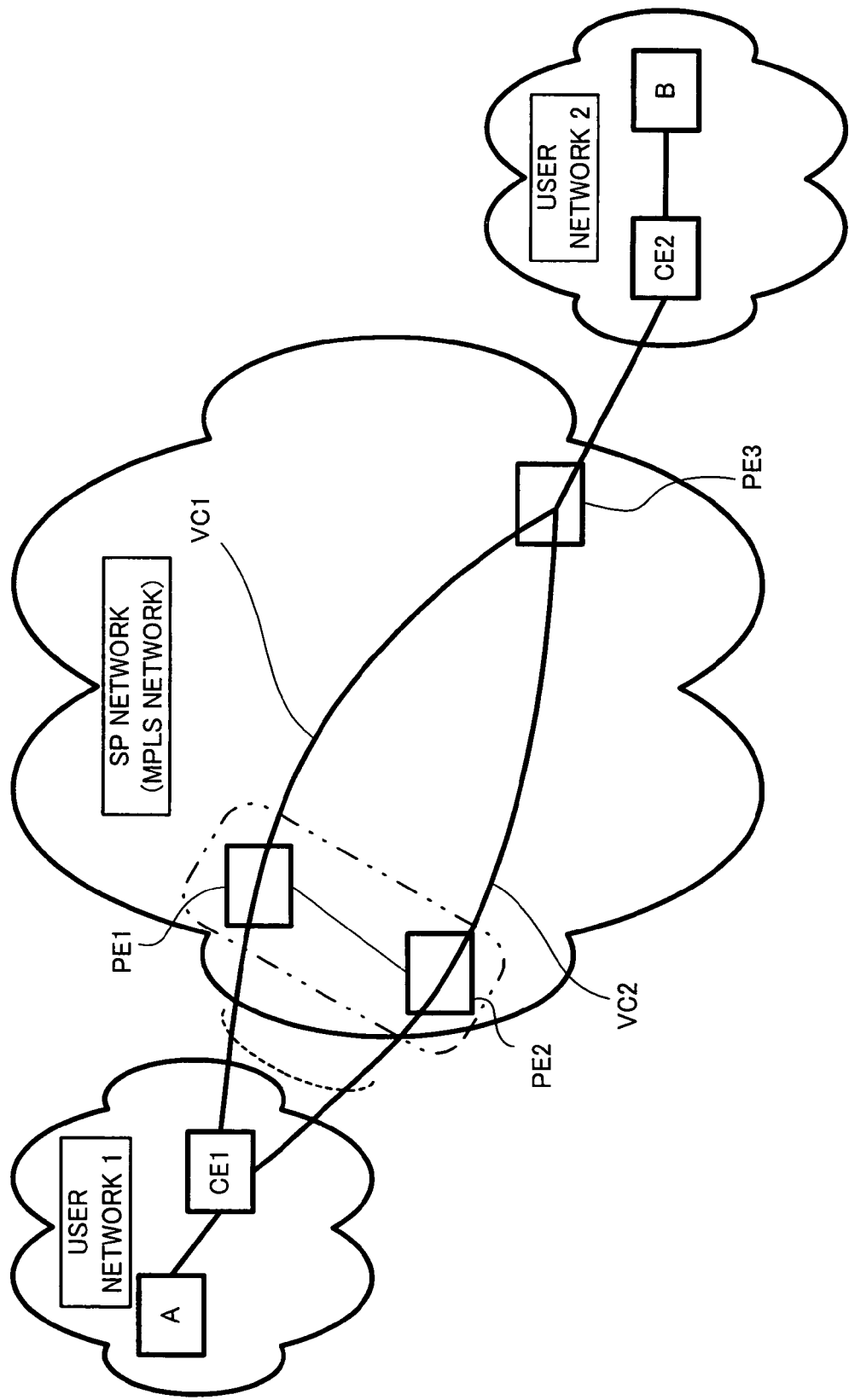
FIG. 1 is an illustration of a network in which the data communication system of the invention is implemented.

A. Network Configuration:

B. Embodiment 1:
   B-1. Virtual Circuit Setup Operation:
   B-2. Normal Operation:
   B-3. Operation During a Failure:
   B-4. Recovery Operation:
   B-5: Effects of the Embodiment:

C. Embodiment 2:
   C-1. Virtual Circuit Setup Operation:
   C-2. Normal Operation:
   C-3. Operation During a Failure:
   C-4. Recovery Operation:
   C-5: Effects of the Embodiment:

D. Embodiment 3:
   D-1. Virtual Circuit Setup Operation:
   D-2. Normal Operation:
   D-3. Operation During a Failure:
   D-4. Recovery Operation:
   D-5: Effects of the Embodiment:

E. Variations
   A. Network Configuration:

FIG. 1 is an illustration of a network in which the data communication system of the invention is implemented. As depicted in FIG. 1, this network constitutes a VPLS, with a MPLS network (SP network) provided by an SP mediating among user networks. Within the SP network there are a large number of network devices interconnected by circuits. The user networks and the SP network are interconnected by means of connections through circuits composed of Customer Edges CE present at the edge of the user networks, and Provider Edges PE1, PE2 and PE3 present at the edge of the SP network. In FIG. 1, a virtual circuit VC1 is set up between Provider Edges PE1 and PE3, and a virtual circuit VC2 is set up between Provider Edges PE2 and PE3.

In this network, multi-device link aggregation is implemented on two Provider Edges PE1, PE2 in the VPLS, so that the two Provider Edges PE1, PE2 are recognized as a single virtual device by the Customer Edge CE1 of the User Network 1. Control messages are routinely exchanged between the Provider Edges PE1 and PE2.

Within the User Network 1, the Customer Edge CE1 is connected to a host A, and the Customer Edge CE2 is connected to a host B.

In FIG. 1, all network devices, circuits, and user networks not needed for the description are omitted from the drawing in order to aid understanding. This convention will be used in subsequent drawings as well.

Figure 2:
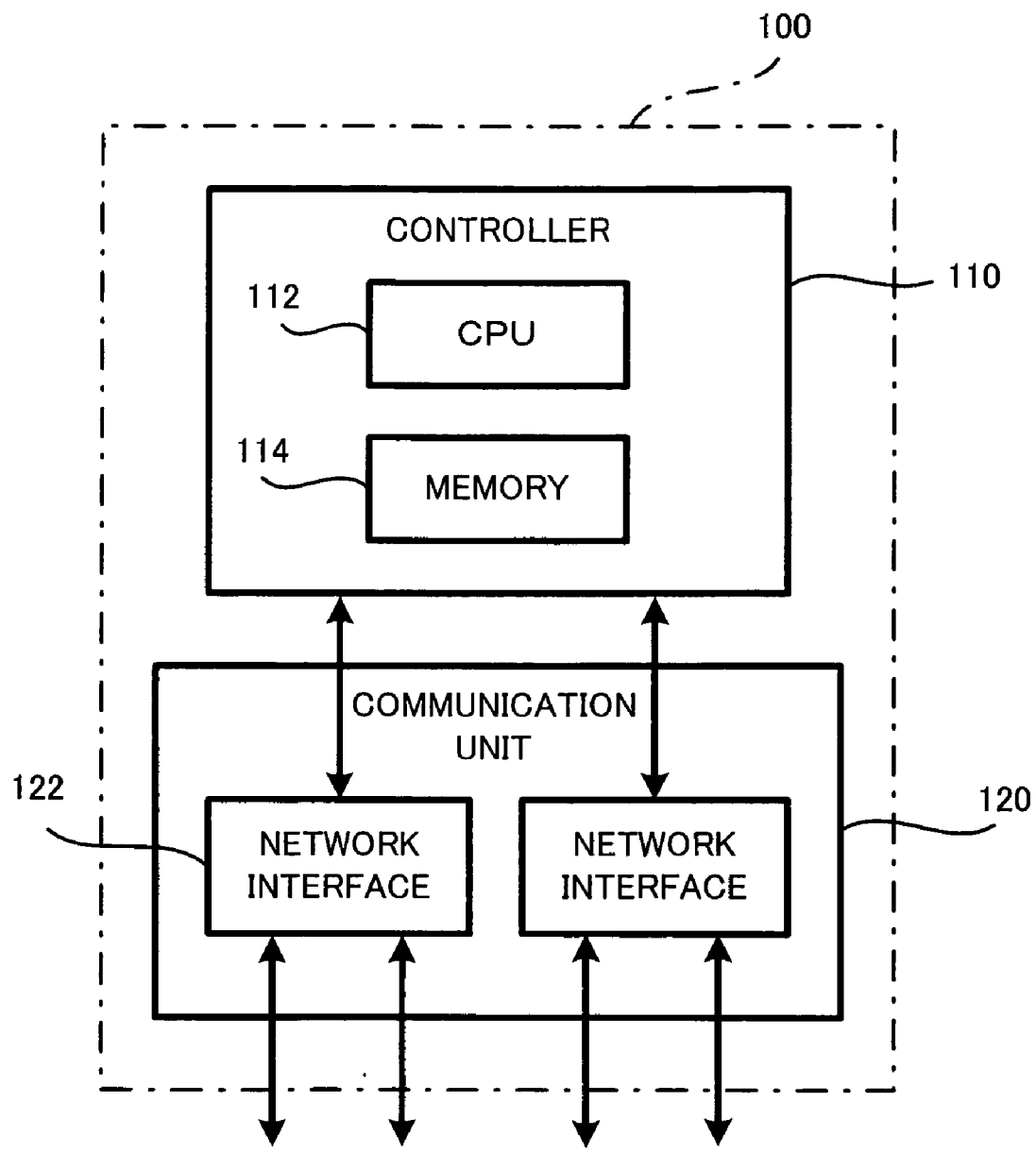
FIG. 2 is a block diagram depicting a switch arrangement that can be used as a Customer edge or a provider edge.

Here, where the Customer Edges CE1, CE2 and the Provider Edges PE1, PE2 are switches, they will have an arrangement such as that depicted in FIG. 2.

FIG. 2 is a block diagram depicting a switch arrangement that can be used as a customer edge or a provider edge. As shown in FIG. 2, a switch 100 comprises mainly a controller 110 and a communication portion 120. Of these, the controller 110 is furnished with a CPU 112 and memory 114; the CPU 112 executes a program stored in the memory 114 to carry out management of the device overall, packet processing, and so on. In the addition to the aforementioned program, the memory 114 also stores data, management tables needed for various purposes, and the like. The communication portion 120 comprises inter alia network interfaces 122, and carries out processes such as packet relay. Each network interface 122 is connected respectively via a port (not shown) to an Ethernet (TM) or similar physical circuit (e.g. twisted combination cable, optical fiber, etc.)

B. Embodiment 1:

The description now turns to a first embodiment of the invention. The description makes reference first to FIGS. 3A-3C and FIGS. 4A and 4B in relation to the virtual circuit setup operation and to normal operation; and subsequently to FIGS. 5A-5C and FIGS. 6A and 6B in relation to operation when a failure occurs, and to the recovery operation.

Figure 3A:
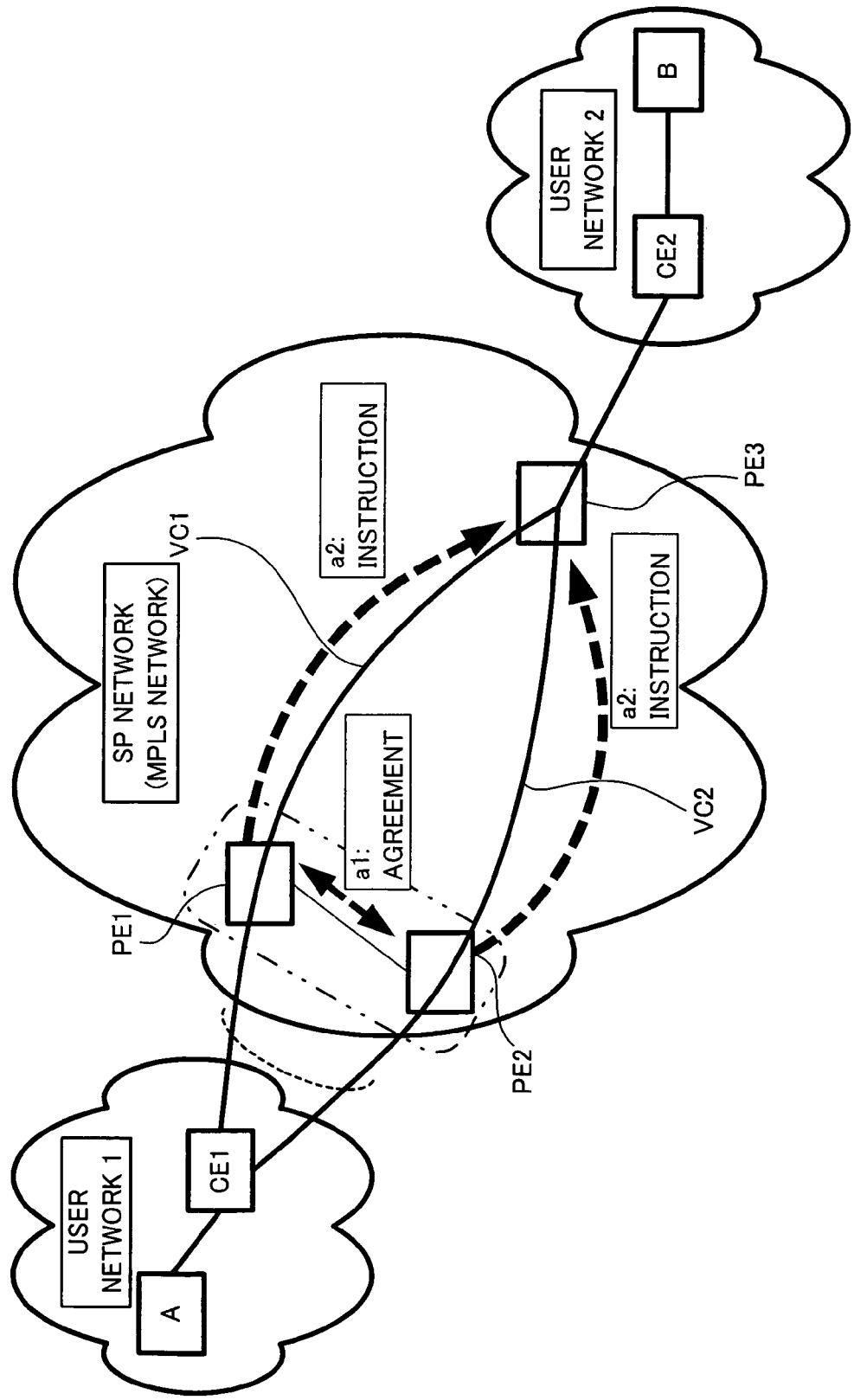
FIG. 3A is an illustration depicting the operation of setting up a virtual circuit (VC) in Embodiment 1 of the invention.
Figure 4A:
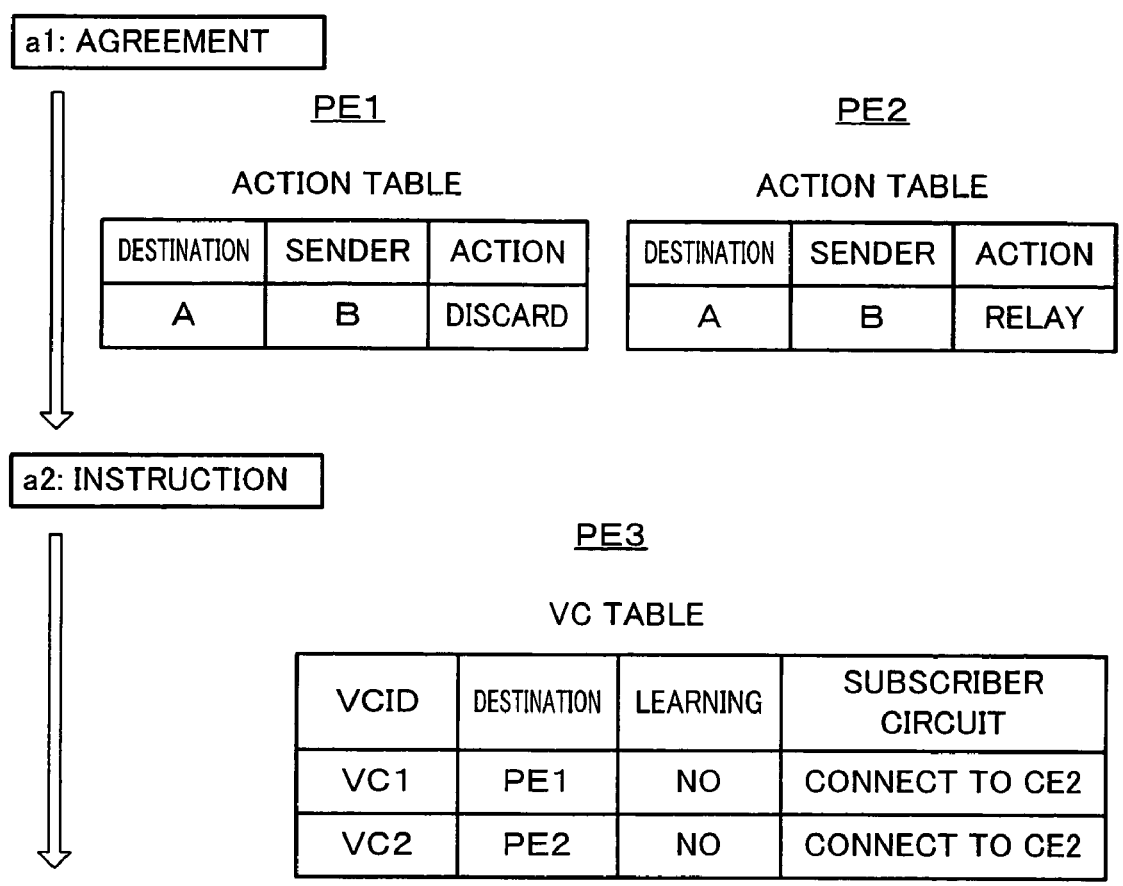
FIG. 4A is an illustration of management tables prepared in Provider Edges PE1, PE2, and PE3 respectively during setup operation of a virtual circuit (VC) in Embodiment 1 of the invention.

B-1. Virtual Circuit Setup Operation:

FIG. 3A is an illustration depicting the operation of setting up a virtual circuit (VC) in Embodiment 1 of the invention. FIG. 4A is an illustration of management tables prepared in Provider Edges PE1, PE2, and PE3 respectively during this time. The virtual circuit (VC) setup operation will be described in order of the operation steps, while referring to the drawings.

Step a1:

As shown in FIG. 3A, the controller 110 of the Provider Edge PE1 and the controller 110 of the Provider Edge PE2 negotiate between themselves an agreement relating to handling of packets received from virtual circuits (VC). Specifically, when the Provider Edge PE1 has received a packet from the set up virtual circuit VC1, and when the Provider Edge PE2 has received a packet from the set up virtual circuit VC2, they respectively agree on the basis of any of the Layer 2 (L2) to Layer 7 (L7) headers in a packet whether the received packet should be relayed or discarded.

The controller 110 of the Provider Edge PE1 and the controller 110 of the Provider Edge PE2 store in their respective memory 114 the result of the agreement, creating action tables like those depicted in FIG. 4A. In the example depicted in FIG. 4A, there is depicted an agreement whereby Provider Edge PE1 discards packets received from the virtual circuit VC1 destined for Host A and sent from Host B, while the Provider Edge PE2 relays packets received from the virtual circuit VC2 destined for Host A and sent from Host B.

Step a2:

As shown in FIG. 3A, the controller 110 of the Provider Edge PE1 and the controller 110 of the Provider Edge PE2 each send to a Provider Edge PE3 a VC setup message (Label Mapping) and by means of this message instruct it not to perform MAC learning of the virtual circuit (VC) set up between them. Here, MAC learning refers to viewing the MAC addresses of the destination and sender of a received packet, and learning which MAC addresses are associated with which ports or virtual circuits.

On the basis of this instruction, the controller 110 of the Provider Edge PE3 creates in memory 114 a VC table like that shown in FIG. 4A, and stores the content of the instruction. Specifically, the VC table records, for each virtual circuit (VC) being set up, the ID, destination, whether or not to perform MAC learning, and the subscriber circuit; for both of the set up virtual circuits VC1, VC2, no MAC learning is specified. As a result, in the Provider Edge PE3, when a packet is forwarded via the virtual circuit VC1 or VC2, MAC learning is not performed with regard to the packet destination or sender, or the virtual circuit.

In this way, the virtual circuit VC1 is set up between the Provider Edges PE1-PE3, and the virtual circuit VC2 is set up between the Provider Edges PE2-PE3.

Figure 3B:
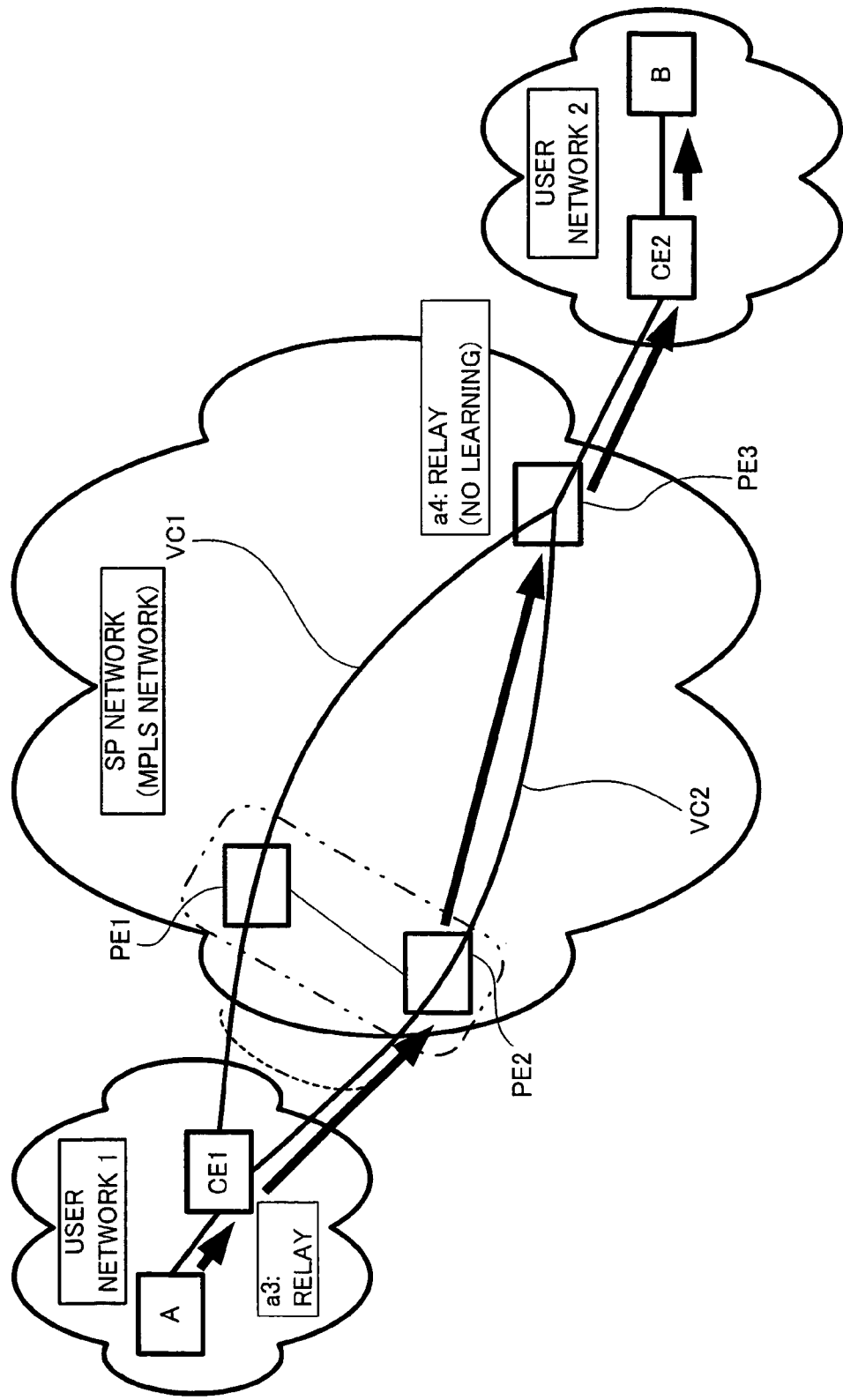
FIG. 3B is an illustration depicting normal operation in Embodiment 1 of the invention.
Figure 4B:
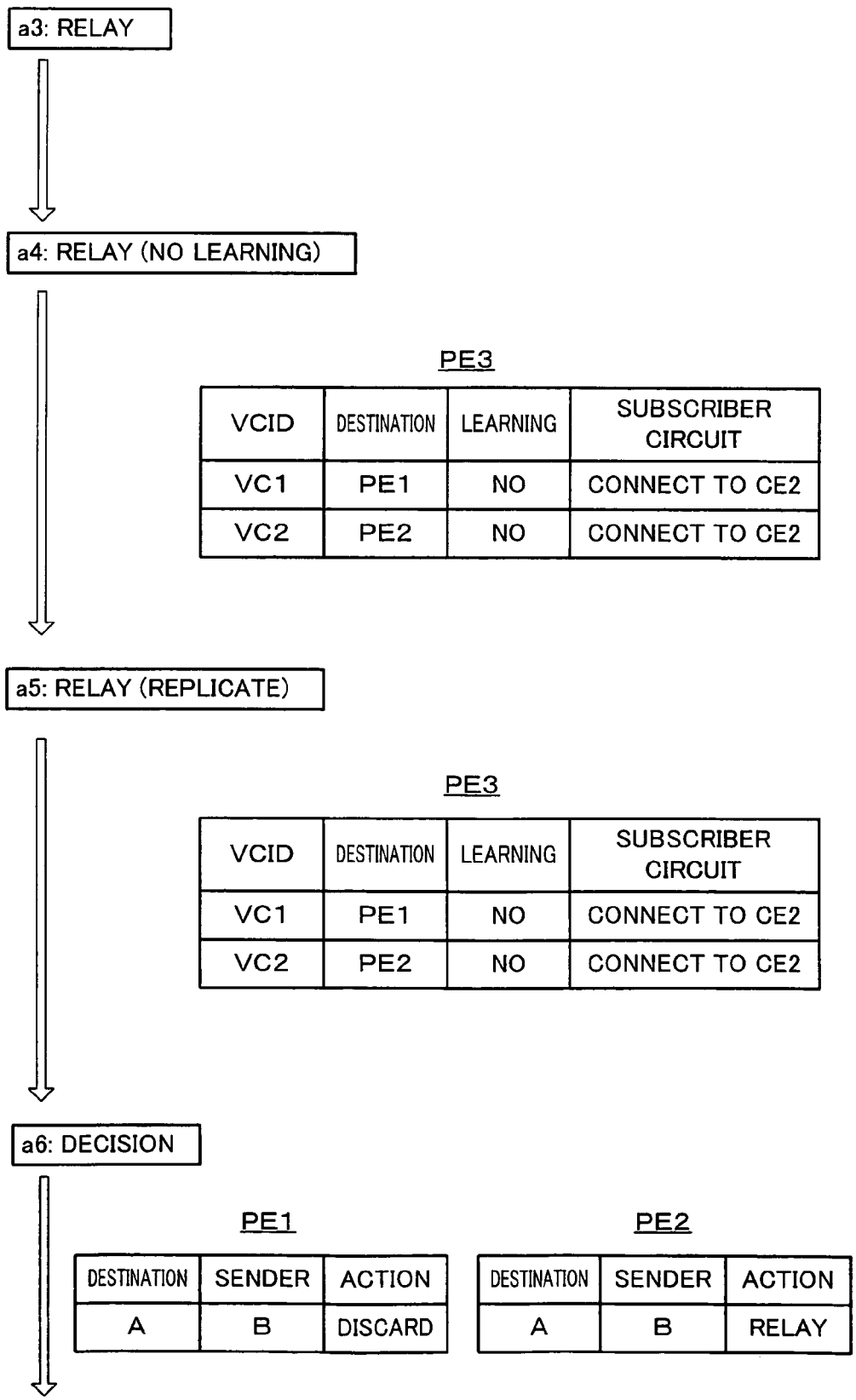
FIG. 4B is an illustration of management tables prepared in Provider Edges PE1, PE2, and PE3 respectively during normal operation of a virtual circuit (VC) in Embodiment 1 of the invention.

B-2. Normal Operation:

FIGS. 3B and 3C are illustrations depicting normal operation in this embodiment. FIG. 4B is an illustration of management tables prepared in Provider Edges PE1, PE2, and PE3 respectively during this time. The operation steps for normal operation will be described with reference to the drawings.

Step a3:

As shown in FIG. 3B, the Host A of the User Network 1 sends a packet to the Host B of the User Network 2. The controller 110 of the Customer Edge CE1, in accordance with a predetermined rule, relays the received packet to one Provider Edge PE among the two Provider Edges PE1, PE2 on which multi-device link aggregation has been implemented in the SP network. In this embodiment, these settings are such that the packet will be relayed to the Provider Edge PE2. The controller 110 of the Provider Edge PE2 then relays the received packet as-is to the Provider Edge PE3 via the virtual circuit VC2.

Step a4:

The controller 110 of the Provider Edge PE3 relays the received packet to Customer Edge CE2 of the User Network 2. At this time, the controller 110 of the Provider Edge PE3 refers to the VC table shown in FIG. 4B, and since the setting for the virtual circuit VC2 therein is no MAC learning, it relays the packet without performing learning for the packet destination or sender, or the virtual circuit. The controller 110 of the Customer Edge CE2 then relays the transmitted packet as-is to the Host B.

In this way, the packet sent from Host A is forwarded to the Host B.

Step a5:

Next, as shown in FIG. 3C, the Host B of the User Network 2 sends a packet addressed to the Host A of the User Network 1. The controller 110 of the Customer Edge CE1 relays the transmitted packet as-is to the Provider Edge PE3 in the SP network. As mentioned earlier, the Provider Edge PE3 does not perform MAC learning with respect to the virtual circuits VC1, VC2. Thus, the controller 110 of the Provider Edge PE3 replicates the packet sent from the Customer Edge CE2, and relays the two to the virtual circuits VC1 and VC2 respectively.

Step a6

When the controller 110 of the Provider Edge PE1 and the controller 110 of the Provider Edge PE2 receive the respective transmitted packets, they refer to their respective action tables and decide whether to relay or discard the received packets. In this embodiment, each action table records information like that shown in FIG. 4B; in Provider Edge PE1, the transmitted packet is discarded, while in Provider Edge PE2, the transmitted packet is relayed to the Customer Edge CE1 of the User Network 1. The controller 110 of the Customer Edge CE1 relays the transmitted packet as-is to the Host A.

In this way, packets sent from the Host B are forwarded to the Host A without proliferation en route.

Figure 5B:
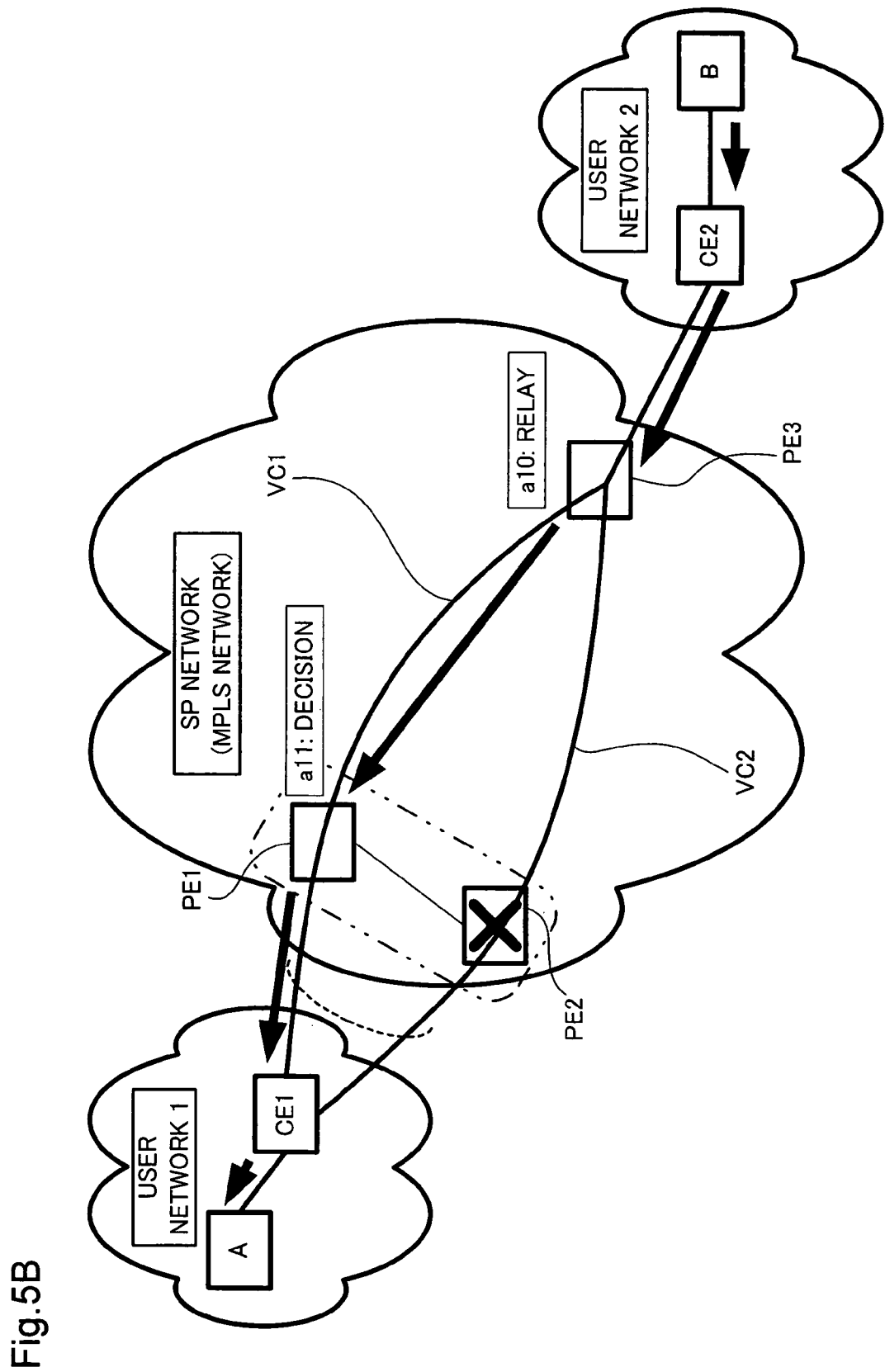
FIG. 5B is an illustration depicting operation when a failure occurs in Embodiment 1 of the invention.
Figure 5C:
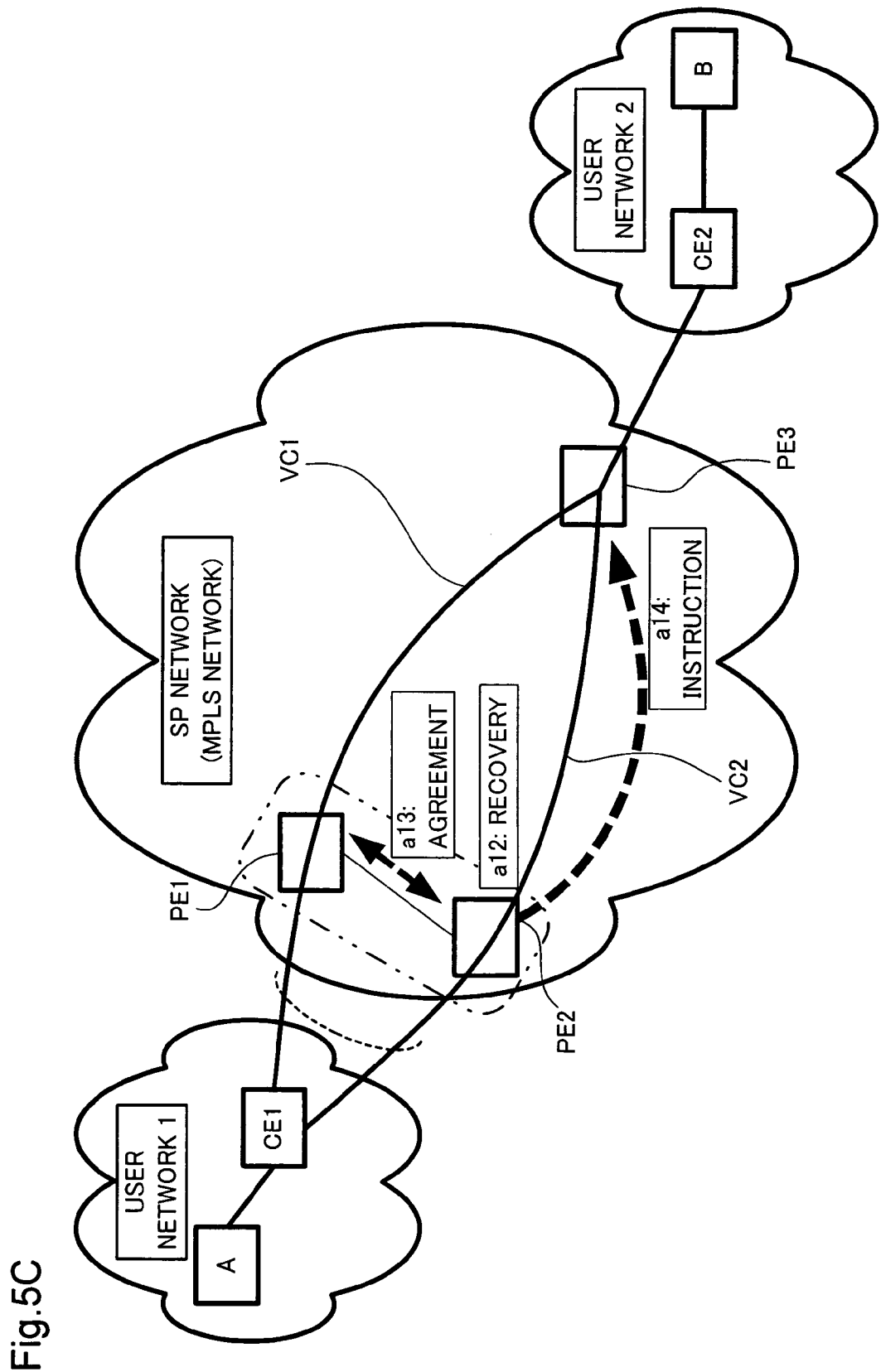
FIG. 5C is an illustration depicting operation during recovery in Embodiment 1 of the invention.
Figure 6A:
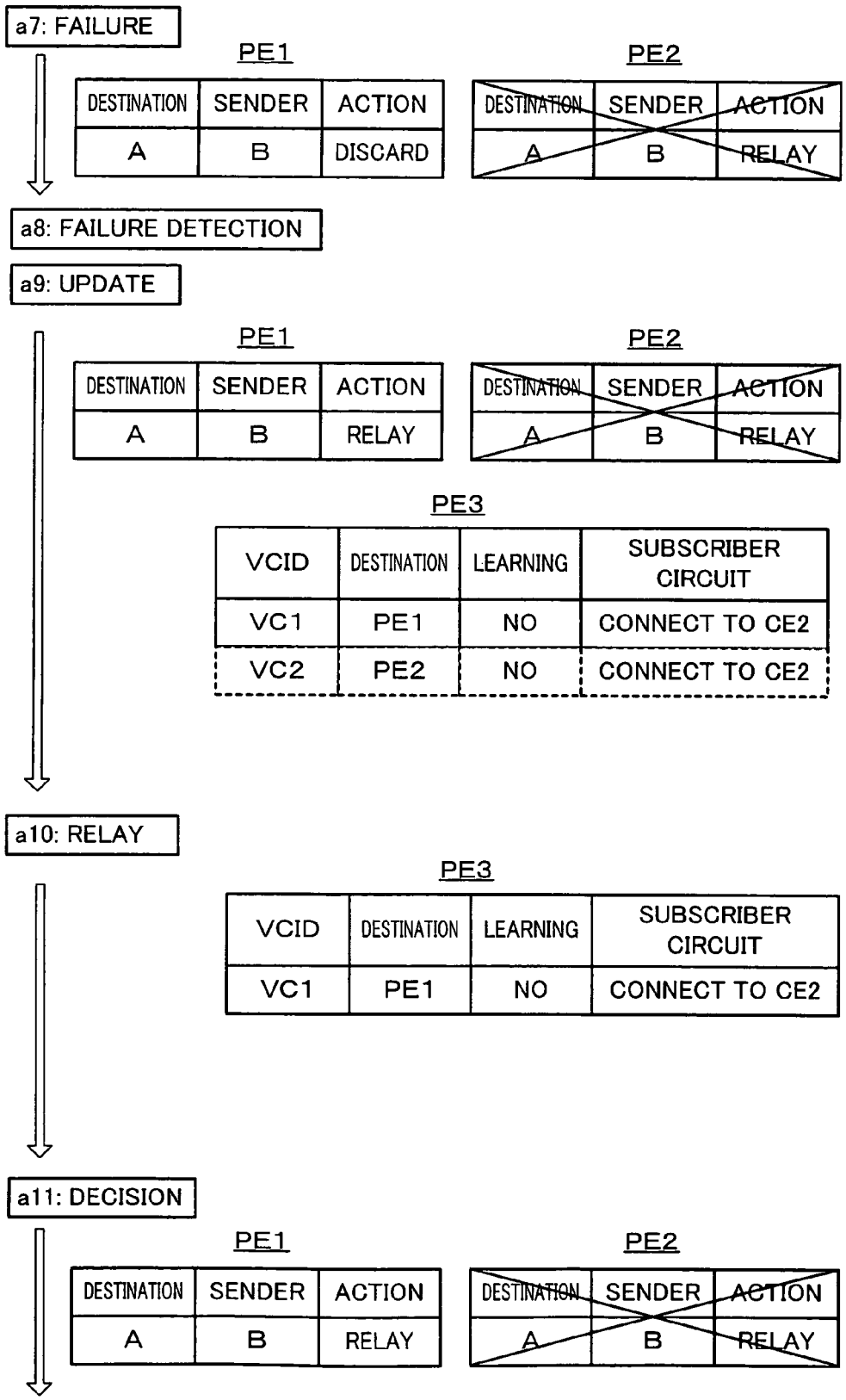
FIG. 6A is an illustration of management tables prepared in Provider Edges PE1, PE2, and PE3 respectively during operation when a failure occurs in Embodiment 1 of the invention.

B-3. Operation During a Failure:

FIGS. 5A and 5C are illustrations depicting operation when a failure occurs in the embodiment. FIG. 6A is an illustration of management tables prepared in Provider Edges PE1, PE2, and PE3 respectively during this time. The operation steps when a failure occurs will be described with reference to the drawings.

Steps a7, a8:

As shown in FIG. 5A, if a failure should occur in the Provider Edge PE2 for example, the controller 110 of the Provider Edge PE1 will detect the failure. As noted, control messages are routinely exchanged between the Provider Edges PE1 and PE2, so if the Provider Edge PE2 should fail, the controller 110 of the Provider Edge PE1 will subsequently be unsuccessful in attempts to exchange control messages, and will be able thereby to detect that the Provider Edge PE2 has failed. The occurrence of a failure in the Provider Edge PE2 means that the action table in the Provider Edge PE2 becomes unusable, as shown in FIG. 6A.

Step a9:

When a failure of Provider Edge PE2 has been detected in this way, the controller 110 of the Provider Edge PE1 immediately updates the action table in the Provider Edge PE1, so that packet forwarding will not be interrupted. Specifically, as depicted in FIG. 6A, whereas in accordance to the aforementioned agreement with the Provider Edge PE2, the setting in the action table in the Provider Edge PE1 is such that packets destined for A sent by B will be discarded, if this setting is left unmodified, packet forwarding will be interrupted; accordingly, the setting is modified so that such packets will now be relayed.

In the Provider Edge PE3 meanwhile, when a failure has been detected on Provider Edge PE2, content relating to the Provider Edge PE2 is deleted from the VC table in the Provider Edge PE3, to update the settings. As a result, as depicted in FIG. 6A, the content of the line for the virtual circuit VC2 is deleted from the VC table in the Provider Edge PE3.

Step a10:

As shown in FIG. 5B, a packet is sent from the Host B destined for the Host A. The controller 110 of the Customer Edge CE1 relays the transmitted packet as-is to the Provider Edge PE3. In the Provider Edge PE3, in accordance with the VC table, the packet sent from the Customer Edge CE2 is relayed to the virtual circuit VC1.

Step a11:

When the controller 110 of the Provider Edge PE1 receives the transmitted packet, referring to the updated action table it decides whether to relay or discard the received packet. As noted, in Step a9, the setting for packets destined for the Host A sent by the Host B was updated in the action table of the Provider Edge PE1 to "relay" as shown in FIG. 6A; accordingly, in the Provider Edge PE1 the transmitted packet is relayed and sent on to the Customer Edge CE1. The controller 110 of the Customer Edge CE1 then relays the transmitted packet as-is to the Host A.

In this way, packets sent from the Host B are forwarded to the Host A without being slowed down en route.

Figure 6B:
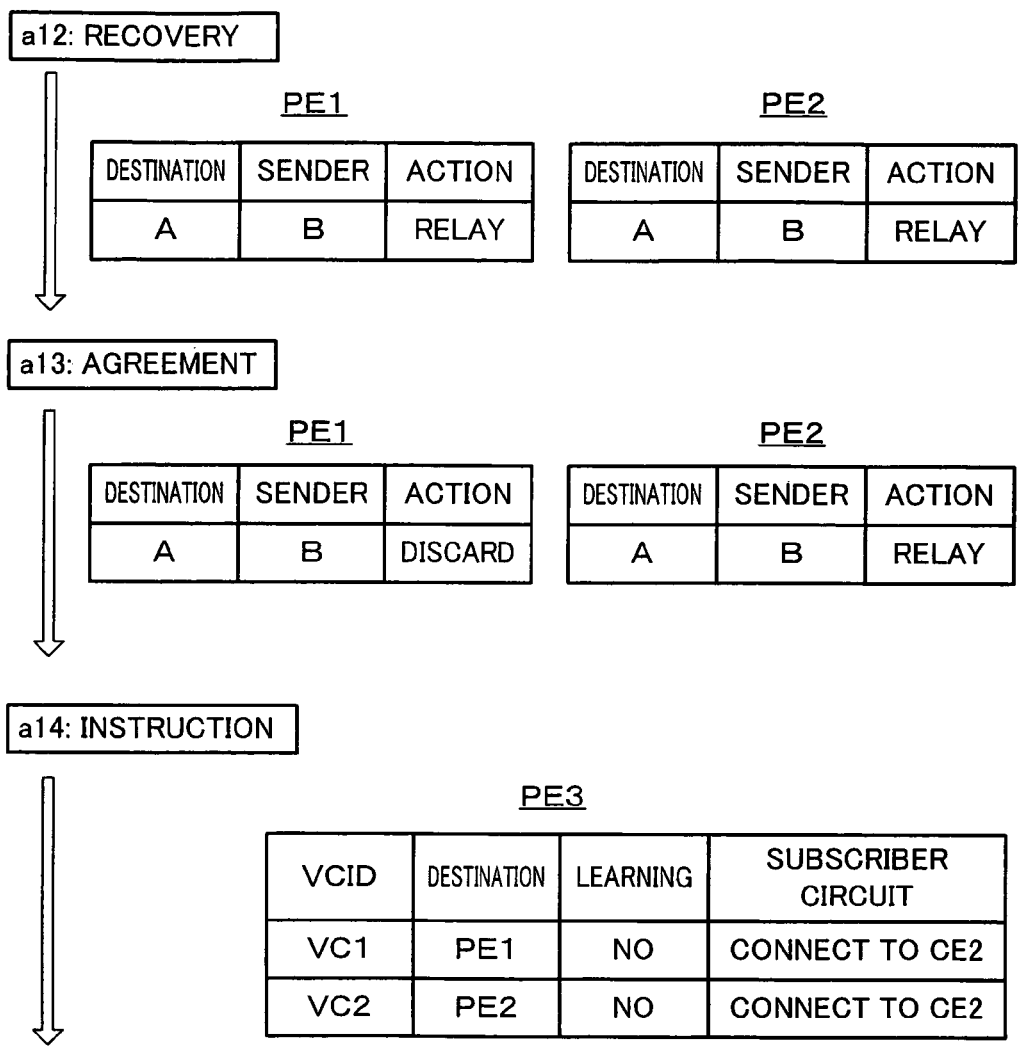
FIG. 6B is an illustration of management tables prepared in Provider Edges PE1, PE2, and PE3 respectively during operation during recovery in Embodiment 1 of the invention.

B-4. Recovery Operation:

FIG. 5C is an illustration depicting operation during recovery in the embodiment. FIG. 6B is an illustration of management tables prepared in Provider Edges PE1, PE2, and PE3 respectively during this time. The operation steps of the recovery operation will be described with reference to the drawings.

Steps a12, a13:

As shown in FIG. 5C, if the Provider Edge PE2 should recover from a failure, exchange of control messages will resume between the controller 110 of the Provider Edge PE2 and the Provider Edge PE1, and accordingly the controller 110 of the Provider Edge PE1 will detect that the Provider Edge PE2 has recovered. Subsequently, in the same way as in Step a1, the controller 110 of the Provider Edge PE1 and the controller 110 of the Provider Edge PE2 will again negotiate between themselves an agreement relating to handling of packets received from virtual circuits (VC), and store the results of the agreement in their respective action tables, as shown in FIG. 6B. In the example shown in FIG. 6B, the agreement is that the Provider Edge PE1 will discard packets received from the virtual circuit VC1 and sent from Host B destined for Host A, while the Provider Edge PE2 will relay packets received from the virtual circuit VC2 and sent from Host B destined for Host A.

Step a14:

As shown in FIG. 5C, the controller 110 of the recovered Provider Edge PE2 sends the Provider Edge PE3 a VC setup message, and using the message instructs it to not perform MAC learning for the virtual circuit VC2 set up between them.

On the basis of this instruction, the controller 110 of the Provider Edge PE3 appends content relating to the virtual circuit VC2 to the VC table as shown in FIG. 6B. Specifically, the VC table specifies that MAC learning not be performed for the virtual circuit VC2.

In this way, the virtual circuit VC2 is established between the recovered Provider Edge PE2, and the Provider Edge PE3.

B-5: Effects of the Embodiment:

According to this embodiment, in the event of packet forwarding from the Host B to the Host A, in the Provider Edge PE3 the packet will be replicated and relayed respectively to both of the virtual circuits VC1, VC2, whereas in the Provider Edges PE1 and PE2, in accordance with a preestablished agreement, in one of the Provider Edges (PE2 in the preceding example) transmitted packets will be relayed, while in the other Provider Edge (PE1 in the preceding example), transmitted packets will be discarded, so that duplicates of a given packet are not forwarded to the Host A and normal packet forwarding can be carried out.

Additionally, according to this embodiment, multi-device link aggregation is implemented on the Provider Edges PE1, PE2, whereby if one of the Provider Edges (PE2 in the preceding example) should fail, the settings based on the aforementioned agreement will be updated in the other Provider Edge (PE1 in the preceding example), so that even if the previous setting was to discard transmitted packets, the setting will be updated so that these are now relayed, so that packet forwarding is not interrupted.

C. Embodiment 2:

Next, a second embodiment of the invention will be described. The description makes reference first to FIGS. 7A-7C and FIGS. 8A-8C in relation to the virtual circuit setup operation and to normal operation; and subsequently to FIGS. 9A-9C and FIGS. 10A-10C in relation to operation when a failure occurs, and to the recovery operation. In this embodiment, within the User Network 2, two hosts B1, B2 are each connected to a Customer Edge CE2.

Figure 7A:
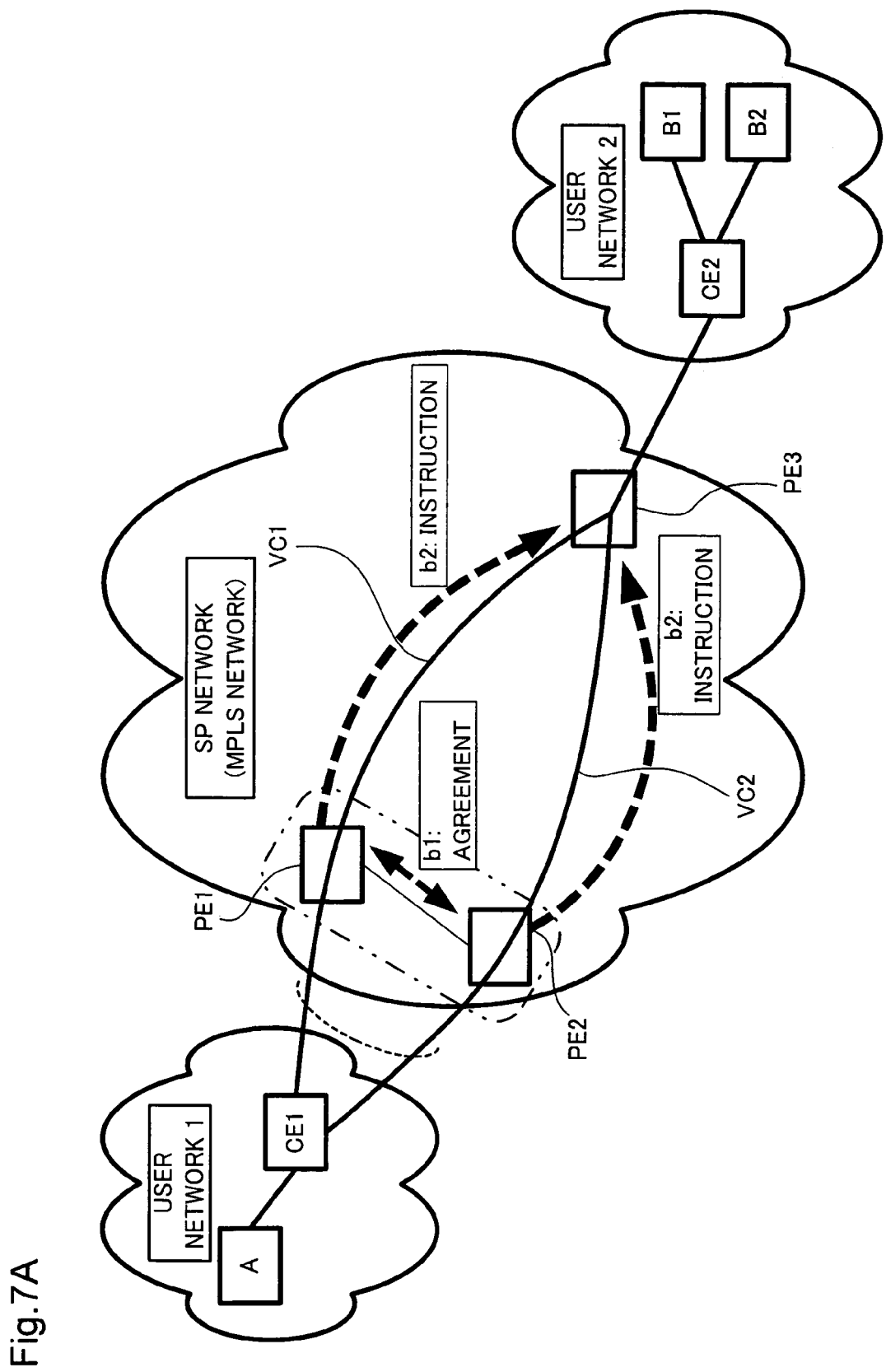
FIG. 7A is an illustration depicting the operation of setting up a virtual circuit (VC) in Embodiment 2 of the invention.
Figure 7D:
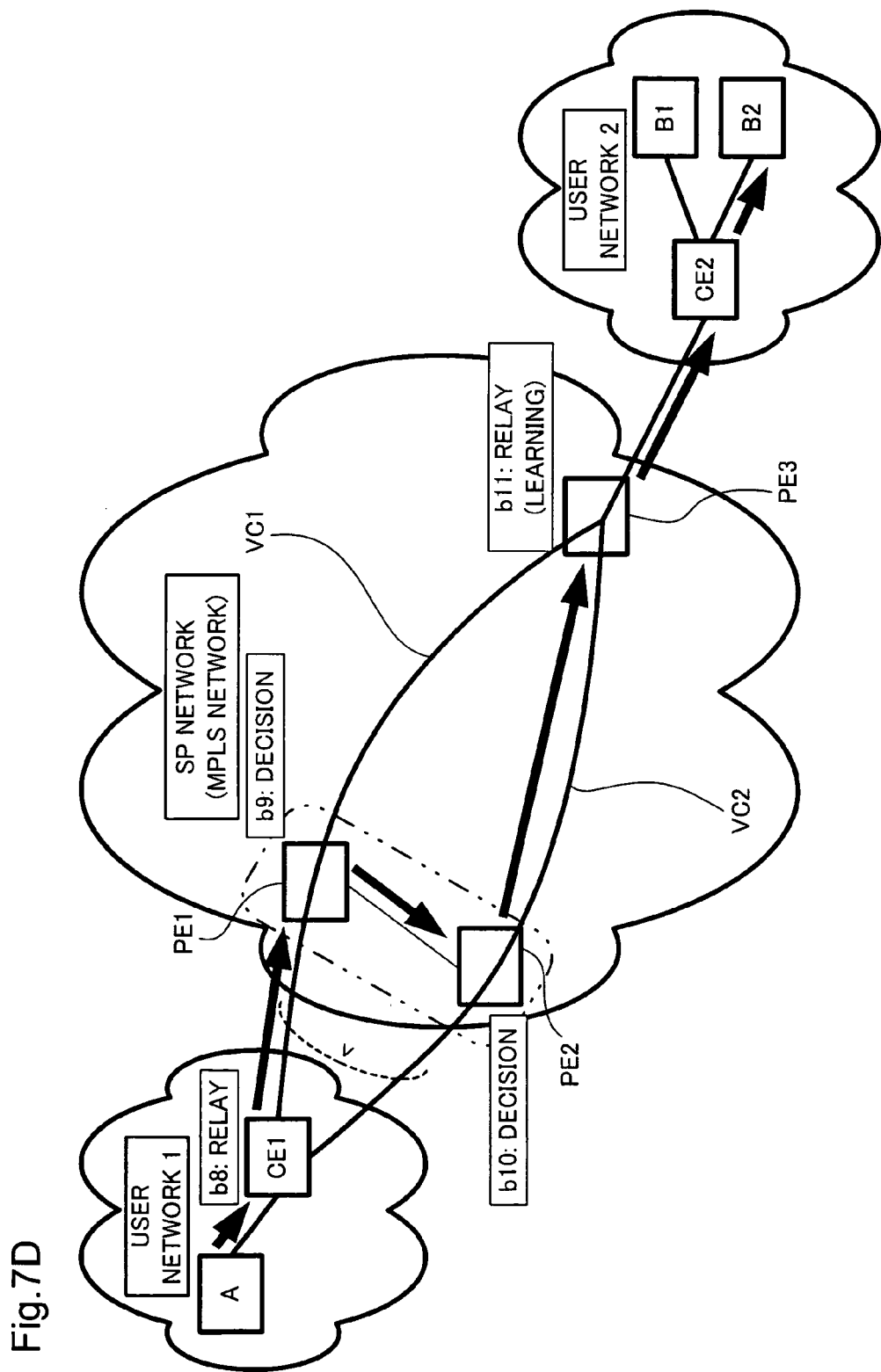
FIG. 7D is an illustration depicting normal operation in Embodiment 2 of the invention.
Figure 8A:
FIG. 8A is an illustration of management tables prepared in Provider Edges PE1, PE2, and PE3 respectively during setup operation of a virtual circuit (VC) in Embodiment 2 of the invention.
Figure 8A:
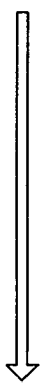

C-1. Virtual Circuit Setup Operation:

FIG. 7A is an illustration depicting the operation of setting up a virtual circuit (VC) in Embodiment 2 of the invention. FIG. 8A is an illustration of management tables prepared in Provider Edges PE1, PE2, and PE3 respectively during this time. The virtual circuit (VC) setup operation will be described in order of the operation steps, while referring to the drawings.

Step b1:

As shown in FIG. 7A, the controller 110 of the Provider Edge PE1 and the controller 110 of the Provider Edge PE2 negotiate between themselves an agreement relating to handling of packets received from virtual circuits (VC). Specifically, when the Provider Edge PE1 has received a packet from the set up virtual circuit VC1, and when the Provider Edge PE2 has received a packet from the set up virtual circuit VC2, they respectively agree, on the basis of any of the Layer 2 (L2) to Layer 7 (L7) headers or combination thereof in a packet, whether the received packet should be relayed or discarded.

The controller 110 of the Provider Edge PE1 and the controller 110 of the Provider Edge PE2 store in their respective memory 114 the result of the agreement, creating action tables like those depicted in FIG. 8A. In the example depicted in FIG. 8A, there is depicted an agreement whereby Provider Edge PE1 relays packets received from the virtual circuit VC1 and sent from Host B1 destined for Host A, while discarding packets sent from Host B2 destined for Host A; while the Provider Edge PE2 discards packets received from the virtual circuit VC2 destined for Host A and sent from Host B1, while relaying packets destined for Host A and sent from Host B2.

Step b2:

As shown in FIG. 7A, the controller 110 of the Provider Edge PE1 and the controller 110 of the Provider Edge PE2 each send to the Provider Edge PE3 a VC setup message and by means of this message instruct it to perform MAC learning of virtual circuits (VC) set up between them.

On the basis of this instruction, the controller 110 of the Provider Edge PE3 creates in memory 114 a VC table like that shown in FIG. 8A, and stores the instructed content. Specifically, the VC table records, for the virtual circuits VC1, VC2 being set up, that MAC learning shall be performed for each. As a result, in the Provider Edge PE3, when a packet is forwarded via the virtual circuit VC1 or VC2, MAC learning is performed with regard to the packet destination and sender. In the VPLS standard, it is a basic principle that MAC learning is performed, and thus in actual practice there is no need to explicitly instruct by means of a VC setup message that MAC learning be performed, it being sufficient to send a VC setup message in accordance with the standard.

In this way, the virtual circuit VC1 is set up between the Provider Edges PE1-PE3, and the virtual circuit VC2 is set up between the Provider Edges PE2-PE3.

C-2. Normal Operation:

FIGS. 7B, 7C, 7D and 7E are illustrations depicting normal operation in this embodiment. FIGS. 8B and 8C are illustrations of management tables prepared in Provider Edges PE1, PE2, and PE3 respectively during this time. The operation steps for normal operation will be described with reference to the drawings.

Step b3:

As shown in FIG. 7B, when the Host A of the User Network 1 sends a packet destined for the Host B1 of the User Network 2 for example, the controller 110 of the Customer Edge CE1, in accordance with a predetermined rule, relays the received packet to one Provider Edge PE among the two Provider Edges PE1, PE2 on which multi-device link aggregation has been implemented in the SP network. In this embodiment, these settings are such that the packet will be relayed to the Provider Edge PE1.

Step b4:

When the controller 110 of the Provider Edge PE1 receives the transmitted packet, it first analyzes the Layer 2 (L2)-Layer 7 (L7) headers in the packet and acquires the destination/sender combination of the packet; next, it interchanges the destination and sender to derive a new combination. In this case, the destination of the transmitted packet is the Host B1 and the sender is the Host A, so the combination acquired through analysis (destination, sender)=(B1, A). Next, when the destination and sender are subsequently interchanged, the destination is now the Host A and the sender is the Host B1, so the derived new combination (destination, sender)=(A, B1).

Referring to the updated action table shown in FIG. 8B, the controller 110 of the Provider Edge PE1 decides for the new combination so derived whether the combination is set to "relay" or set to "discard." In this case, the new combination (destination, sender)=(A, B1), and the setting for the combination in the action table of the Provider Edge PE1 is "relay." Where the combination is set to "relay" the controller 110 of the Provider Edge PE1 relays the received packet as-is, sending it to the Provider Edge PE3 via the virtual circuit VC1. The case where the setting is "discard" will be described later.

Step b5:

The controller 110 of the Provider Edge PE3 receives the transmitted packet and relays it to the Customer Edge CE2 of the User Network 2. At this time, the controller 110 of the Provider Edge PE3 refers to the VC table depicted in FIG. 8B, and since the setting therein for the virtual circuit VC1 is that MAC learning shall be performed, it performs learning for the packet destination and sender, and the virtual circuit. Specifically, it analyzes the Layer 2 (L2)-Layer 7 (L7) headers in the received packet and acquires the destination and sender of the packet, while acquiring the name of the virtual circuit (VC) over which the packet was sent. It then creates in memory 114 a learning table like that shown in FIG. 8B, and having interchanged the acquired destination and sender, stores the combination of destination, sender, and virtual circuit, together with the name of the virtual circuit (VC). In this case, the destination acquired from the header is the Host B1, the sender is the Host A, and the sending virtual circuit is VC1, so having interchanged the destination and sender and combined them with the name of the virtual circuit (VC), the stored combination (destination, sender, virtual circuit)=(A, B1, VC1).

Next, the controller 110 of the Customer Edge CE2 receives the packet sent by the Provider Edge PE3, and relays it as-is to the Host B1.

In this way, packets sent from the Host A are forwarded to the Host B1.

Step b6:

Next, as shown in FIG. 7C, when the Host B1 of the User Network 2 sends a packet to the Host A of the User Network 1 for example, the controller 110 of the Customer Edge CE1 relays the transmitted packet as-is to the Provider Edge PE3 in the SP network. As noted previously since MAC learning is performed in the Provider Edge PE3 for the virtual circuits VC1, VC2, when the controller 110 of the Provider Edge PE3 receives the packet sent by the Customer Edge CE2, it analyzes the Layer 2 (L2)-Layer 7 (L7) headers in the packet and acquires the destination and sender. Then, referring to the learning table shown in FIG. 8B, it selects a virtual circuit (VC) over which the packet will be sent. In this case, since the destination acquired from the header is the Host A and the sender is the Host B1, on the basis of the learning table, VC1 will be selected as the virtual circuit (VC) for sending the packet. As a result, the controller 110 of the Provider Edge PE3 relays the received packet over the selected virtual circuit VC1 only.

Step b7:

When the controller 110 of the Provider Edge PE1 receives the transmitted packet, referring the action table, it decides whether to relay or discard the received packet. As shown in FIG. 8B, the action table of the Provider Edge PE1 indicates "relay" for packets with the Host A as the destination and the Host B1 as the sender, so in the Provider Edge PE1 the transmitted packet is relayed to the Customer Edge CE1 of the User Network 1. The controller 110 of the Customer Edge CE1 then relays the transmitted packet as-is to the Host A.

In this way, packets sent from the Host B1 are forwarded to the Host A without proliferation en route.

Step b8:

When the Host A of the User Network 1 now sends a packet to the Host B2 of the User Network 2 as depicted in FIG. 7C, in accordance with a predetermined rule the controller 110 of the Customer Edge CE1 relays the transmitted packet to one Provider Edge PE selected from the two Provider Edges PE1, PE2 on which multi-device link aggregation has been implemented. In this embodiment, settings are such that packets will be relayed to the Provider Edge PE1.

Step b9:

When the controller 110 of the Provider Edge PE1 receives the transmitted packet, in the same manner as in Step b4 it analyzes the Layer 2 (L2)-Layer 7 (L7) headers in the packet and acquires the destination and sender of the packet. Next, it interchanges the destination and sender to derive a new combination. In this case, the destination of the transmitted packet is the Host B2 and the sender is the Host A, so the combination acquired through analysis (destination, sender)=(B2, A). Next, when the destination and sender are interchanged, the destination is now the Host A and the sender is the Host B2, so the new derived combination (destination, sender)=(A, B2).

Referring to the updated action table shown in FIG. 8C, the controller 110 of the Provider Edge PE1 decides for the new combination so derived whether the combination is set to "relay" or set to "discard." In this case, the new combination (destination, sender)=(A, B2), and the setting for the combination in the action table of the Provider Edge PE1 is "discard." Where the combination is set to "discard" the controller 110 of the Provider Edge PE1 sends the received packet to the Provider Edge PE2, in which according to the aforementioned agreement the setting should be "relay."

Step b10:

When the controller 110 of the Provider Edge PE2 receives the transmitted packet, in the same manner as in Steps b4 and b9 it analyzes the Layer 2 (L2)-Layer 7 (L7) headers in the packet and acquires the destination and sender combination of the packet. In this case, the destination is the Host B2 and the sender is the Host A, so the acquired combination (destination, sender)=(B2, A). Next, the destination and the sender are interchanged to derive a new combination. In this case, once the destination and the sender have been interchanged, the destination is now the host A and the sender is the Host B2, so the new acquired combination (destination, sender)=(A, B2). For this new acquired combination, reference is made to the action table depicted in FIG. 8C to determine whether the combination is set to "relay" or set to "discard." In this case, the new combination (destination, sender)=(A, B2), and in the action table of the Provider Edge PE2 the setting for this combination is "relay." Where the controller 110 of the Provider Edge PE2 determines that the combination is set to "relay" the received packet is relayed as-is, and sent on to the Provider Edge PE3 via the virtual circuit VC2.

Step b11:

The controller 110 of the Provider Edge PE3 receives the transmitted packet and relays it to the Customer Edge CE2 of the User Network 2. At this time, the controller 110 of the Provider Edge PE3 refers to the VC table depicted in FIG. 8C, and since the setting therein for the virtual circuit VC2 is that MAC learning shall be performed, it performs learning for the received packet destination and sender, and the virtual circuit. In this case, the destination acquired from the header is the Host B2, the sender is the Host A, and the sending virtual circuit is VC2, so having interchanged the destination and sender and combined these with the name of the virtual circuit (VC), the combination stored in the learning table is (destination, sender, virtual circuit)=(A, B2, VC2).

Next, the controller 110 of the Customer Edge CE2 receives the packet sent by the Provider Edge PE3, and relays it as-is to the Host B2.

In this way, packets sent from the Host A are forwarded to the Host B2.

Figure 7E:
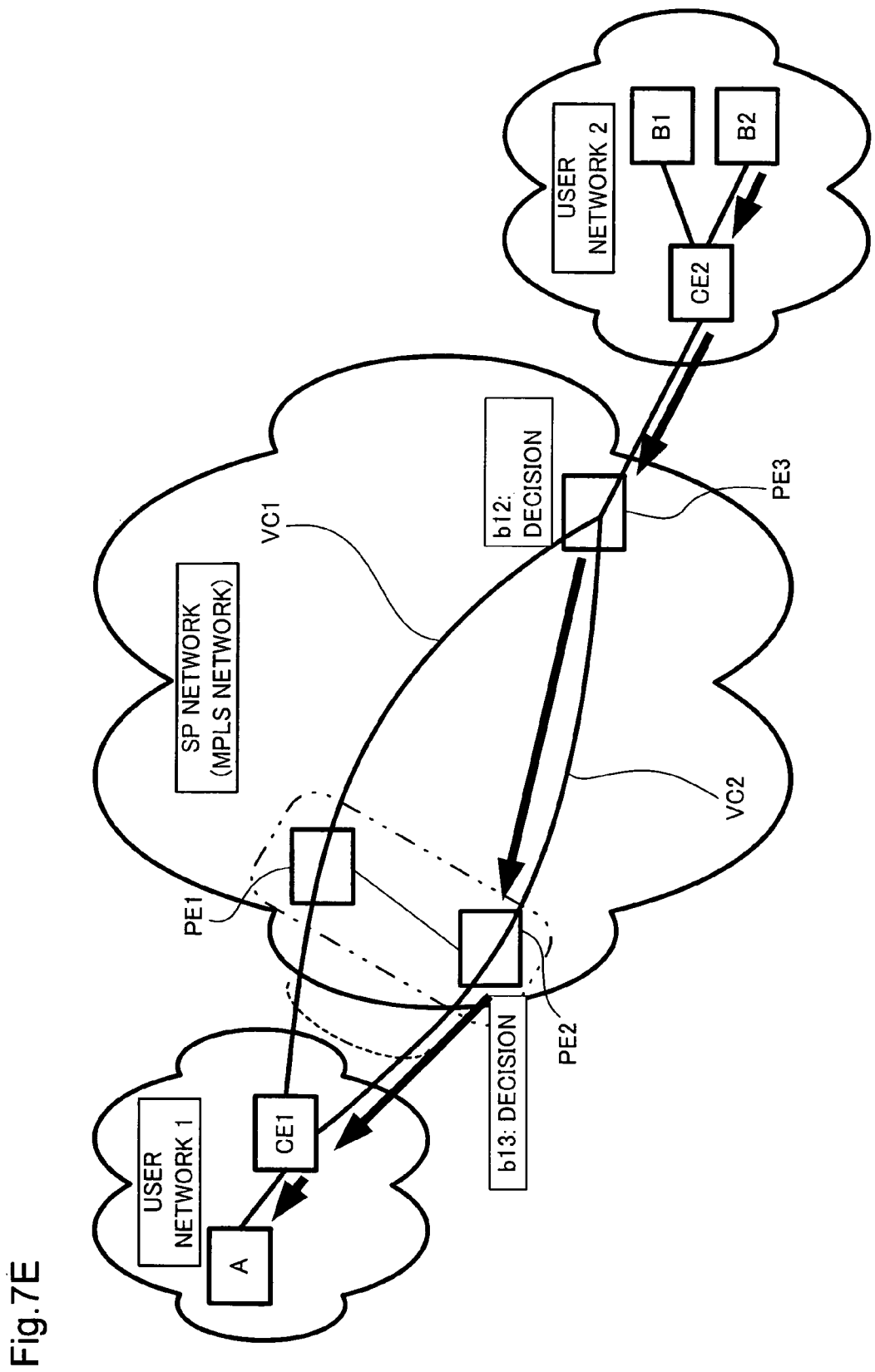
FIG. 7E is an illustration depicting normal operation in Embodiment 2 of the invention.
Figure 8B:
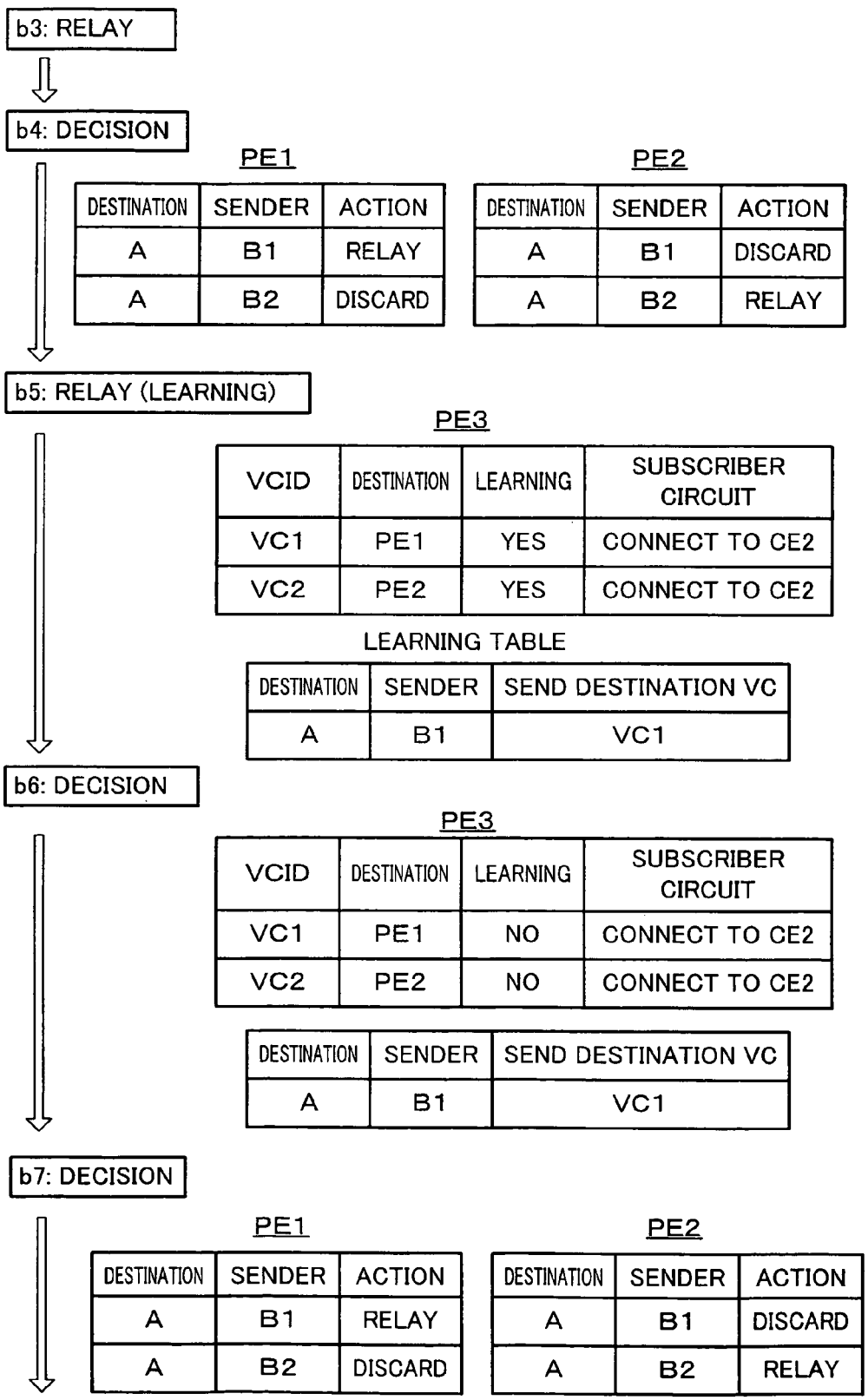
FIG. 8B is an illustration of management tables prepared in Provider Edges PE1, PE2, and PE3 respectively during normal operation of a virtual circuit (VC) in Embodiment 2 of the invention.
Figure 8C:
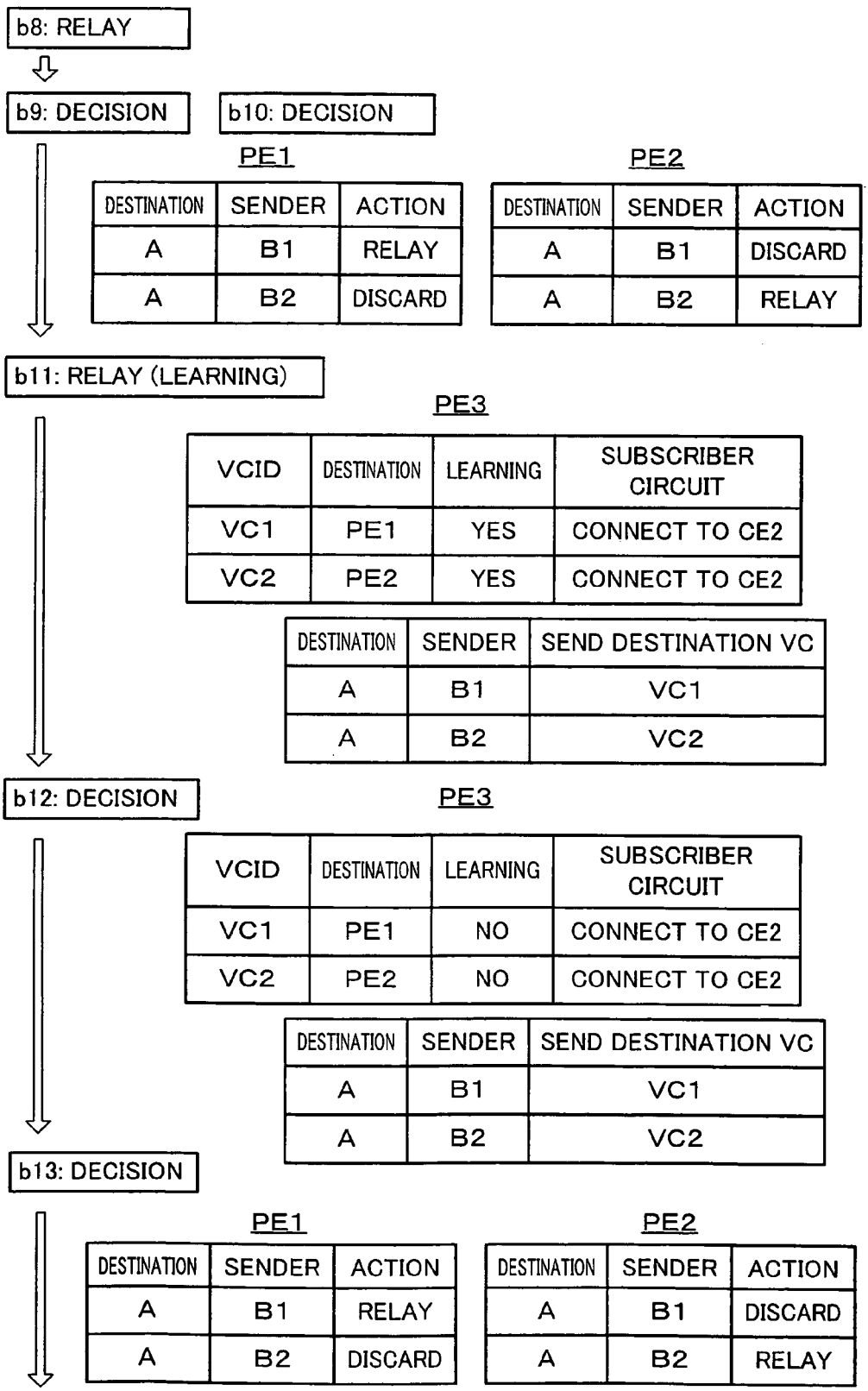
FIG. 8C is an illustration of management tables prepared in Provider Edges PE1, PE2, and PE3 respectively during normal operation of a virtual circuit (VC) in Embodiment 2 of the invention.

Step b12:

Next, as shown in FIG. 7E, when the Host B2 of the User Network 2 sends a packet to the Host A of the User Network 1 for example, the controller 110 of the Customer Edge CE1 relays the transmitted packet as-is to the Provider Edge PE3 in the SP network. As noted previously since MAC learning is performed in the Provider Edge PE3 for the virtual circuits VC1, VC2, when the controller 110 of the Provider Edge PE3 receives the packet sent by the Customer Edge CE2, it analyzes the Layer 2 (L2)-Layer 7 (L7) headers in the packet and acquires the destination and sender. Then, referring to the learning table shown in FIG. 8C, it selects a virtual circuit (VC) over which the packet will be sent. In this case, since the destination acquired from the header is the Host A and the sender is the Host B2, on the basis of the learning table, VC2 will be selected as the virtual circuit (VC) for sending the packet. As a result, the controller 110 of the Provider Edge PE3 relays the received packet over the selected virtual circuit VC2 only.

Step b13:

When the controller 110 of the Provider Edge PE2 receives the transmitted packet, referring the action table, it decides whether to relay or discard the received packet. As shown in FIG. 8C, the action table of the Provider Edge PE2 indicates "relay" for packets with the Host A as the destination and the Host B2 as the sender, so in the Provider Edge PE2 the transmitted packet is relayed to the Customer Edge CE1 of the User 1 network. The controller 110 of the Customer Edge CE1 then relays the transmitted packet as-is to the Host A.

In this way, packets sent from the Host B2 are forwarded to the Host A without proliferation en route.

Figure 9A:
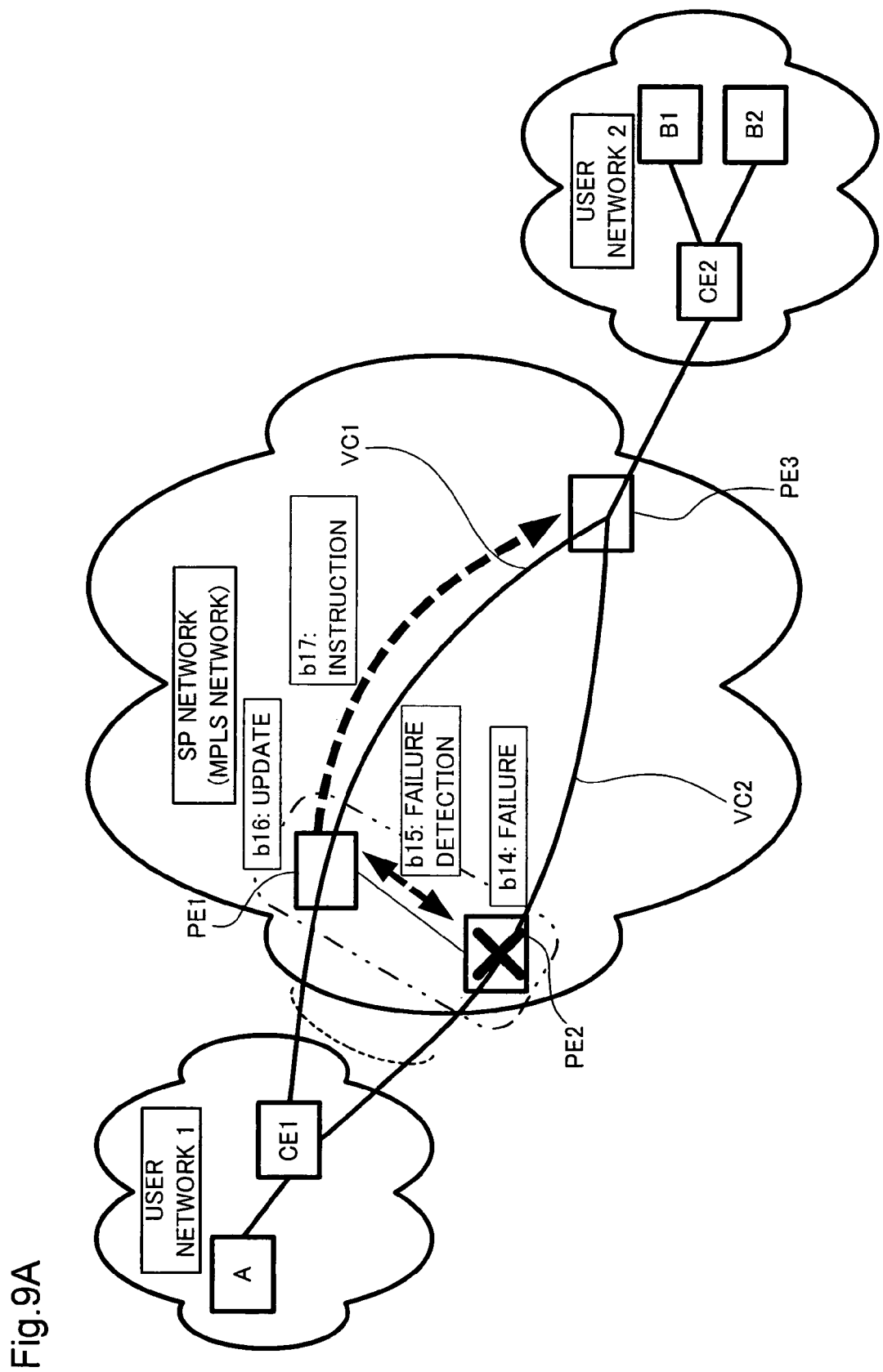
FIG. 9A is an illustration depicting operation when a failure occurs in Embodiment 2 of the invention.
Figure 9B:
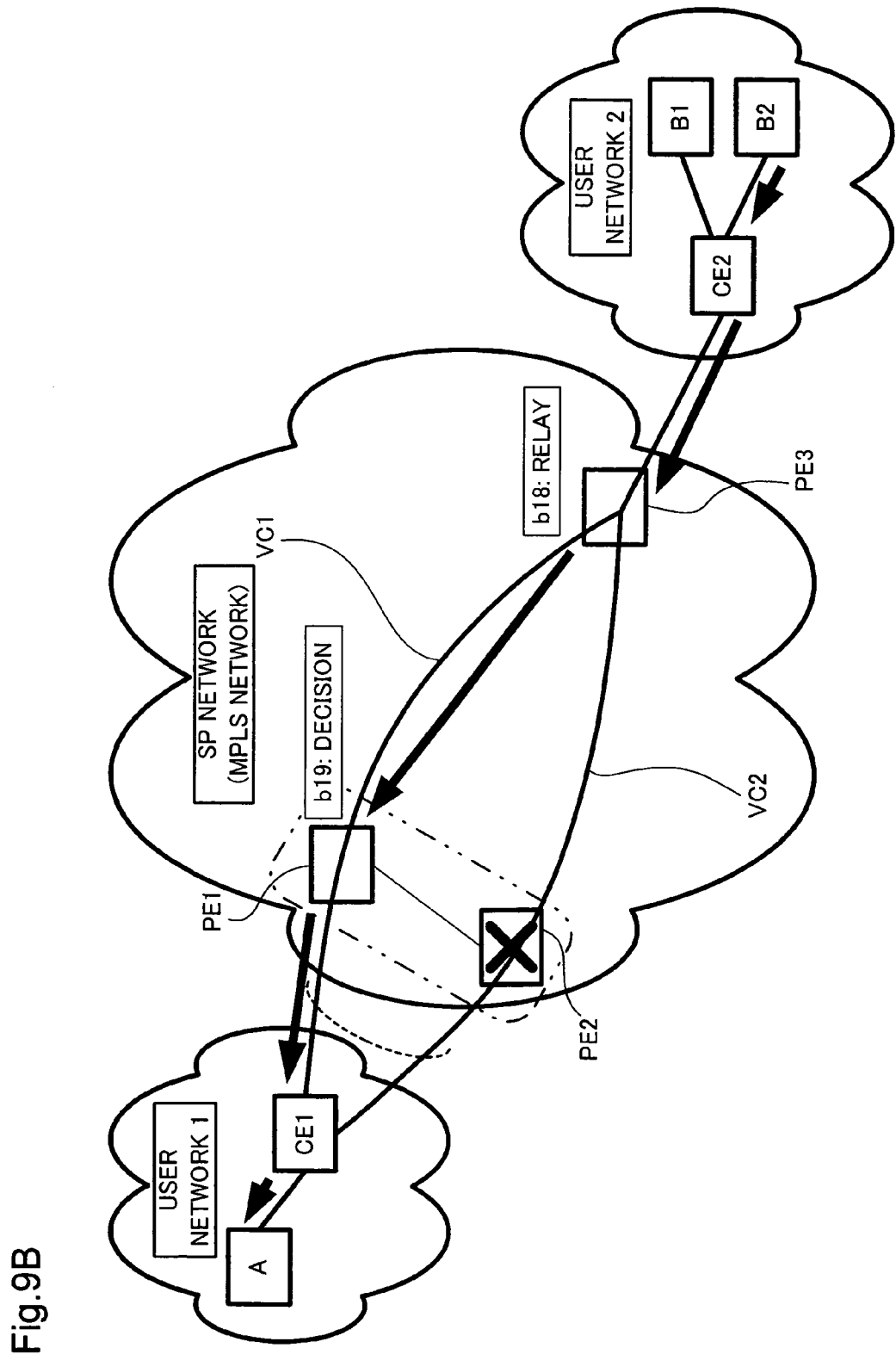
FIG. 9B is an illustration depicting operation when a failure occurs in Embodiment 2 of the invention.
Figure 10A:
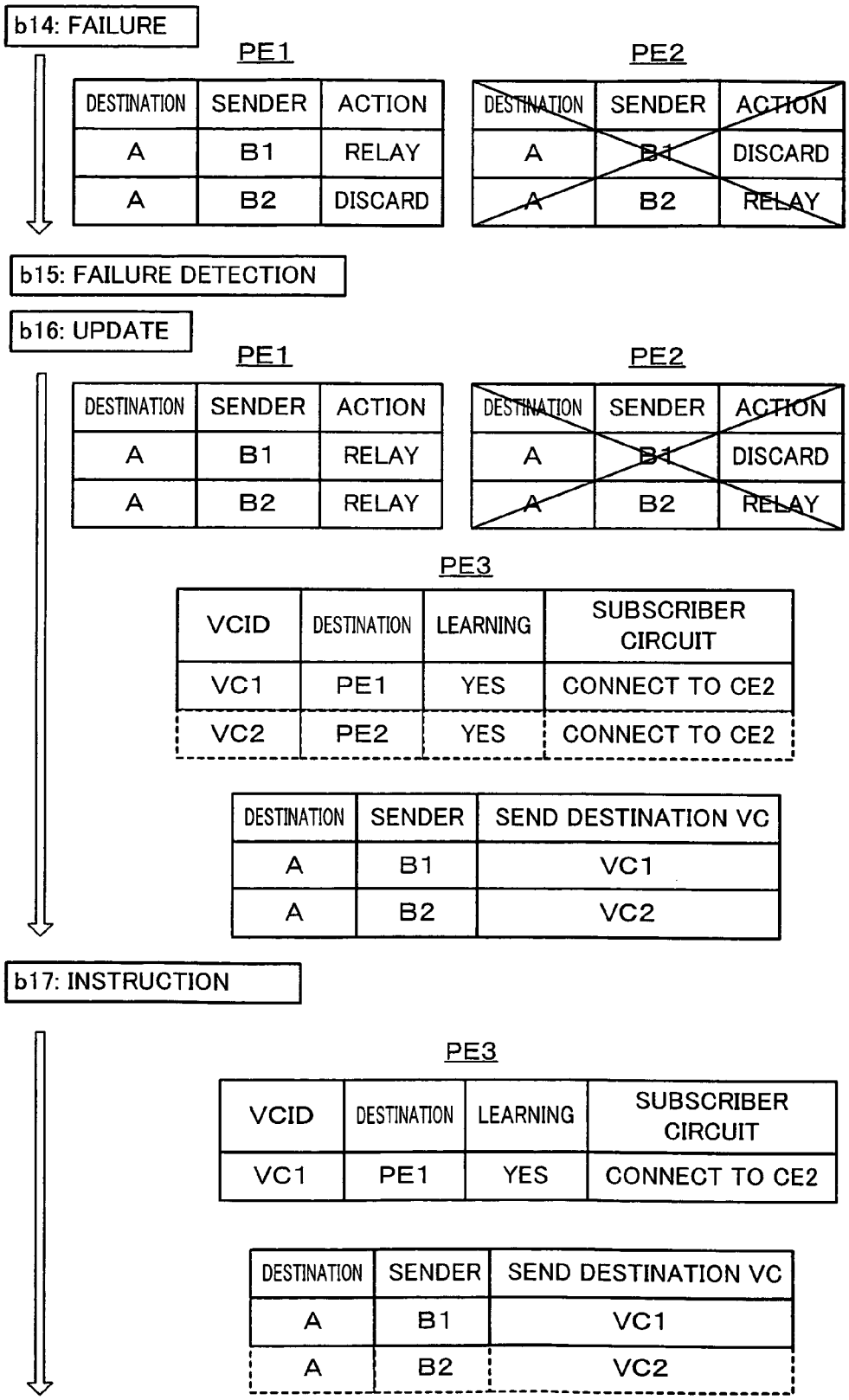
FIG. 10A is an illustration of management tables prepared in Provider Edges PE1, PE2, and PE3 respectively during operation when a failure occurs in Embodiment 2 of the invention.
Figure 10B:
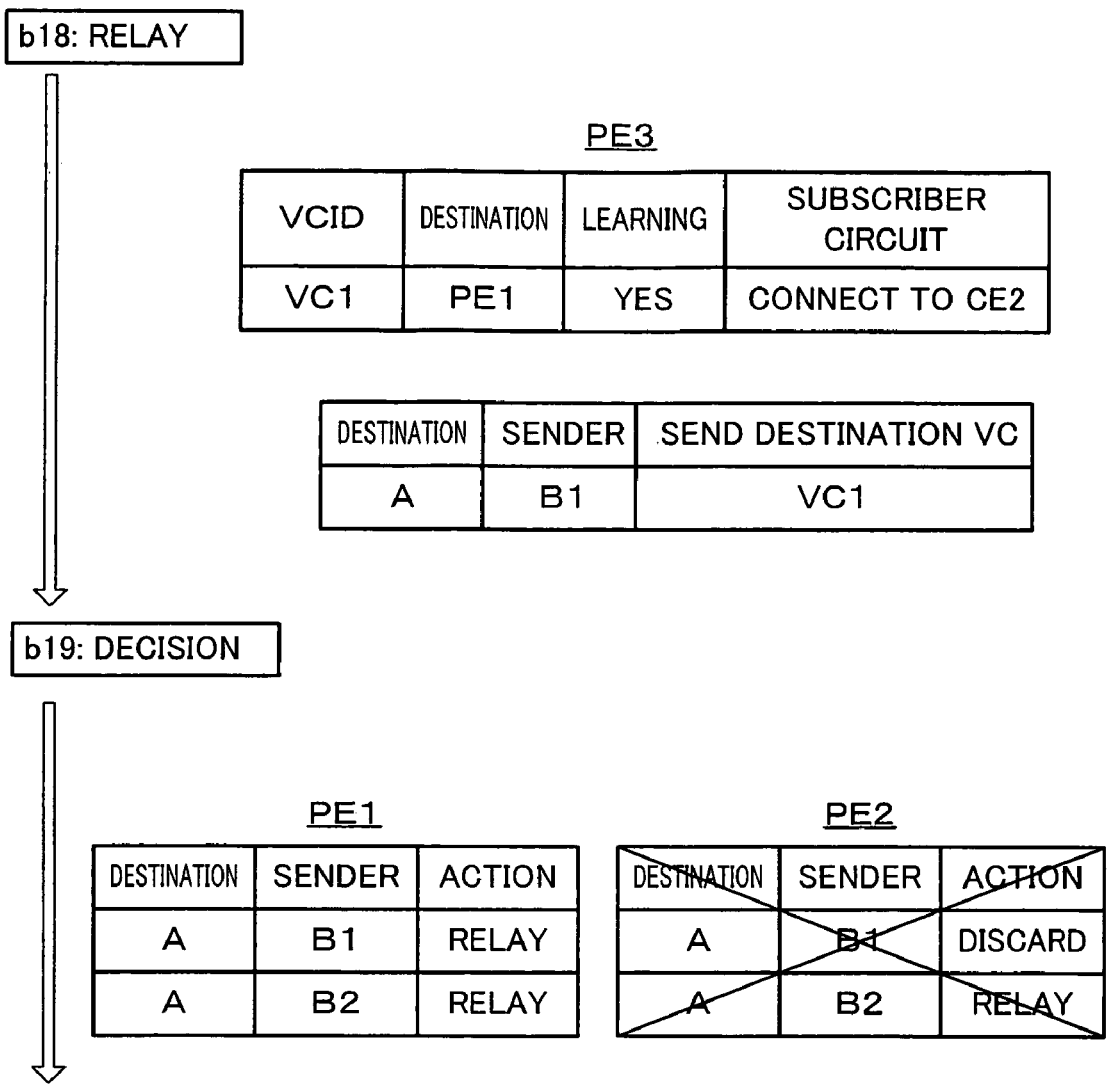
FIG. 10B is an illustration of management tables prepared in Provider Edges PE1, PE2, and PE3 respectively during operation when a failure occurs in Embodiment 2 of the invention.

C-3. Operation During a Failure:

FIGS. 9A and 9B are illustrations depicting operation when a failure occurs in the embodiment. FIGS. 10A and 10B are illustrations of management tables prepared in Provider Edges PE1, PE2, and PE3 respectively during this time. The operation steps when a failure occurs will be described with reference to the drawings.

Steps 14, b15:

As shown in FIG. 9A, if a failure should occur in the Provider Edge PE2 for example, the controller 110 of the Provider Edge PE1 will detect the failure. As noted, if the Provider Edge PE2 should fail, the controller 110 of the Provider Edge PE1 will subsequently be unsuccessful in attempts to exchange control messages, and will be able thereby to detect that the Provider Edge PE2 has failed. The occurrence of a failure in the Provider Edge PE2 means that the action table in the Provider Edge PE2 becomes unusable, as shown in FIG. 10A.

Step b16:

When a failure of Provider Edge PE2 has been detected in this way, the controller 110 of the Provider Edge PE1 immediately updates the action table in the Provider Edge PE1, so that packet forwarding will not be interrupted. Specifically, as depicted in FIG. 10A, whereas in accordance to the aforementioned agreement with the Provider Edge PE2, settings in the action table in the Provider Edge PE1 are such that packets destined for A sent by B1 will be relayed, while packets destined for A sent by B2 will be discarded. If these settings are left unmodified, there is a risk that packet forwarding will be interrupted for packets destined for A sent by B2; accordingly, the settings are modified so that such packets will now be relayed.

In the Provider Edge PE3 meanwhile, when a failure of the Provider Edge PE2 has been detected, content relating to the Provider Edge PE2 is deleted from the VC table in the Provider Edge PE3, to update the settings. As a result, as depicted in FIG. 10A, the content of the line for the virtual circuit VC2 is deleted from the VC table in the Provider Edge PE3.

Step b17:

Next, the controller 110 of the Provider Edge PE1 sends to the Provider Edge PE3 a cancel notification message instructing it to delete the content of MAC learning relating to the Provider Edge PE2. By so doing, the controller 110 of the Provider Edge PE3 deletes the content of MAC learning relating to the Provider Edge PE2, specifically, the combination (destination, sender, virtual circuit)=(A, B2, VC2), from the learning table as depicted in FIG. 10A.

Step b18:

At this point, as shown in FIG. 9B, when the Host B2 sends a packet destined for the Host A, the controller 110 of the Customer Edge CE1 relays the transmitted packet as-is to the Provider Edge PE3. When the controller 110 of the Provider Edge PE3 receives the transmitted packet, it analyzes the Layer 2 (L2)-Layer 7 (L7) headers in the packet and acquires the destination and sender. Then, referring to the learning table shown in FIG. 10B, it selects a virtual circuit (VC) over which the packet will be sent. In this case, the destination acquired from the header is the Host A and the sender is the Host B2, and in Step b17 the content of MAC learning relating to the Provider Edge PE2, specifically, the combination (destination, sender, virtual circuit)=(A, B2, VC2), was deleted from the learning table, so a virtual circuit (VC) for sending the packet cannot be selected. At this point, the controller 110 of the Provider Edge PE3 relays the packet sent from the Customer Edge CE2 to the virtual circuit VC1.

Step b19:

When the controller 110 of the Provider Edge PE1 receives the transmitted packet, referring to the updated action table it decides whether to relay or discard the received packet. As noted, the setting for packets destined for the Host A sent by the Host B2 in the action table of the Provider Edge PE1 was updated to "relay" in Step a16 as shown in FIG. 10B; accordingly, in the Provider Edge PE1 the transmitted packet is relayed and sent on to the Customer Edge CE1. The controller 110 of the Customer Edge CE1 then relays the transmitted packet as-is to the Host A.

In this way, packets sent from the Host B2 are forwarded to the Host A without being slowed down en route.

Figure 9C:
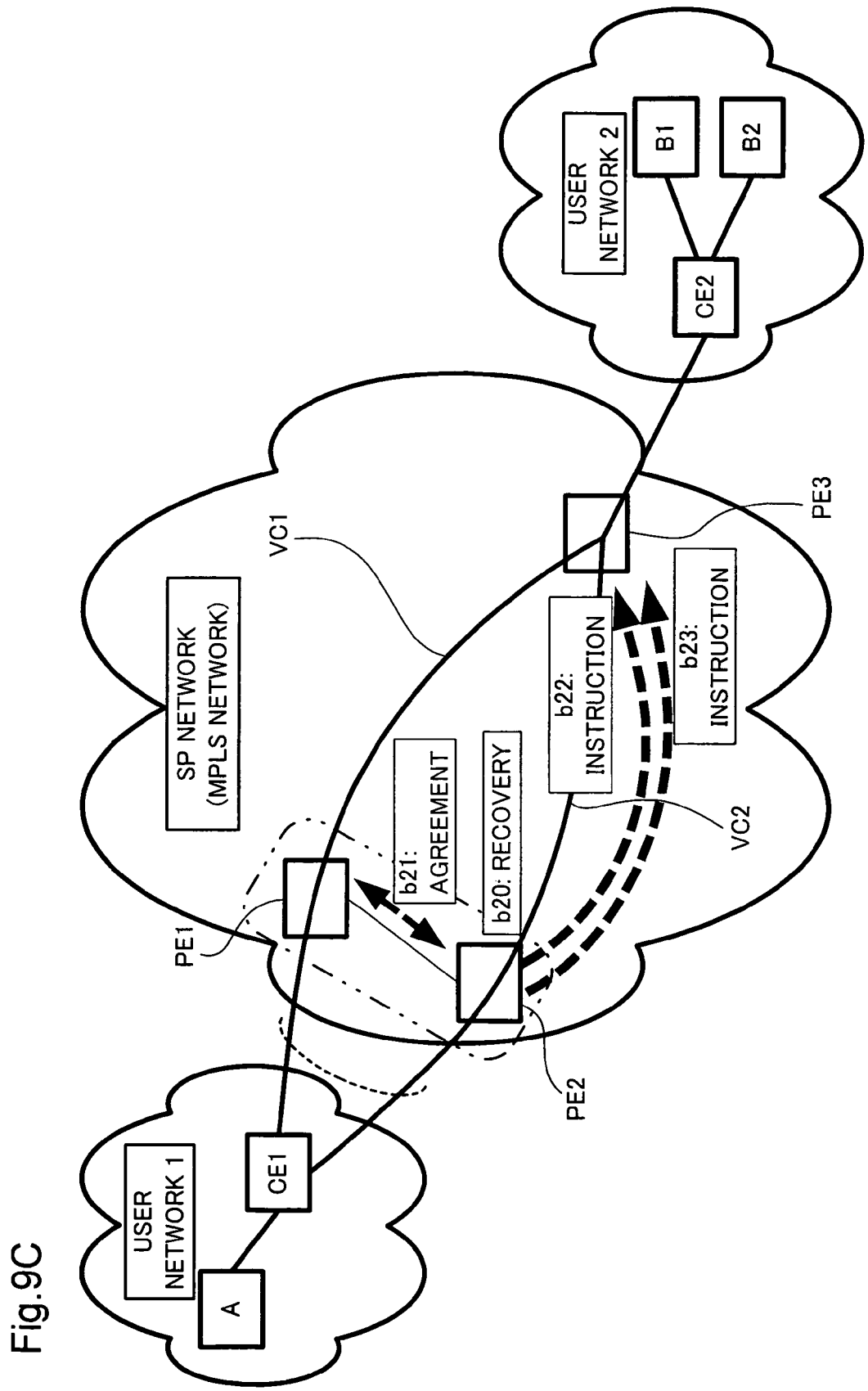
FIG. 9C is an illustration depicting operation during recovery in Embodiment 2 of the invention.

C-4. Recovery Operation:

FIG. 9C is an illustration depicting operation during recovery in the embodiment. FIG. 10C is an illustration of management tables prepared in Provider Edges PE1, PE2, and PE3 respectively during this time. The operation steps of the recovery operation will be described with reference to the drawings.

Steps b20, b21:

As shown in FIG. 9C, if the Provider Edge PE2 should recover from failure, exchange of control messages will resume between the controller 110 of the Provider Edge PE2 and the Provider Edge PE1, and accordingly the controller 110 of the Provider Edge PE1 will detect that the Provider Edge PE2 has recovered. Subsequently, in the same way as in Step b1, the controller 110 of the Provider Edge PE1 and the controller 110 of the Provider Edge PE2 will again negotiate between themselves an agreement relating to handling of packets received from virtual circuits (VC), and store the results of the agreement in their respective action tables, as shown in FIG. 10C. In the example shown in FIG. 10C, the agreement is that the Provider Edge PE1 will relay packets received from the virtual circuit VC1 and sent from Host B1 destined for Host A while discarding packets sent from Host B2 destined for Host A; and the Provider Edge PE2 will discard packets received from the virtual circuit VC2 and sent from Host B1 destined for Host A while relaying packets sent from Host B2 destined for Host A.

Step b22:

As shown in FIG. 9C, the controller 110 of the recovered Provider Edge PE2 sends the Provider Edge PE3 a VC setup message, and using the message instructs it to perform MAC learning for the virtual circuit VC2 set up between them.

On the basis of this instruction, the controller 110 of the Provider Edge PE3 appends content relating to the virtual circuit VC2 to the VC table as shown in FIG. 10C. Specifically, the VC table specifies that MAC learning be performed for the virtual circuit VC2.

Step b23:

Next, the controller 110 of the Provider Edge PE2 sends to the Provider Edge PE3 a cancel notification message instructing it to delete the content of MAC learning relating to the ender Host B2. Specifically, since MAC learning for the virtual circuit VC1 continues even after the Provider Edge PE2 has failed, in the event that a packet is sent from the Host A destined for the Host B2, the packet will be received by the Provider Edge PE3 via the virtual circuit VC1, and thus at this time MAC learning for the packet will be carried out by the Provider Edge PE3 and the combination (destination, sender, virtual circuit)=(A, B2, VC1) stored in the learning table, as depicted in FIG. 10C. Consequently, even after the Provider Edge PE1 has recovered, if this MAC learning content is left unchanged, in the event that a packet is sent from the Host B2 destined for the Host A, in the Provider Edge PE3, in accordance with the learning content described above, the packet will be sent to the virtual circuit VC1 only, and as a result the packet will be discarded in the Provider Edge PE1. Thus, the controller 110 of the Provider Edge PE2 sends to the Provider Edge PE3 an instruction to delete the MAC learning content relating to the sending Host B2. By so doing, the controller 110 of the Provider Edge PE3 deletes the MAC learning content relating to the sending Host B2, specifically, the combination (destination, sender, virtual circuit)=(A, B2, VC1), from the learning table as depicted in FIG. 10C.

In this way, the virtual circuit VC2 is established between the recovered Provider Edge PE2, and the Provider Edge PE3.

C-5: Effects of the Embodiment

According to this embodiment, in the event of packet forwarding from the Host A to the Host B1 or B2, at the Provider Edges PE1 and PE2, according to a preestablished agreement packets destined for the Host B1 for example will always pass over the virtual circuit VC1 while packets destined for the host B2 will always pass over the virtual circuit VC2, whereupon MAC learning for these packets will be performed in the Provider Edge PE3. Consequently, on the basis of the results of this MAC learning in the Provider Edge PE3, in the event that a packet is forwarded from the Host B1 to the Host A for example, the received packet will be relayed to the virtual circuit VC1 only, while in the event that a packet is forwarded from the Host B2 to the Host A, the received packet will be relayed to the virtual circuit VC2 only. Thus, in accordance with this embodiment packets do not proliferate during forwarding in accordance with this embodiment, so that normal packet forwarding can be carried out without forwarding duplicates of a given packet.

Additionally, according to this embodiment, multi-device link aggregation is implemented on the Provider Edges PE1, PE2, whereby if one of the Provider Edges (PE2 in the preceding example) should fail, the settings based on aforementioned agreement will be updated in the other Provider Edge (PE1 in the preceding example), so that even if the previous setting was to discard transmitted packets, the setting will be updated so that these are now relayed, so that packet forwarding is not interrupted.

D. Embodiment 3:

Next, a third embodiment of the invention will be described. The description makes reference first to FIGS. 11A-11C and FIGS. 12A-12C in relation to the virtual circuit setup operation and to normal operation; and subsequently to FIGS. 13A-13C and FIGS. 14A-14C in relation to operation when a failure occurs, and to the recovery operation.

Figure 11A:
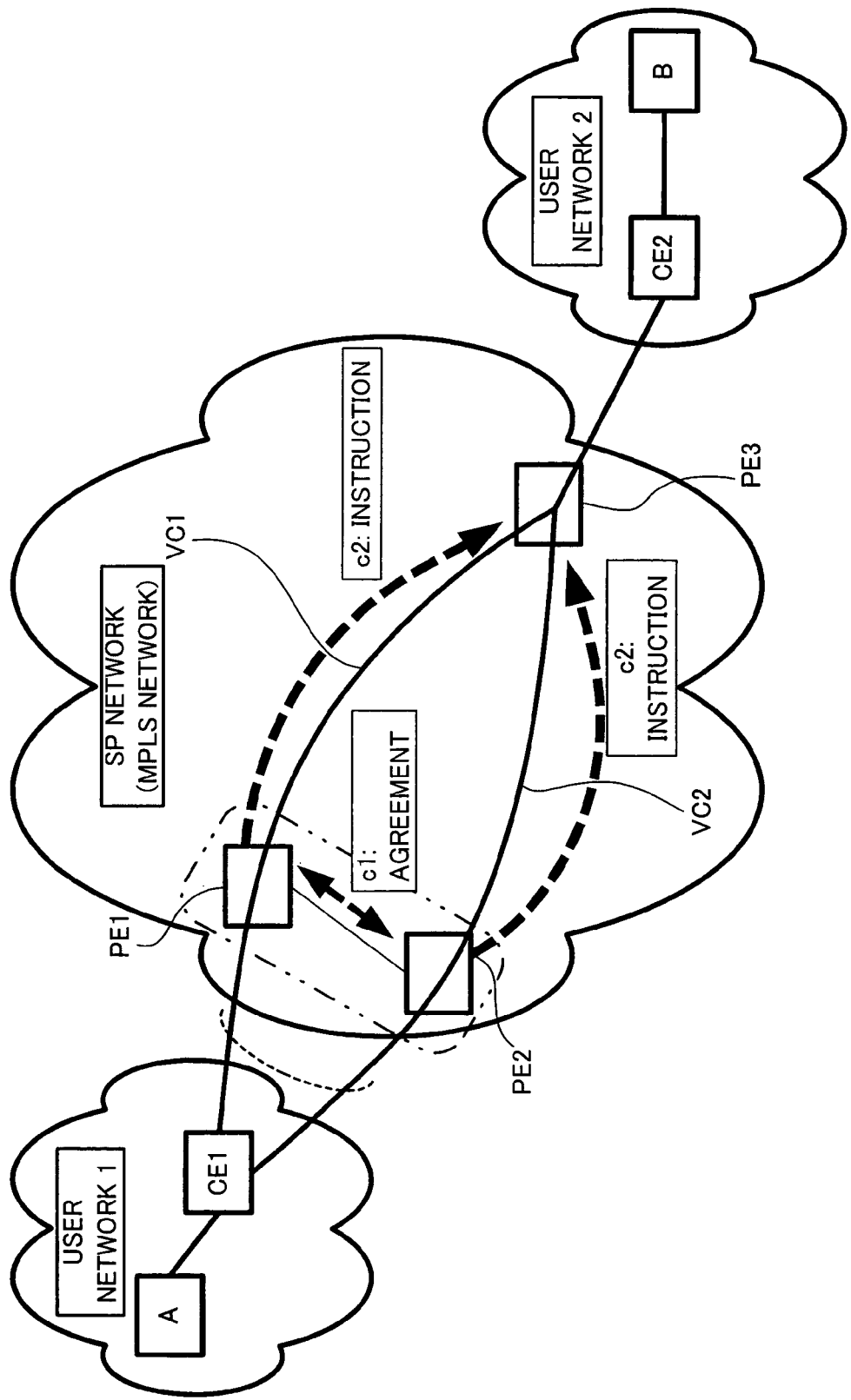
FIG. 11A is an illustration depicting the operation of setting up a virtual circuit (VC) in Embodiment 3 of the invention.
Figure 12A:
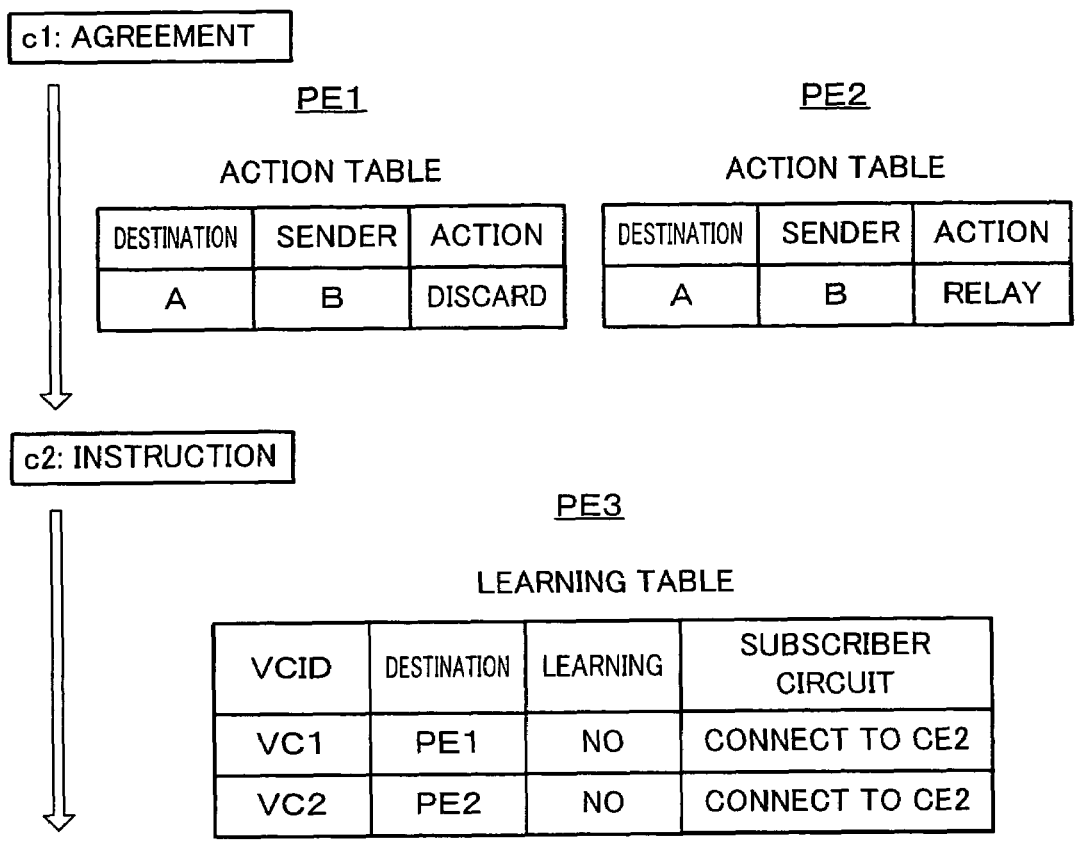
FIG. 12A is an illustration of management tables prepared in Provider Edges PE1, PE2, and PE3 respectively during setup operation of a virtual circuit (VC) in Embodiment 3 of the invention.

D-1. Virtual Circuit Setup Operation:

FIG. 11A is an illustration depicting the operation of setting up a virtual circuit (VC) in Embodiment 3 of the invention. FIG. 12A is an illustration of management tables prepared in Provider Edges PE1, PE2, and PE3 respectively during this time. The virtual circuit (VC) setup operation will be described in order of the operation steps, while referring to the drawings.

Step c1:

As shown in FIG. 11A, the controller 110 of the Provider Edge PE1 and the controller 110 of the Provider Edge PE2 negotiate between themselves an agreement relating to handling of packets received from virtual circuits (VC). Specifically, when the Provider Edge PE1 has received a packet from the set up virtual circuit VC1, and when the Provider Edge PE2 has received a packet from the set up virtual circuit VC2, they respectively agree, on the basis of any of the Layer 2 (L2) to Layer 7 (L7) headers or combination thereof in a packet, whether the received packet should be relayed or discarded.

The controller 110 of the Provider Edge PE1 and the controller 110 of the Provider Edge PE2 store in their respective memory 114 the result of the agreement, creating action tables like those depicted in FIG. 12A. In the example depicted in FIG. 12A, there is depicted an agreement whereby Provider Edge PE1 discards packets received from the virtual circuit VC1 and sent from Host B destined for Host A, while relaying packets received from the virtual circuit VC2 and sent from Host B destined for Host A.

Step c2:

As shown in FIG. 11A, the controller 110 of the Provider Edge PE1 and the controller 110 of the Provider Edge PE2 each send to the Provider Edge PE3 a VC setup message and by means of this message instruct it not to perform MAC learning of virtual circuits (VC) set up between them.

On the basis of this instruction, the controller 110 of the Provider Edge PE3 creates in memory 114 a VC table like that shown in FIG. 12A, and stores the instructed content. Specifically, the VC table records, for the virtual circuits VC1, VC2 being set up, that MAC learning shall not be performed for either. As a result, in the Provider Edge PE3, when a packet is forwarded via the virtual circuit VC1 or VC2, MAC learning is not performed with regard to the packet destination and sender or the virtual circuit.

In this way, the virtual circuit VC1 is set up between the Provider Edges PE1-PE3, and the virtual circuit VC2 is set up between the Provider Edges PE2-PE3.

Figure 11B:
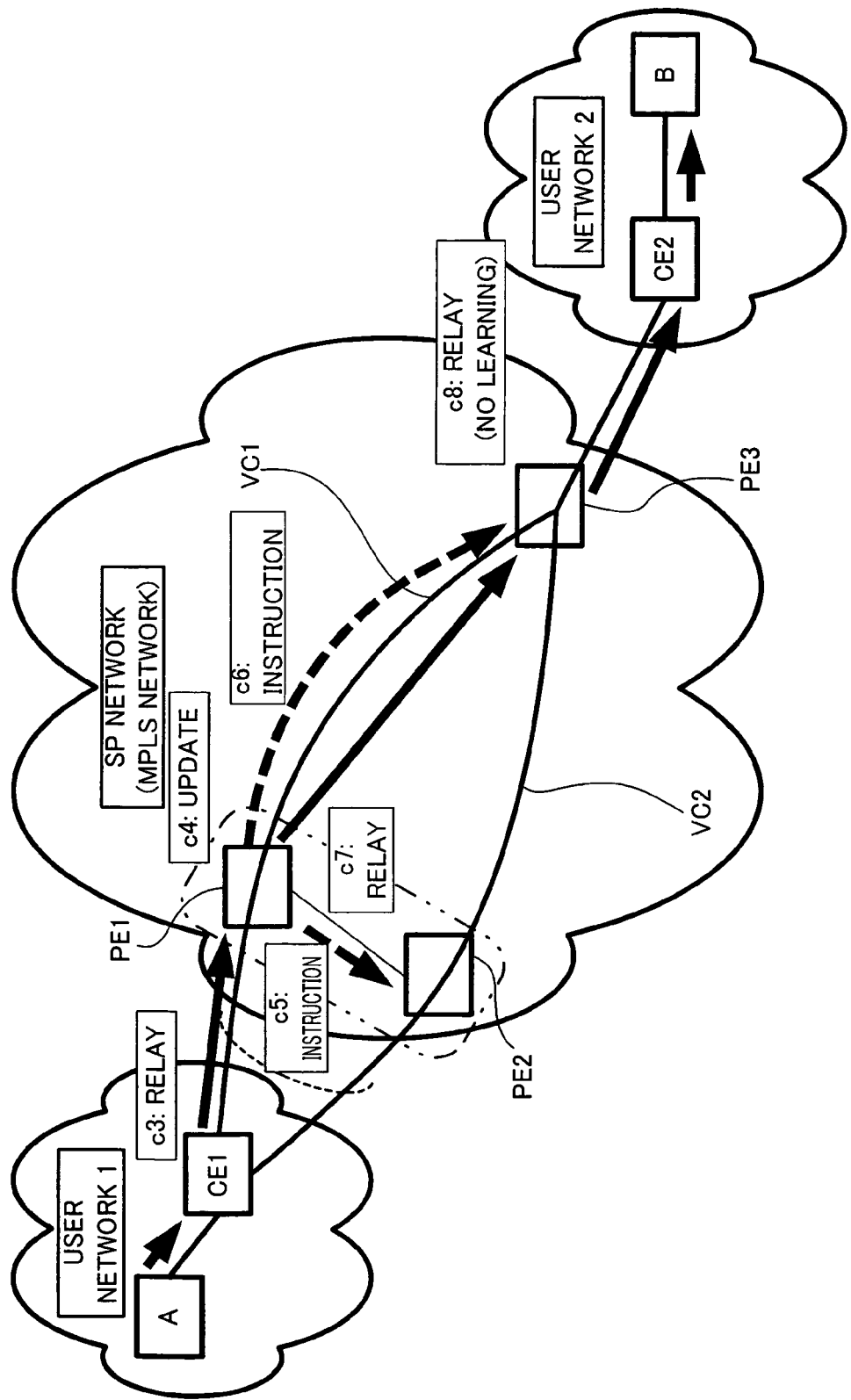
FIG. 11B is an illustration depicting normal operation in Embodiment 3 of the invention.
Figure 11C:
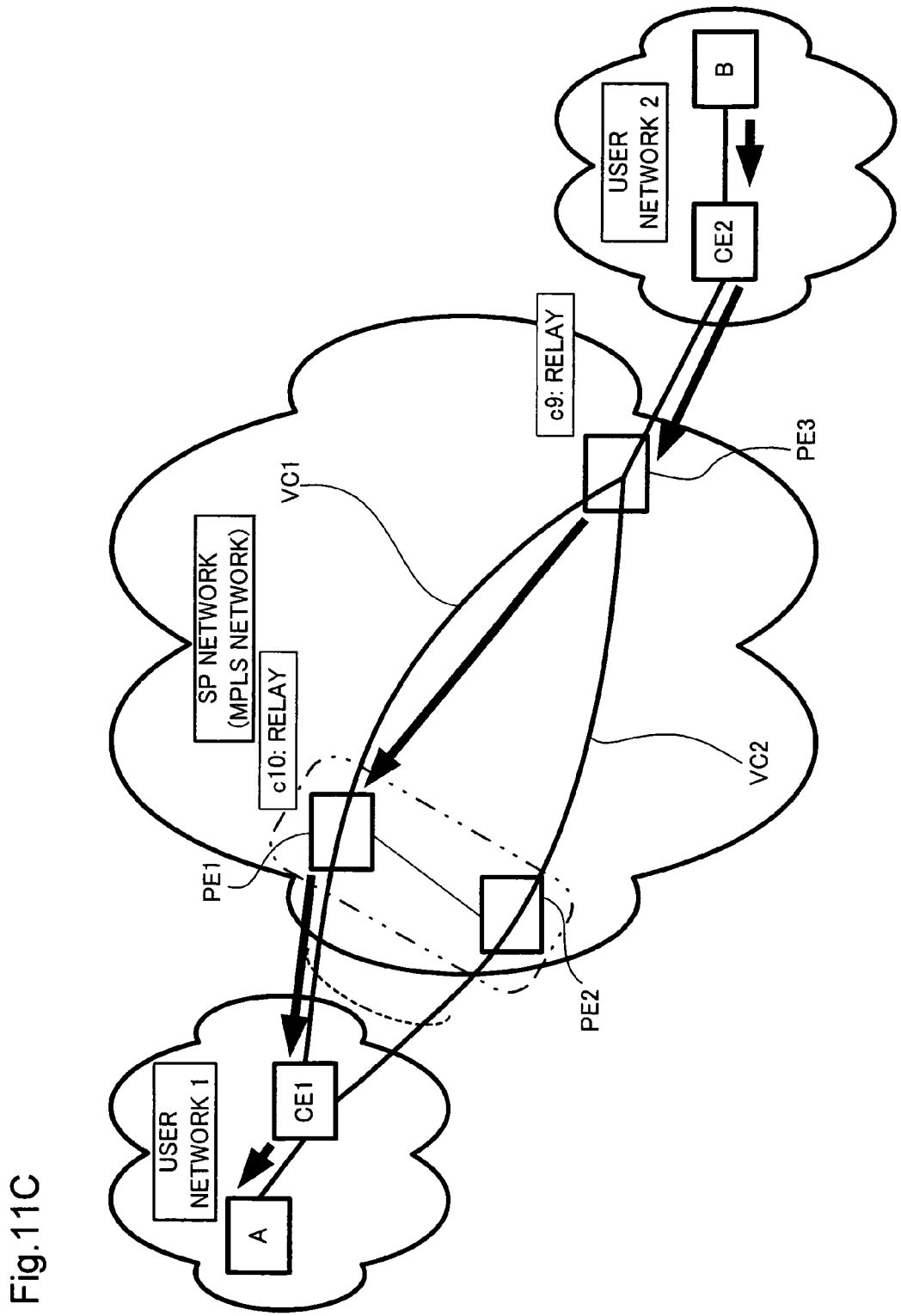
FIG. 11C is an illustration depicting normal operation in Embodiment 3 of the invention.
Figure 12B:
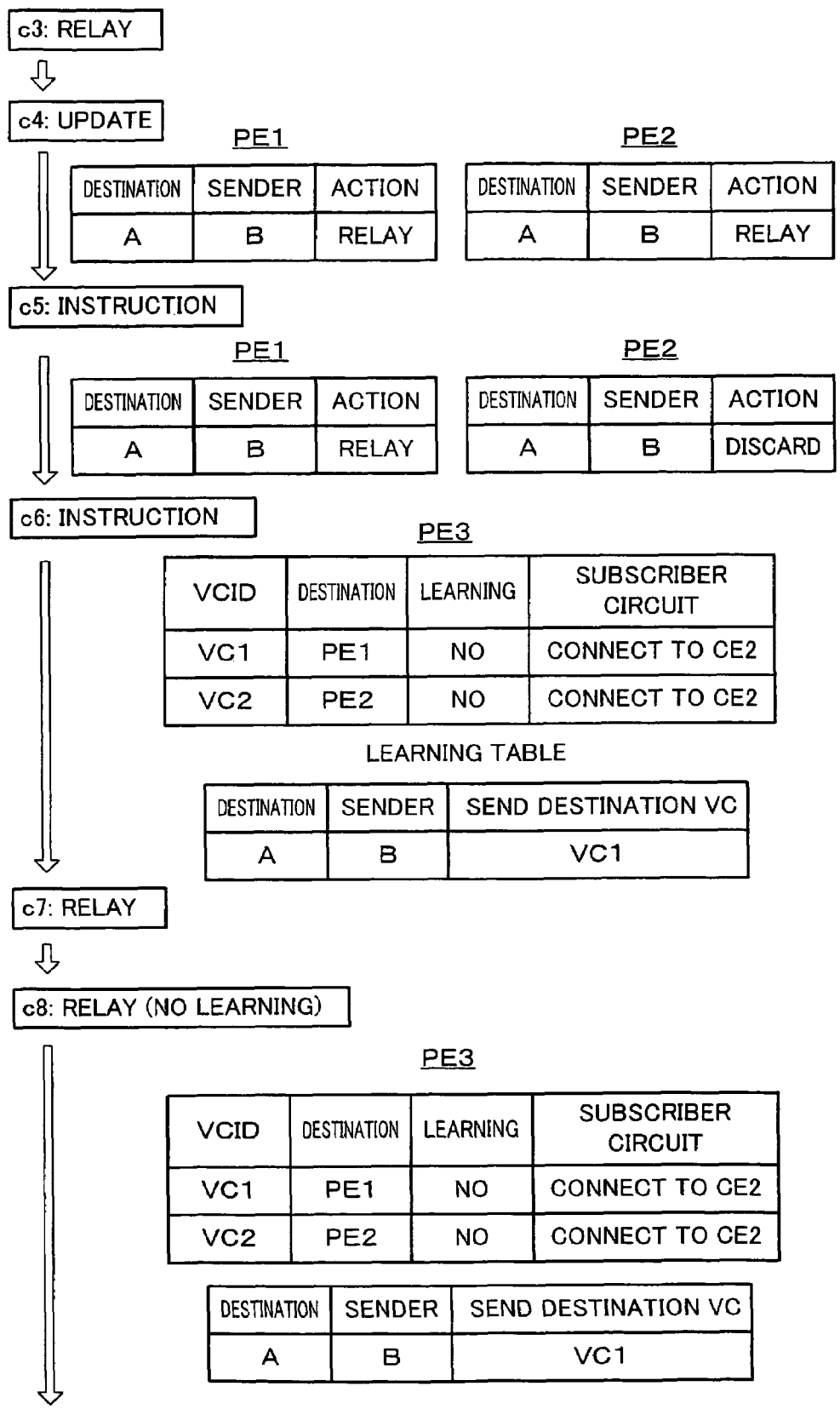
FIG. 12B is an illustration of management tables prepared in Provider Edges PE1, PE2, and PE3 respectively during normal operation of a virtual circuit (VC) in Embodiment 3 of the invention.
Figure 12C:
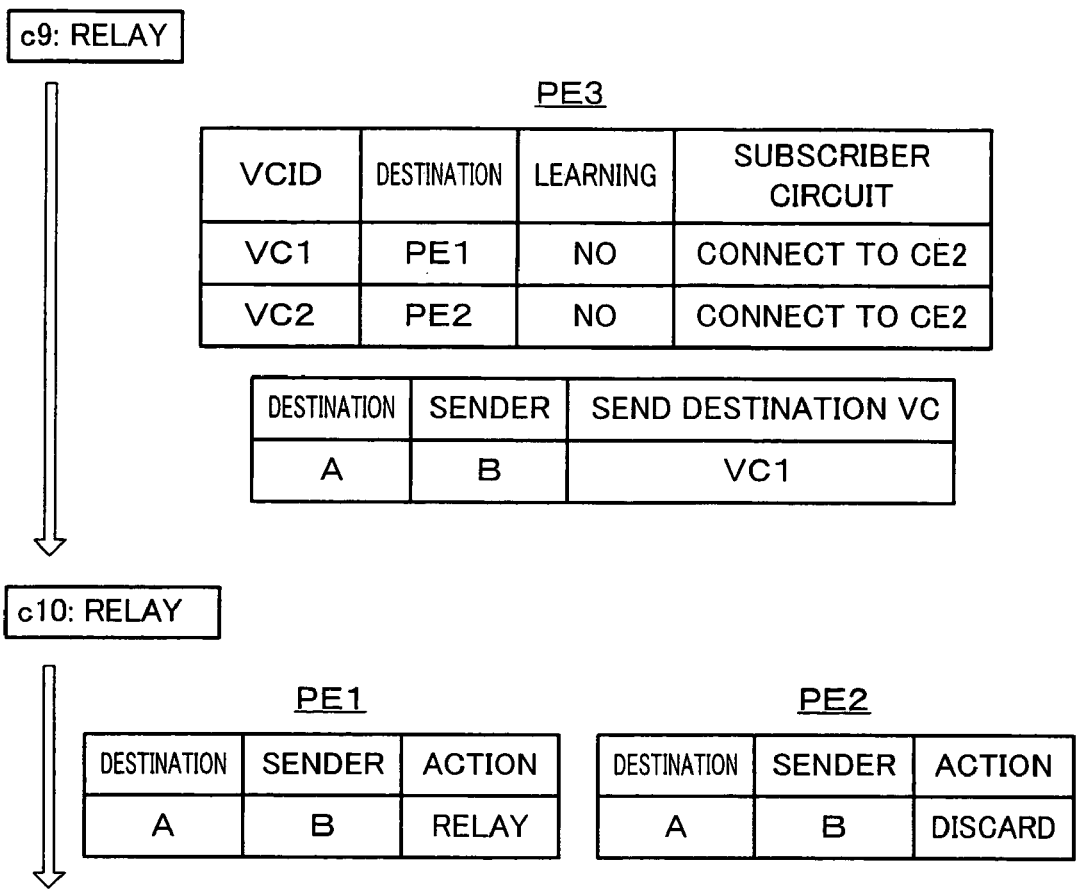
FIG. 12C is an illustration of management tables prepared in Provider Edges PE1, PE2, and PE3 respectively during normal operation of a virtual circuit (VC) in Embodiment 3 of the invention.

D-2. Normal Operation:

FIGS. 11B and 11C are illustrations depicting normal operation in this embodiment. FIGS. 12B and 12C are illustrations of management tables prepared in Provider Edges PE1, PE2, and PE3 respectively during this time. The operation steps for normal operation will be described with reference to the drawings.

Step c3:

As shown in FIG. 11B, when the Host A of the User Network 1 sends a packet destined for the Host B1 of the User Network 2 for example, the controller 110 of the Customer Edge CE1, in accordance with a predetermined rule, relays the received packet to one Provider Edge PE among the two Provider Edges PE1, PE2 on which multi-device link aggregation has been implemented in the SP network. In this embodiment, these settings are such that the packet will be relayed to the Provider Edge PE1.

Step c4:

When the controller 110 of the Provider Edge PE1 receives the transmitted packet, it first analyzes the Layer 2 (L2)-Layer 7 (L7) headers in the packet and acquires the destination/sender combination of the packet; next, it interchanges the destination and sender to derive a new combination. In this case, the destination of the transmitted packet is the Host B and the sender is the Host A, so the combination acquired through analysis (destination, sender)=(B, A); when the destination and sender are subsequently interchanged, the destination is now the Host A and the sender is the Host B, so the derived new combination (destination, sender)=(A, B).

The controller 110 of the Provider Edge PE1 then updates the action table in the Provider Edge PE1, so as to update the agreement with the Provider Edge PE2 in Step c1 so that packets of the new combination will now be relayed. In this case, as depicted in FIG. 12A, per the agreement with the Provider Edge PE2 in Step c1, the setting for packets of the new combination (destination, sender)=(A, B) in the action table of the Provider Edge PE1 was to discard them. Consequently, the setting is updated as shown in FIG. 12B, so that packets destined for the Host A from the sender Host B will now be relayed.

Step c5:

The controller 110 of the Provider Edge PE1 then instructs the Provider Edge PE2 to update the agreement of Step c1 so that it will now discard packets of the aforementioned new combination. By so doing, the controller 110 of the Provider Edge PE2 updates the action table within the Provider Edge PE2 so that packets of the aforementioned new combination will now be discarded. Specifically, per the agreement with the Provider Edge PE1 in Step c1, the setting for packets of the new combination (destination, sender)=(A, B) was to relay them, as shown in FIG. 12A. Accordingly, the setting is updated as shown in FIG. 12B, that packets destined for the Host A from the sender Host B will now be discarded.

Step c6:

Next, the controller 110 of the Provider Edge PE1 then instructs the Provider Edge PE3 with learning content so that it will send packets of the aforementioned new combination to the virtual circuit VC1. On the basis of this instruction, the Provider Edge PE3 creates in memory 114 a learning table like that shown in FIG. 12B, and in accordance with the instructed learning content, stores the combination of destination, sender, and virtual circuit. In this case, as noted the new combination is (destination, sender)=(A, B) and the virtual circuit is VC1, so the stored combination (destination, sender, virtual circuit)=(A, B, VC1).

Step c7:

The controller 110 of the Provider Edge PE1 then relays the packet received in Step c4, to the Provider Edge PE3 via the virtual circuit VC1.

Step c8:

The controller 110 of the Provider Edge PE3 relays the transmitted packet to the Customer Edge CE2 of the User Network 2. At this time, the controller 110 of the Provider Edge PE3 refers to the VC table shown in FIG. 12B, and since the setting therein for the virtual circuit VC2 is to not perform MAC learning, the packet is relayed without performing learning for the packet destination and sender or the virtual circuit. The controller 110 of the Customer Edge CE2 then relays the transmitted packet as-is to the Host B.

In this way, packets sent from the Host A are forwarded to the Host B.

Step c9:

Next, as shown in FIG. 11C, the Host B of the User Network 2 sends a packet destined for the Host A in the User Network 1. The controller 110 of the Customer Edge CE1 relays the transmitted packet as-is to the Provider Edge PE3 in the SP network. As noted, in the Provider Edge PE3 MAC learning is not performed, but per the instruction from the Provider Edge PE1 in Step c6, the combination (destination, sender, virtual circuit)=(A, B, VC1) has been stored in the learning table as shown in FIG. 12C. Accordingly, when the controller 110 of the Provider Edge PE3 receives a packet sent from the Customer Edge CE2, it analyzes the Layer 2 (L2)-Layer 7 (L7) headers in the received packet and acquires the destination and sender. Then, referring to the learning table shown in FIG. 12C, it selects a virtual circuit (VC) over which the packet will be sent. In this case, since the destination acquired from the header is the Host A and the sender is the Host B, on the basis of the learning table, VC1 will be selected as the virtual circuit (VC) for sending the packet. As a result, the controller 110 of the Provider Edge PE3 relays the received packet over the selected virtual circuit VC1 only.

Step c10:

When the controller 110 of the Provider Edge PE1 receives the transmitted packet, it refers to the action table to decide whether to relay or discard the received packet. As noted, the action table of the Provider Edge PE1 has been updated in Step c4, and as shown in FIG. 12C specifies "relay" of packets destined for the Host A from the sender Host B; consequently, the Provider Edge PE1 relays the transmitted packet to the Customer Edge CE1 of the User Network 1. The controller 110 of the Customer Edge CE1 then relays the transmitted packet as-is to the Host A.

In this way, packets sent from the Host B1 are forwarded to the Host A without proliferation en route.

Figure 13A:
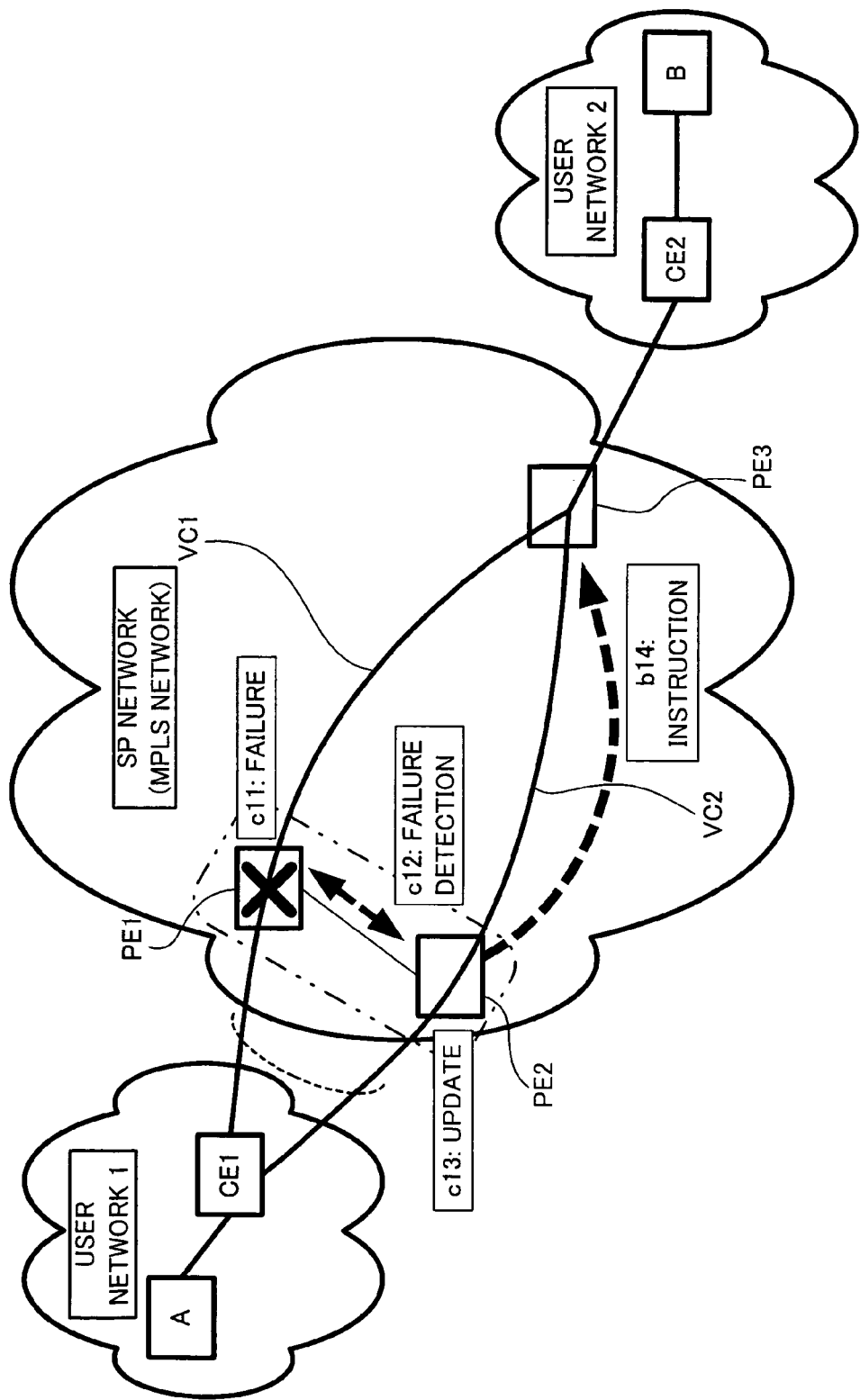
FIG. 13A is an illustration depicting operation when a failure occurs in Embodiment 3 of the invention.
Figure 13B:
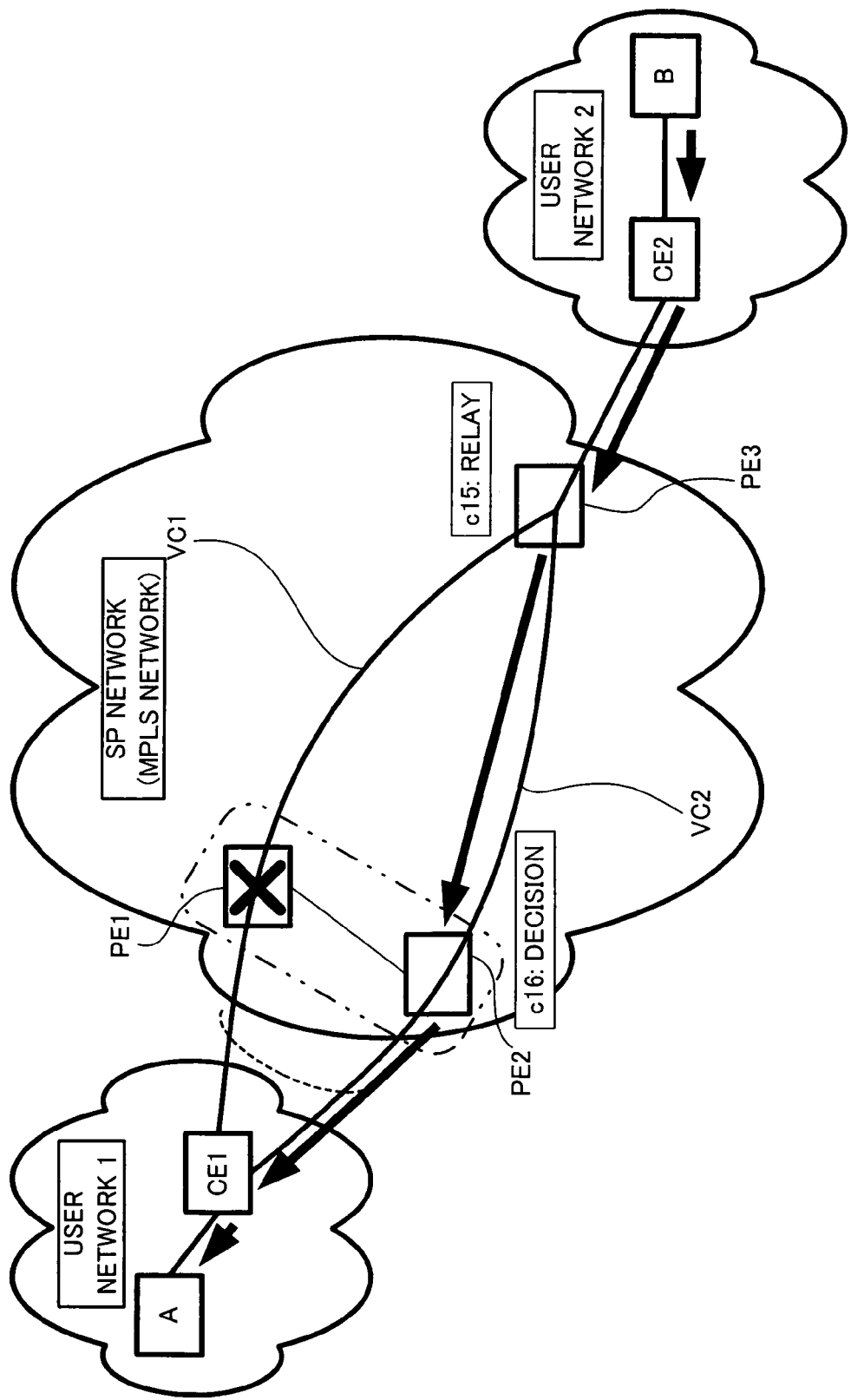
FIG. 13B is an illustration depicting operation when a failure occurs in Embodiment 3 of the invention.
Figure 14A:
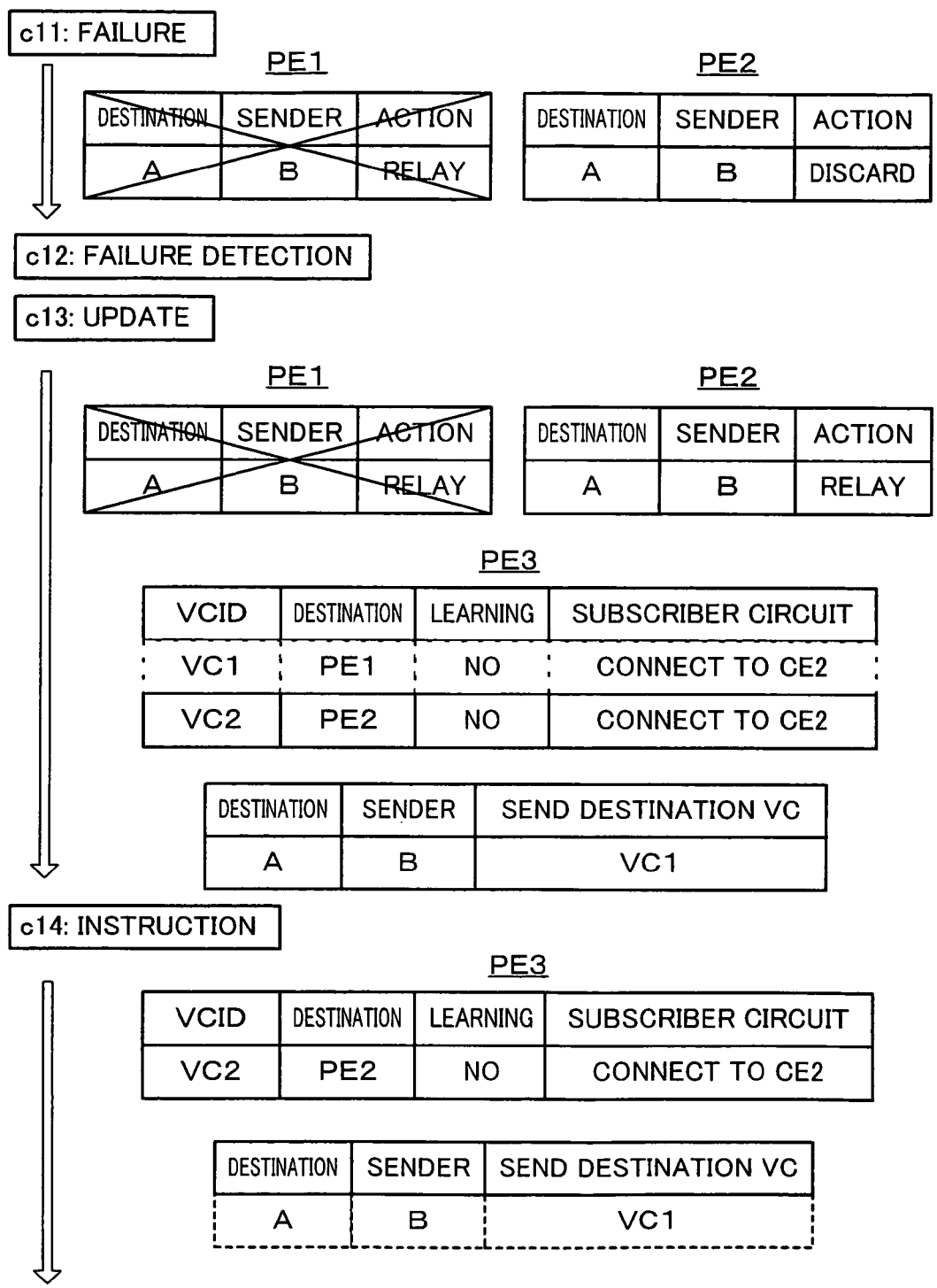
FIG. 14A is an illustration of management tables prepared in Provider Edges PE1, PE2, and PE3 respectively during operation when a failure occurs in Embodiment 3 of the invention.
Figure 14B:
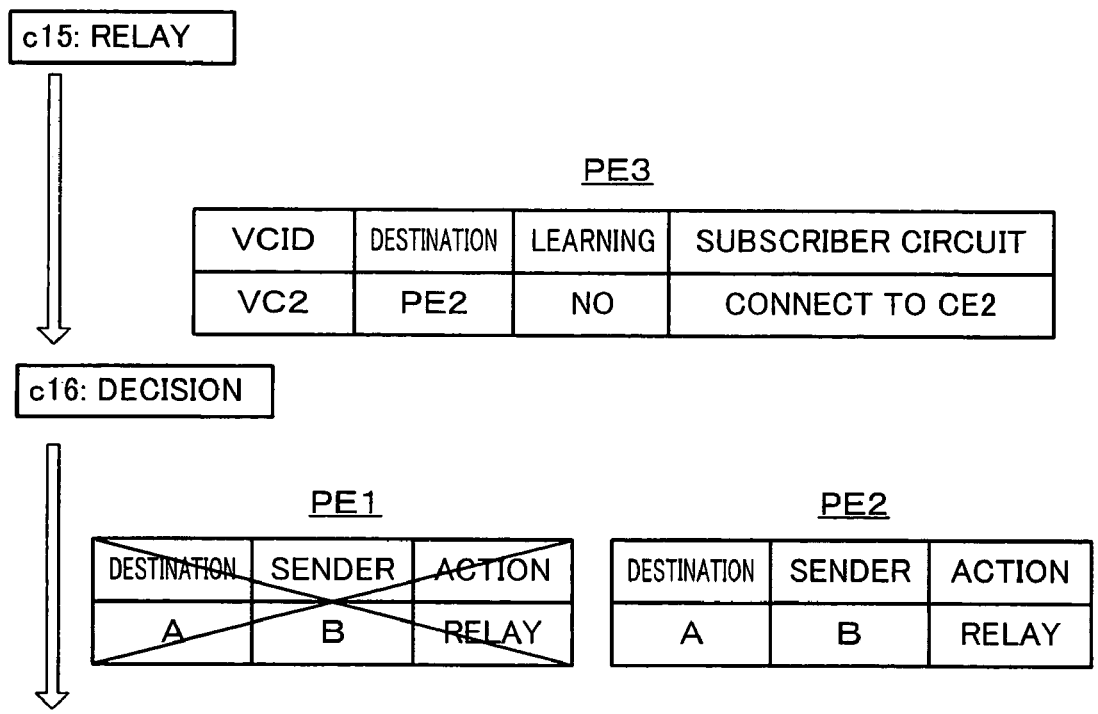
FIG. 14B is an illustration of management tables prepared in Provider Edges PE1, PE2, and PE3 respectively during operation when a failure occurs in Embodiment 3 of the invention.

D-3. Operation During a Failure:

FIGS. 13A and 13B are illustrations depicting operation when a failure occurs in the embodiment. FIGS. 14A and 14B are illustrations of management tables prepared in Provider Edges PE1, PE2, and PE3 respectively during this time. The operation steps when a failure occurs will be described with reference to the drawings.

Steps c11, c12:

As shown in FIG. 13A, if a failure should occur in the Provider Edge PE1 for example, the controller 110 of the Provider Edge PE2 will detect the failure. If the Provider Edge PE1 should fail, the controller 110 of the Provider Edge PE2 will subsequently be unsuccessful in attempts to exchange control messages, and will be able thereby to detect that the Provider Edge PE1 has failed. The occurrence of a failure in the Provider Edge PE1 means that the action table in the Provider Edge PE1 becomes unusable, as shown in FIG. 14A.

Step c13:

When a failure of Provider Edge PE1 has been detected in this way, the controller 110 of the Provider Edge PE2 immediately updates the action table in the Provider Edge PE2, so that packet forwarding will not be interrupted. Specifically, due to the instruction to update the agreement from the Provider Edge PE1 in Step c5, the current setting for packets destined for the Host A from the sender Host B is to discard them, so if the setting is left unchanged, packet forwarding will be interrupted. Accordingly, as depicted in FIG. 14A, the setting for packets destined for the Host A from the sender Host B is updated so that such packets will now be relayed.

In the Provider Edge PE3 meanwhile, when failure of the Provider Edge PE1 has been detected, content relating to the Provider Edge PE1 is deleted from the VC table in the Provider Edge PE3, to update the settings. As a result, as depicted in FIG. 14A, the content of the line for the virtual circuit VC1 is deleted from the VC table in the Provider Edge PE3.

Step c14:

Next, the controller 110 of the Provider Edge PE2 sends to the Provider Edge PE3 a cancel notification message instructing it to delete the content of MAC learning relating to the Provider Edge PE1. By so doing, as shown in FIG. 14A the controller 110 of the Provider Edge PE3 deletes from he learning table the content of MAC learning relating to the Provider Edge PE1 (learned content relating of the Provider Edge PE1) that was stored as a result of the instruction from the Provider Edge PE1 in Step c6, specifically, the combination (destination, sender, virtual circuit)=(A, B, VC1).

Step c15:

At this point, as shown in FIG. 13B, the Host B sends a packet destined for the Host A. Since the learning content of the learning table was deleted by the Provider Edge PE3 in Step c14, the controller 110 of the Provider Edge PE3 relays the packet sent from the Customer Edge CE2 to the virtual circuit VC1.

Step c16:

When the controller 110 of the Provider Edge PE2 receives the transmitted packet, referring to the updated action table it decides whether to relay or discard the received packet. As noted, the setting for packets destined for the Host A sent by the Host B2 in the action table of the Provider Edge PE2 was updated to "relay" in Step c13 as shown in FIG. 14B; accordingly, in the Provider Edge PE2 the transmitted packet is relayed and sent on to the Customer Edge CE1. The controller 110 of the Customer Edge CE1 then relays the transmitted packet as-is to the Host A.

In this way, packets sent from the Host B are forwarded to the Host A without being slowed down en route.

Figure 13C:
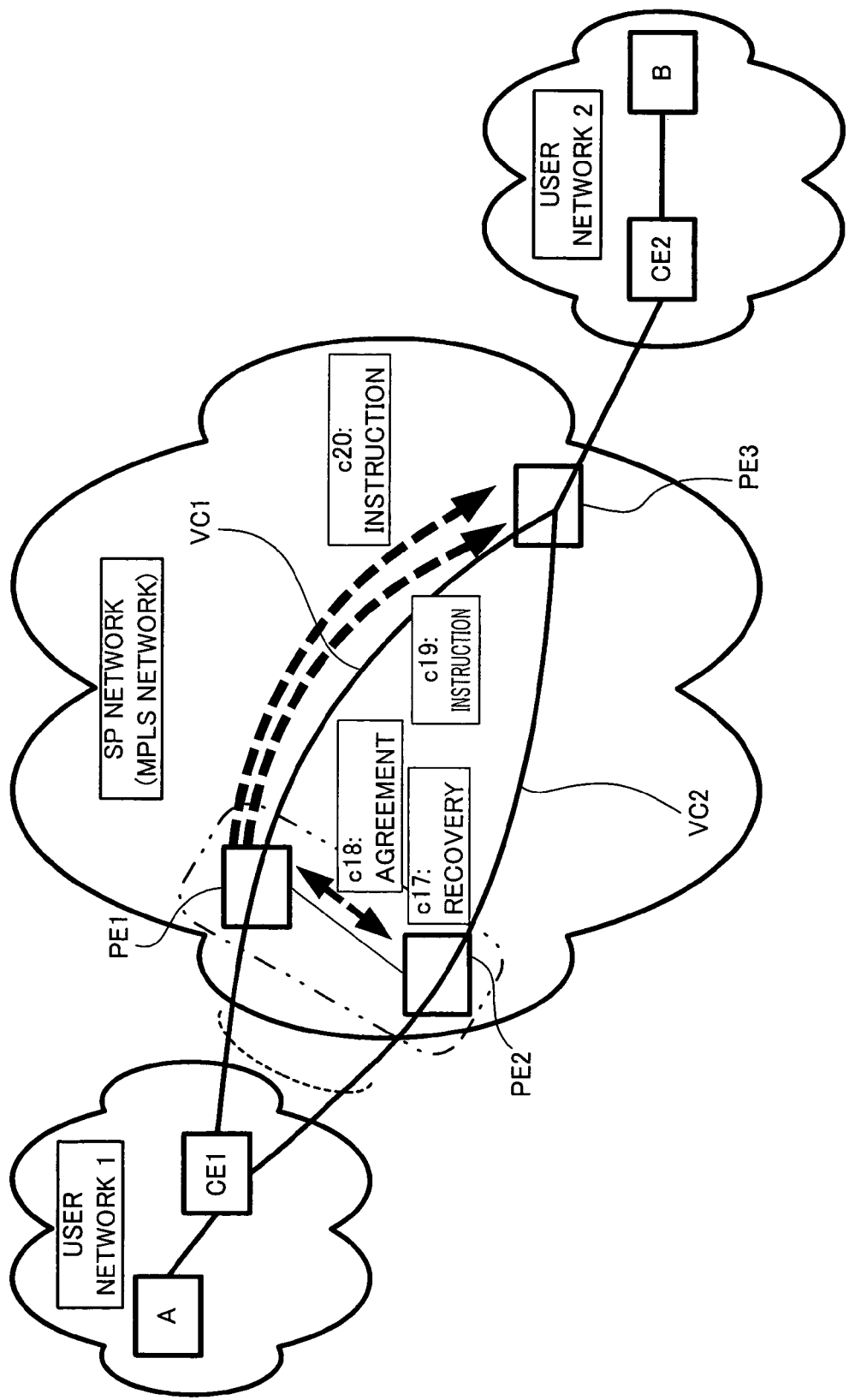
FIG. 13C is an illustration depicting operation during recovery in Embodiment 3 of the invention.
Figure 14C:
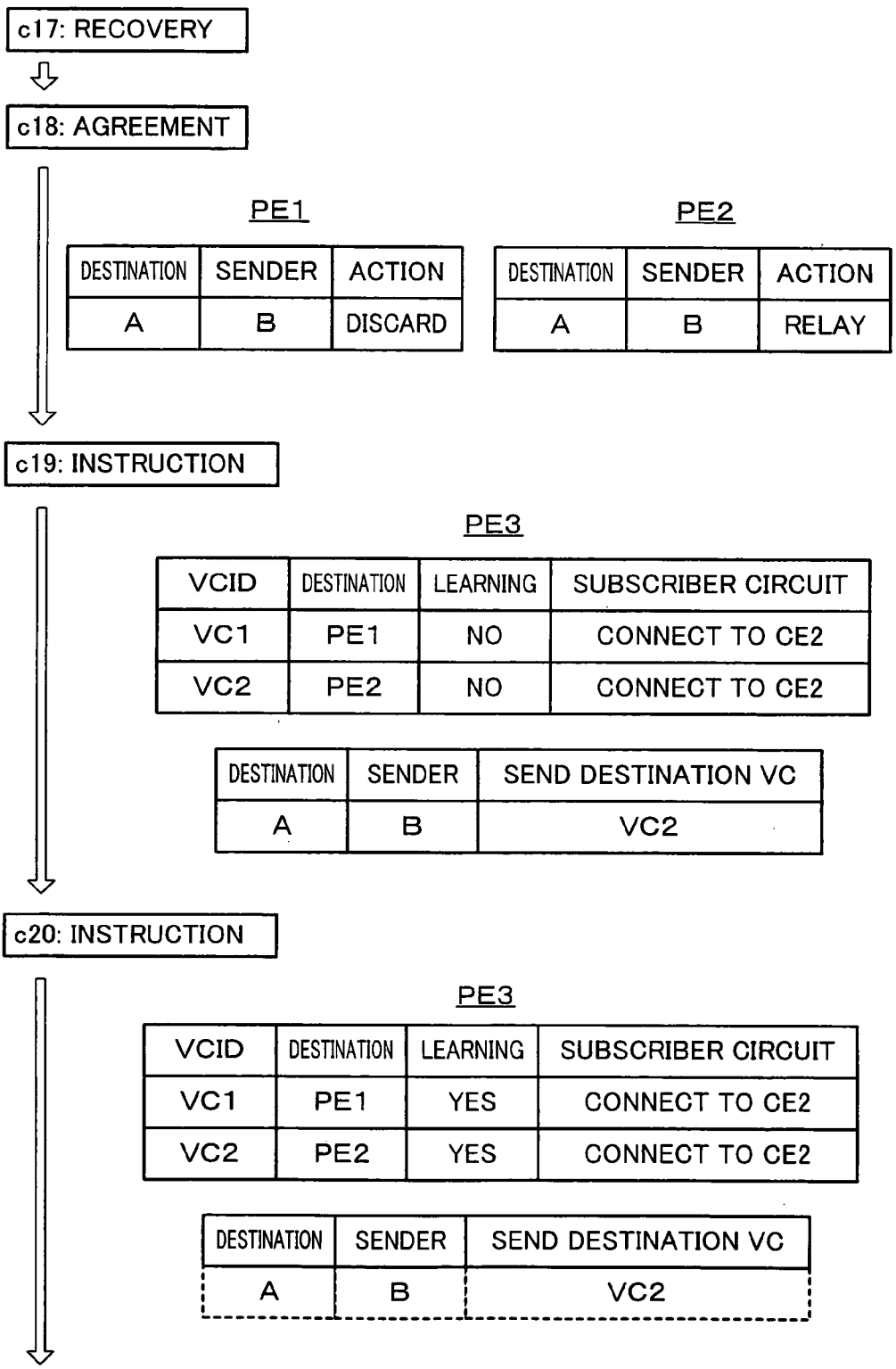
FIG. 14C is an illustration of management tables prepared in Provider Edges PE1, PE2, and PE3 respectively during operation during recovery in Embodiment 3 of the invention.
Figure 15:
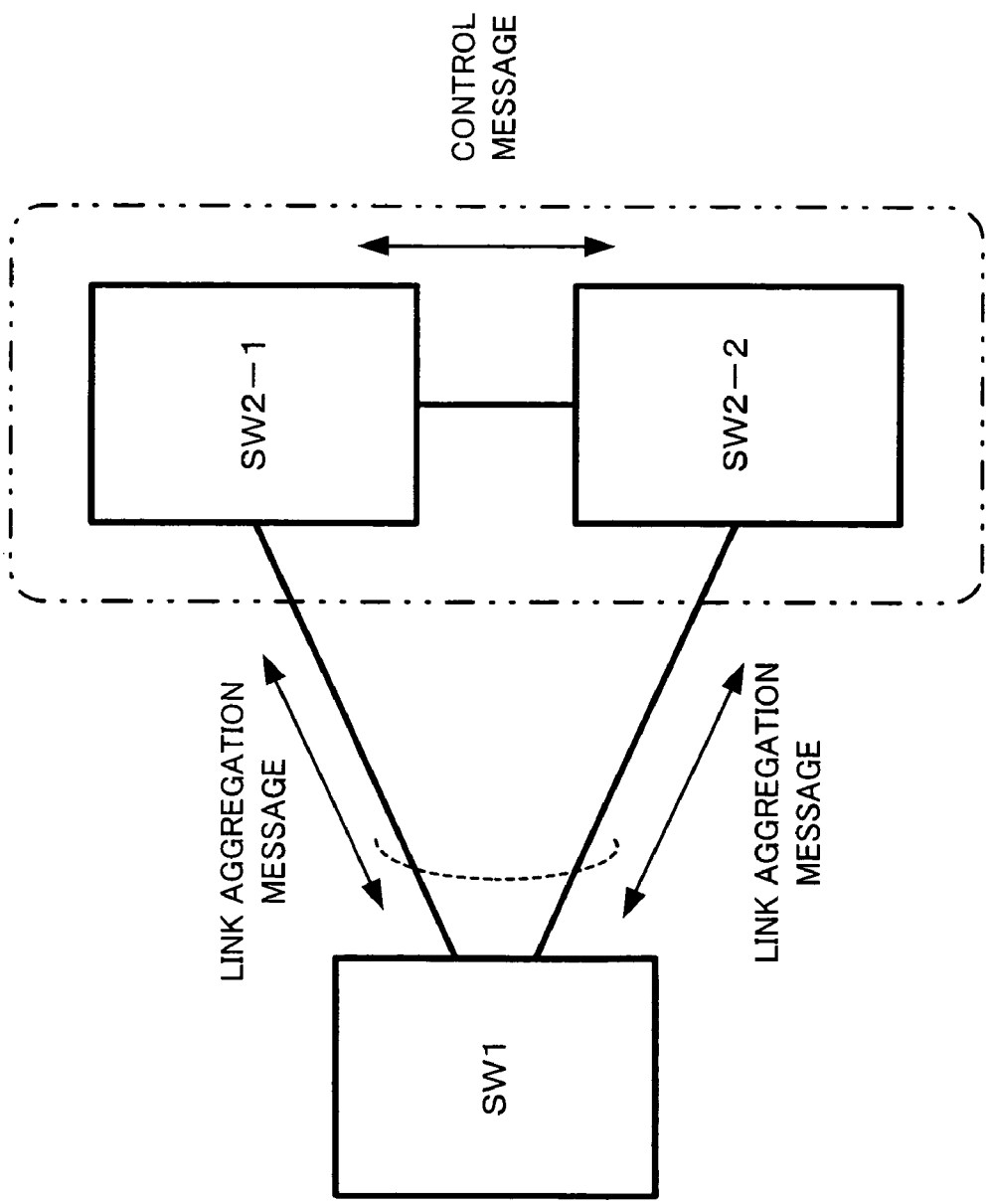
FIG. 15 is a block diagram depicting an arrangement where multi-device link aggregation is implemented on two network devices.
Figure 16:
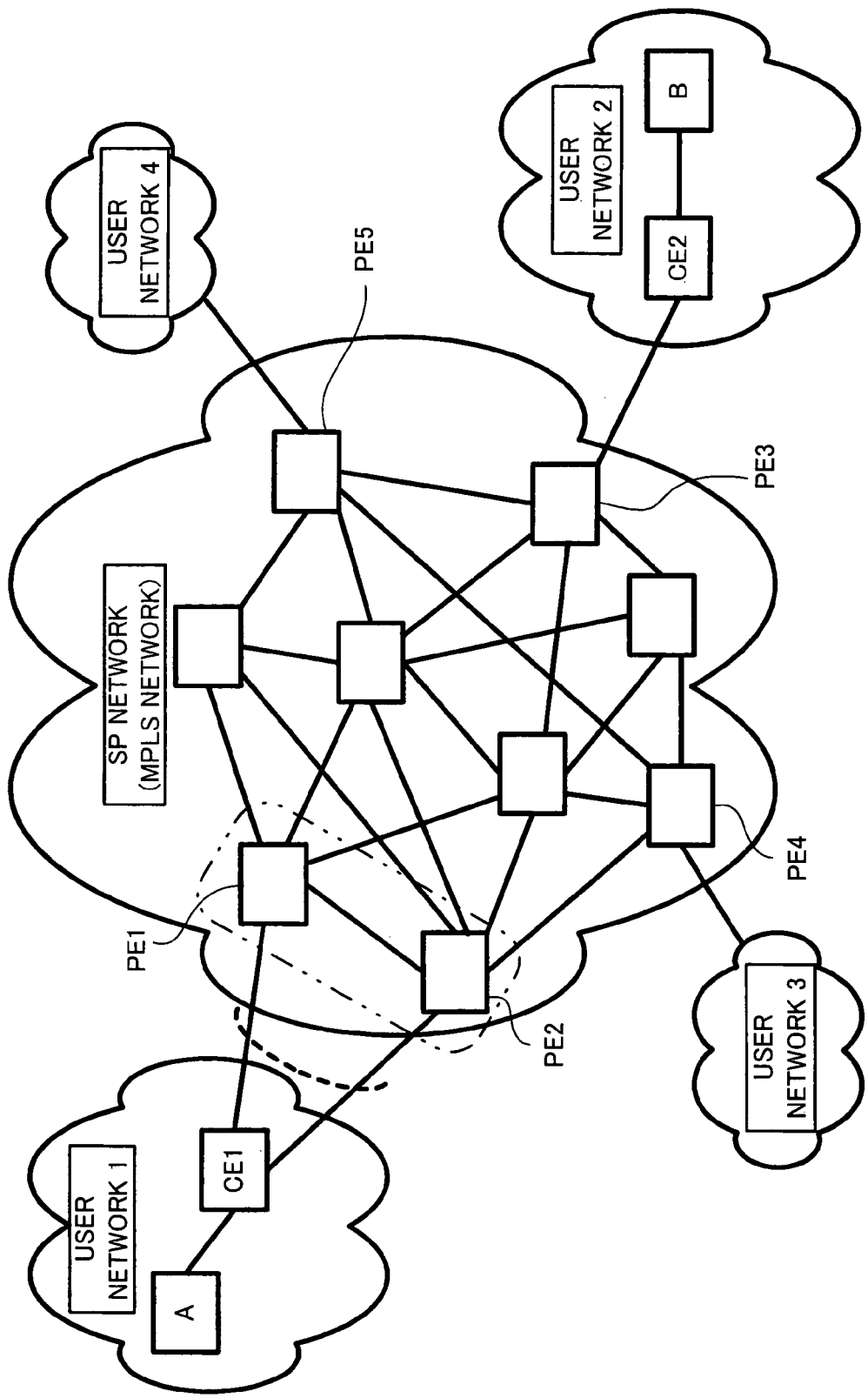
FIG. 16 is an illustration of an example of a network in which multi-device link aggregation is implemented on VPLS.
Figure 17:
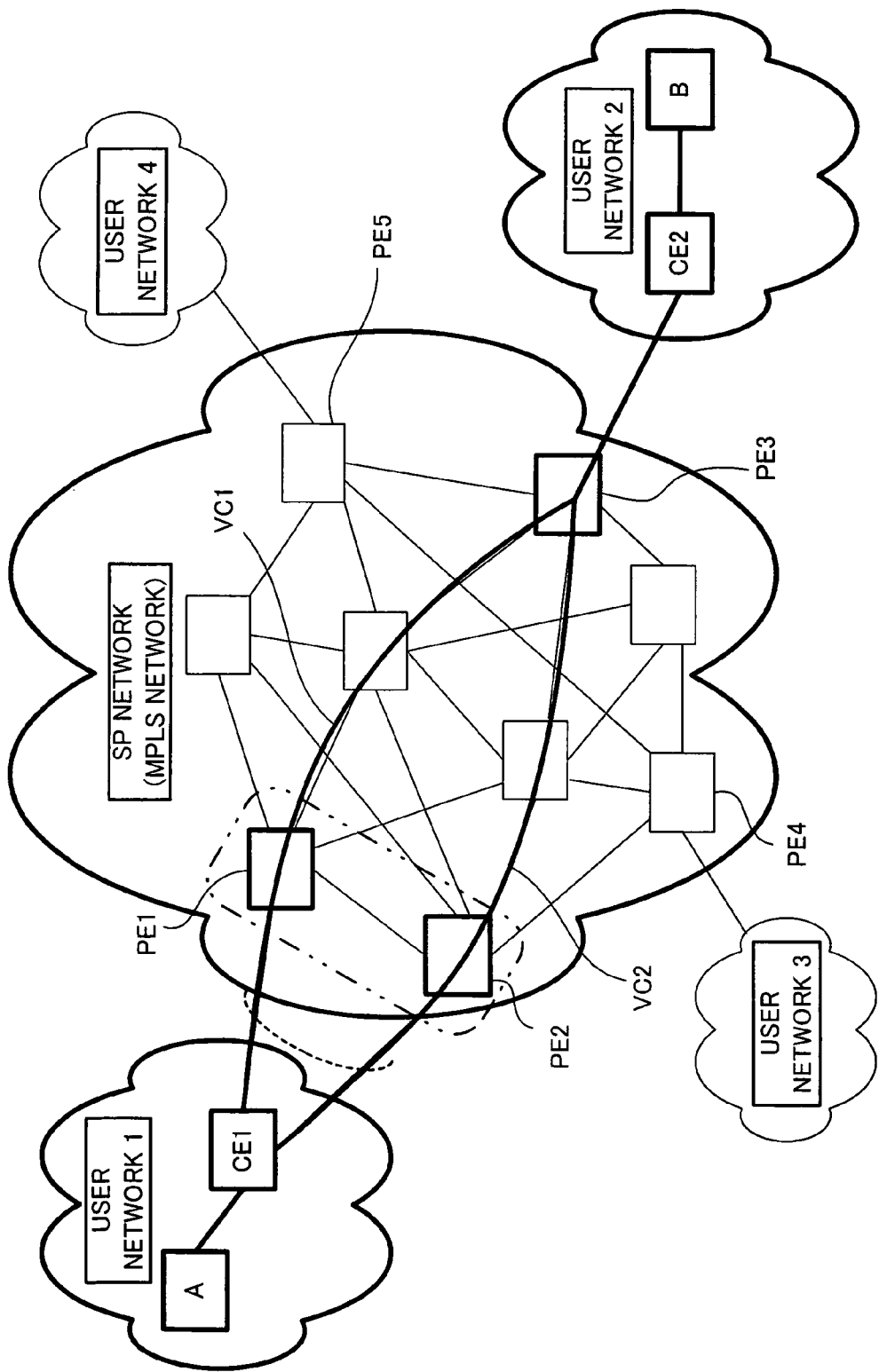
FIG. 17 is an illustration depicting setup of virtual circuits VC linking a User Network 1 and a User Network 2.
Figure 18:
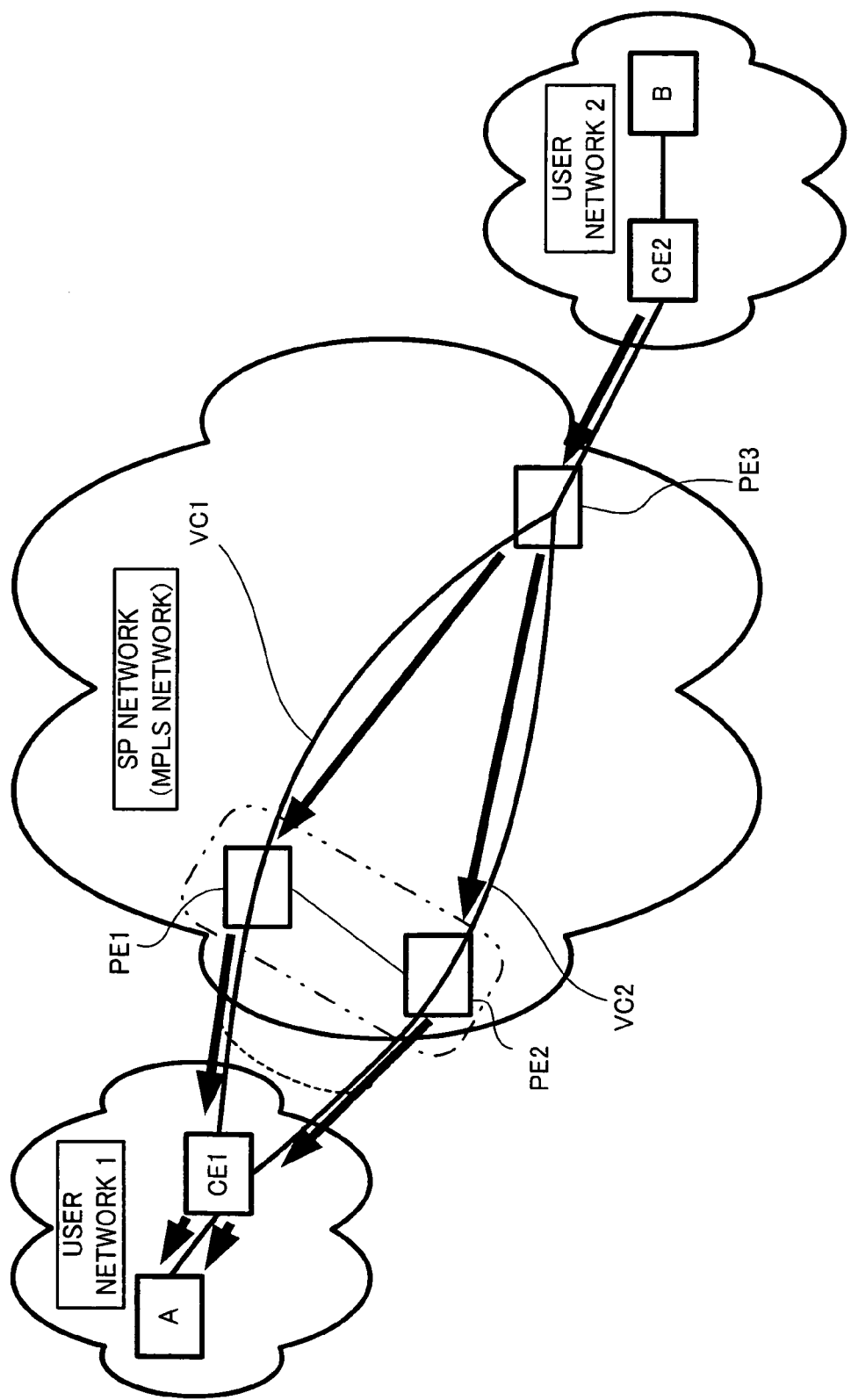
FIG. 18 is an illustration depicting packet proliferation.

D-4. Recovery Operation:

FIG. 13C is an illustration depicting operation during recovery in the embodiment. FIG. 14C is an illustration of management tables prepared in Provider Edges PE1, PE2, and PE3 respectively during this time. The operation steps of the recovery operation will be described with reference to the drawings.

Steps c17, c18:

As shown in FIG. 13C, if the Provider Edge PE1 should recover from failure, exchange of control messages will resume between the controller 110 of the Provider Edge PE1 and the Provider Edge PE2, and accordingly the controller 110 of the Provider Edge PE2 will detect that the Provider Edge PE1 has recovered. Subsequently, in the same way as in Step c1, the controller 110 of the Provider Edge PE1 and the controller 110 of the Provider Edge PE2 will again negotiate between themselves an agreement relating to handling of packets received from virtual circuits (VC), and store the results of the agreement in their respective action tables, as shown in FIG. 14C. In the example shown in FIG. 14C, the agreement is that the Provider Edge PE1 will discard packets received from the virtual circuit VC1 and sent from Host B1 destined for Host A, while the Provider Edge PE2 will relay packets received from the virtual circuit VC2 and sent from Host B destined for Host A.

Step c19:

As shown in FIG. 9C, the controller 110 of the recovered Provider Edge PE1 sends the Provider Edge PE3 a VC setup message, and using the message instructs it to not perform MAC learning for the virtual circuit VC1 set up between them.

On the basis of this instruction, the controller 110 of the Provider Edge PE3 appends content relating to the virtual circuit VC1 to the VC table as shown in FIG. 14C. Specifically, the VC table specifies that MAC learning not be performed for the virtual circuit VC1.

Step c20:

Next, the controller 110 of the Provider Edge PE2 sends to the Provider Edge PE3 a cancel notification message instructing it to delete the learning content relating to the virtual circuit VC2. Specifically, in the event that a packet is sent from the Host A destined for the Host B after the Provider Edge PE1 has failed, when the packet is received by the Provider Edge PE2, the Provider Edge PE2 interchanges the destination and sender acquired from the packet in order to derive a new combination, and instructs the Provider Edge PE3 to send packets of this new combination to the virtual circuit VC2. On the basis of this instruction, in the Provider Edge PE3 the combination (destination, sender, virtual circuit)=(A, B, VC2) is stored in the learning table, as shown in FIG. 14C. Consequently, even after the Provider Edge PE1 has recovered, if this learning content is left unchanged, in the event that a packet is sent from the Host B destined for the Host A, in the Provider Edge PE3, in accordance with the learning content described above, the packet will be sent to the virtual circuit VC2 only. Thus, the controller 110 of the Provider Edge PE2 sends to the Provider Edge PE3 an instruction to delete the learning content relating to the virtual circuit VC1. By so doing, the controller 110 of the Provider Edge PE3 deletes the learning content relating to the virtual circuit VC2, specifically, the combination (destination, sender, virtual circuit)=(A, B, VC2), from the learning table as depicted in FIG. 14C.

D-5: Effects of the Embodiment

According to this embodiment, an agreement negotiated in advance between two Provider Edges PE1, PE2 is updated so that in the event of packet forwarding from the Host A to the Host B, of the Provider Edges PE1 and PE2, the provider edge receiving the packets (in the preceding example, PE1) will relay them; the provider edge receiving the packet (in the preceding example, PE1) also instructs the Provider Edge PE3 with learning content such that packets derived by interchanging the destination and the sender of aforementioned packets will be routed through the virtual circuit connected to the former provider edge (VC1 in the preceding example). Consequently, in the Provider Edge PE3, on the basis of this learning content, in the event that packets from the Host B to the Host A are forwarded, the received packets will be relayed to the virtual circuit VC1 only. Thus, in accordance with this embodiment packets do not proliferate during forwarding in accordance with this embodiment, so that normal packet forwarding can be carried out without forwarding duplicates of a given packet to the Host A.

Additionally, according to this embodiment, multi-device link aggregation is implemented on the Provider Edges PE1, PE2, whereby if one of the Provider Edges (PE2 in the preceding example) should fail, the settings based on aforementioned agreement will be updated in the other Provider Edge (PE1 in the preceding example), so that even if the previous setting was to discard transmitted packets, the setting will be updated so that these are now relayed, so that packet forwarding is not interrupted.

E. Variations

The invention is not limited to the embodiments set forth hereinabove, and various modifications thereof are deemed to lie within the spirit and scope of the invention.

While a VPLS network was taken by way of example in the preceding description, the invention could be implemented in other network configurations having similar functionality.

What is claimed is:

1. A data communication system for communicating data between a second and a third network via a first network, the system comprising:

a first edge and a second edge present within the first network, for which multi-device link aggregation is implemented;

a third edge present within the first network, connected to the first edge via a first virtual circuit and connected to the second edge via a second virtual circuit;

a fourth edge present within the second network, connected to the first and second edges by circuits and connected to a host within the second network; and a fifth edge present within the third network, connected to the third edge by a circuit and connected to a host within the third network, wherein when forwarding of a packet from a host in the third network to a host in the second network:

the third edge receives the packet sent from the host in the third network via the fifth edge, replicates the packet, and relays these individually to the first and second virtual circuits; and the first edge receives the packet sent from the first virtual circuit while the second edge receives the packet sent from the second virtual circuit, and the first and second edges decide upon the handling of the received packets based on an agreement between them in advance, whereby one of the edges relays the received packet to the fourth edge for forwarding to the host in the second network, while the other edge discards the received packet without relaying it to the fourth edge, wherein the received packet having a first header, the first edge relays the first packet to the fourth edge, whereby the first packet is transferred to the host in the second network, and the second edge discards the first packet without relaying the first packet to the fourth edge, and wherein when the received packet is a second packet having a second header, the second edge relays the second packet to the fourth edge, whereby the second packet is transferred to the host in the second network, and the first edge discards the second packet without relaying the second packet to the fourth edge.

2. The data communication system according to claim 1, wherein in the third edge, settings are made so as to not perform MAC learning with respect to packet forwarding via the first and second virtual circuits.

3. The data communication system according to claim 1, wherein during setup of the first and second virtual circuits individually connected to the third edge:

the first and second edges each establish the agreement, which relates to handling of packets received via the first and second virtual circuits being set up, between the first and second edges and each send to the third edge a virtual circuit setup message; and the third edge is instructed to not perform MAC learning with respect to packet forwarding via the first and second virtual circuits being set up by the message.

4. The data communication system according to claim 1, wherein in the event that one edge of the first and second edges fails and the failure is detected by the other edge of the first and second edges, the failure detecting edge updates the agreement such that the packets received from the connected virtual circuit are relayed to the fourth edge.

5. The data communication system according to claim 4, wherein in the event that the failure detecting edge receives a packet sent from the connected virtual circuit after the agreement is updated, the failure detecting edge decides on the handling of the received packet based on the updated agreement, and relays the received packet to the fourth edge.

6. The data communication system according to claim 4, wherein in the event that the failed edge recovers from the failure:

the first and second edges renegotiate an agreement relating to the handling by the first and second edges of packets received respectively from the first and second virtual circuits;

the recovered edge sends a virtual circuit setup message to the third edge; and the third edge is instructed not to perform MAC learning with respect to packet forwarding via the virtual circuit being set up by the message.

7. A data communication system for communicating data between a second and a third network via a first network, the system comprising:

a first and a second edge present within the first network, for which multi-device link aggregation is implemented;

a third edge present within the first network, connected to the first edge via a first virtual circuit and connected to the second edge via a second virtual circuit;

a fourth edge present within the second network, connected to the first and second edges by circuits and connected to a host within the second network; and a fifth edge present within the third network, connected to the third edge by a circuit and connected to a host within the third network, wherein when forwarding of a packet from a host in the third network to a host in the second network;

the third edge receives the packet sent from the host in the third network via the fifth edge, and based on MAC learning content relating to packet transmission, relays the packet to either the first or second virtual circuit; and the edge that receives the packet from the connected virtual circuit, of the first and second edges, relays the received packet to the fourth edge for forwarding to the host in the second network, wherein an agreement is not negotiated in advance between the first edge and the second edge with regard to handling of packets received via the first and second virtual circuits, and wherein the event that a packet is forwarded from a host in the second network to a host in the third network, when one edge of the first and second edges receives the packet sent from the host in the second network via the fourth edge, the one edge acquires from the received packet the destination and sender combination, interchanges the destination and the sender to derive a first new combination, in the event that the agreement specifies with respect to handling of the packets of the first new combination that the packet be relayed, the one edge relays the received packet to the connected virtual circuit, and in the event that the agreement specifies with respect to handling of the packets of the first new combination that the packet be discarded, the one edge sends the received packet to the other edge of the first and second edges, the other edge sends the received packet to the connected virtual circuit.

8. The data communication system according to claim 7, wherein when the other edge of the first and second edges receives the packet sent from the one edge, the other edge acquires the destination and sender combination from the received packet and interchanges the destination and the sender thereof to derive a second new combination, and wherein in the event that the agreement specifies with respect to handling of the packet of the second new combination that the packet be relayed, the other edge relays the received packet to the connected virtual circuit.

9. The data communication system according to claim 7, wherein in the third edge, settings are made so as to perform MAC learning with respect to packet forwarding via the first and second virtual circuits, and wherein when receiving the packet from the first or second virtual circuit, the third edge performs MAC learning with respect to forwarding of the received packet based on the settings, acquires the MAC learning content and relays the received packet to the fifth edge.

10. The data communication system according to claim 8, wherein in the third edge settings are made so as to perform MAC learning with respect to packet forwarding via the first and second virtual circuits, and wherein when receiving the packet from the first or second virtual circuit, the third edge performs MAC learning with respect to forwarding of the received packet based on the settings, acquires the MAC learning content and relays the received packet to the fifth edge.

11. The data communication system according to claim 7, wherein during setup of the first and second virtual circuits individually connected to the third edge:

the first and second edges each establish the agreement, which relates to handling of packets received via the first and second virtual circuits being set up, between the first and second edges and each send to the third edge a virtual circuit setup message; and the third edge is instructed to perform MAC learning with respect to packet forwarding via the first and second virtual circuits being set up by the message.

12. The data communication system according to claim 7, wherein in the event that one edge of the first and second edges fails and the failure is detected by the other edge of the first and second edges:

the failure detecting edge updates the agreement such that the packets received from the connected virtual circuit are relayed to the fourth edge and sends a cancel message to the third edge; and the third edge is instructed to delete MAC learning content with respect to packet forwarding via the virtual circuit connected to the failed edge by the cancel message.

13. The data communication system according to claim 12, wherein in the event that the failure detecting edge receives a packet sent from the connected virtual circuit after the agreement is updated, the failure detecting edge decides on the handling of the received packet based on the updated agreement, and relays the received packet to the fourth edge.

14. The data communication system according to claim 12, wherein in the event that the failed edge recovers from the failure:

the first and second edges renegotiate an agreement relating to the handling by the first and second edges of packets received respectively from the first and second virtual circuits;

the recovered edge sends a virtual circuit setup message to the third edge;

the third edge is instructed to perform MAC learning with respect to packet forwarding via the virtual circuit being set up by the message;

the recovered edge sends a cancel message to the third edge; and the third edge is instructed to delete MAC learning content with respect to forwarding of specific packet by the cancel message.

15. A data communication system for communicating data between a second and a third network via a first network, the system comprising:

a first and a second edge present within the first network, for which multi-device link aggregation is implemented;

a third edge present within the first network, connected to the first edge via a first virtual circuit and connected to the second edge via a second virtual circuit;

a fourth edge present within the second network, connected to the first and second edges by circuits and connected to a host within the second network; and a fifth edge present within the third network, connected to the third edge by a circuit and connected to a host within the third network, wherein when forwarding a packet from a host in the third network to a host in the second network:

the third edge receives the packet sent from the host in the third network via the fifth edge, and based on MAC learning content relating to packet transmission, relays the packet to either the first or second virtual circuit; and the edge that receives the packet from the connected virtual circuit, of the first and second edges, relays the received packet to the fourth edge for forwarding to the host in the second network, wherein an agreement is negotiated in advance between the first edge and the second edge with regard to handling of packets sent or received via the first and second virtual circuits, a different header information for a packet to be relayed is respectively set to the first and second edges according to the agreement, and the first and second edges repay a packet according to the set information, wherein in the event that a packet is forwarded from a host in the second network to a host in the third network:

when one edge of the first and second edges receives the packet sent from the host in the second network via the fourth edge, the one edge acquires from the received packet the destination and sender combination, interchanges the destination and the sender to derive a new combination, and updates the agreement so that the packet of the new combination is relayed;

the one edge instructs the other edge to update the agreement so that the packet of the new combination is discarded, and instructs the third edge with MAC learning content so that the packet of this new combination is sent to the virtual circuit connected to the one edge;

the one edge relays the received packet to the connected virtual circuit;

in the third edge, settings are made so as to not perform MAC learning with respect to packet forwarding via the first and second virtual circuits, and wherein in the event that receives a the packet from the first or second virtual circuit, the third edge does not perform MAC learning with respect to forwarding of the received packet based on the settings, and relays the received packet to the fifth edge.

16. The data communication system according to claim 15, wherein when forwarding the packet from a host in the third network to a host in the second network, the edge receiving the packet from a connected virtual circuit of the first and second edges, relays the received packet to the fourth edge based on the updated agreement.

17. A data communication method for communicating data between a second and a third network via a first network using a data communication system, the system comprising a first and a second edge present within the first network, for which multi-device link aggregation is implemented, a third edge present within the first network, connected to the first edge via a first virtual circuit and connected to the second edge via a second virtual circuit, a fourth edge present within the second network, connected to the first and second edges by circuits and connected to a host within the second network, and a fifth edge present within the third network, connected to the third edge by a circuit and connected to a host within the third network, wherein when forwarding of a packet from a host in the third network to a host in the second network, the data communication method comprises steps of:

receiving, by the third edge, receiving the packet sent from the host in the third network via the fifth edge, wherein the third edge replicates the packet, and relays the packet individually to the first and second virtual circuits;

receiving, by the first edge, the packet sent from the first virtual circuit, and the second edge receiving the packet sent from the second virtual circuit; and deciding, by the first and second edges, upon the handling of the received packets based on an agreement between them in advance, wherein one of the edges relays its received packet to the fourth edge for forwarding to the host in the second network, while the other edge discards its received packet without relaying it to the fourth edge, wherein when the received packet is a first packet having a first header, the first edge relays the first packet to the fourth edge, whereby the first packet is transferred to the host in the second network, and the second edge discards the first packet without relaying the first packet to the fourth edge, and wherein when the received packet is a second packet having a second header, the second edge relays the second packet to the fourth edge, whereby the second packet is transferred to the host in the second network, and the first edge discards the second packet without relaying the second packet to the fourth edge.

18. A data communication method for communicating data between a second and a third network via a first network using a data communication system, the system comprising a first edge and a second edge present within the first network, for which multi-device link aggregation has been implemented, a third edge present within the first network, connected to the first edge via a first virtual circuit and connected to the second edge via a second virtual circuit, a fourth edge present within the second network, connected to the first edge and the second edge by circuits and connected to a host within the second network, and a fifth edge present within the third network, connected to the third edge by a circuit and connected to a host within the third network, wherein when forwarding of a packet from a host in the third network to a host in the second network, the data communication method comprises steps of:

receiving, by the third edge, the packet sent from the host in the third network via the fifth edge, and based on MAC learning content relating to packet transmission, relaying, by the third edge, the packet to either the first or second virtual circuit; and relaying, by one of the first edge and the second edge that receives the packet from the connected virtual circuit of the first edge and the second edge, the received packet to the fourth edge for forwarding to the host in the second network, wherein an agreement is negotiated in advance between the first edge and the second edge with regard to handling of packets received via the first and second virtual circuits, and in the event that a packet is forwarded from a host in the second network to a host in the third network, the data communication method further comprises:

when one edge of the first and second edges receives the packet sent from the host in the second network via the fourth edge, acquiring, by the one edge, the received packet from the destination and sender combination, interchanging, by the one edge, the destination and the sender to derive a first new combination, in the event that the agreement specifies with respect to handling of the packet of the first new combination that the packet be relayed, and relaying, by the one edge, the received packet to the connected virtual circuit, and in the event that the agreement specifies with respect to handling of the packet of the first new combination that the packet be discarded, sending, by the one edge, the received packet to the other edge of the first and second edges, and sending, by the other edge, the packet to the connected virtual circuit.

* * * * *